US012563291B2

(12) United States Patent
Wang et al.

(10) Patent No.: US 12,563,291 B2
(45) Date of Patent: Feb. 24, 2026

(54) CAMERA SWITCHING METHOD AND ELECTRONIC DEVICE

(71) Applicant: HONOR DEVICE CO., LTD., Shenzhen (CN)

(72) Inventors: Yonghua Wang, Shenzhen (CN); Shiyu Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 89 days.

(21) Appl. No.: 18/574,906

(22) PCT Filed: Dec. 26, 2022

(86) PCT No.: PCT/CN2022/141984
§ 371 (c)(1),
(2) Date: Dec. 28, 2023

(87) PCT Pub. No.: WO2023/142830
PCT Pub. Date: Aug. 3, 2023

(65) Prior Publication Data
US 2024/0323518 A1     Sep. 26, 2024

(30) Foreign Application Priority Data

Jan. 25, 2022   (CN) .......................... 202210085026.5
Apr. 29, 2022   (CN) .......................... 202210468924.9

(51) Int. Cl.
*H04N 23/667*     (2023.01)
*H04N 23/63*     (2023.01)
(Continued)

(52) U.S. Cl.
CPC ......... *H04N 23/667* (2023.01); *H04N 23/635* (2023.01); *H04N 23/671* (2023.01);
(Continued)

(58) Field of Classification Search
CPC .. H04N 23/667; H04N 23/635; H04N 23/671; H04N 23/69; H04N 23/90;
(Continued)

(56) References Cited

U.S. PATENT DOCUMENTS 10,951,833 B2   3/2021   Yuan
2012/0032984 A1*   2/2012   Chen ...................... G06F 1/1626
                                 345/660

(Continued)

FOREIGN PATENT DOCUMENTS

CN      106161941 A    11/2016
CN      106197366 A    12/2016
(Continued)

OTHER PUBLICATIONS

Du Yanqi et al: "Research on the Detection Algorithm of the Vehicle and Vehicle Distance based on the Single and Double Camera Switch", Con 01 Engineering of China, vol. 26, No. 2, Feb. 2019, 9 pages.

*Primary Examiner* — Abdelaaziz Tissire

(57) ABSTRACT

This application relates to the field of terminals, and provides a camera switching method and an electronic device. The method is applicable to an electronic device. The electronic device includes a camera module. The camera module includes a first camera and a second camera. The method includes: enabling a camera application; displaying a first image, where the first image is captured when the first camera serves as a main camera for image capturing; determining that a first parameter and a second parameter satisfy a first preset condition, where the first parameter indicates distance information between the electronic device and a target object, the first parameter is a parameter from the camera module, and the second parameter indicates a zoom ratio of the electronic device; and displaying a second (Continued)

image, where the second image is captured when the second camera serves as the main camera for image capturing.

19 Claims, 38 Drawing Sheets

(51) Int. Cl.

| | |
|---|---|
| *H04N 23/67* | (2023.01) |
| *H04N 23/69* | (2023.01) |
| *H04N 23/90* | (2023.01) |

(52) U.S. Cl.
CPC ............. *H04N 23/69* (2023.01); *H04N 23/90* (2023.01); *H04N 23/632* (2023.01)

(58) Field of Classification Search
CPC .... H04N 23/632; H04N 23/95; H04N 23/951; H04N 23/958; H04N 23/959; H04N 23/62; H04N 23/63; H04N 23/631; H04N 23/45; H04N 23/6812; H04N 23/698; H04N 23/67
See application file for complete search history.

(56) References Cited

U.S. PATENT DOCUMENTS

| | | | | |
|---|---|---|---|---|
| 2016/0241793 | A1* | 8/2016 | Ravirala | .............. H04N 23/635 |
| 2017/0272644 | A1* | 9/2017 | Chou | .................... H04N 7/181 |
| 2017/0359494 | A1* | 12/2017 | Zhou | ...................... H04N 23/60 |
| 2018/0332223 | A1* | 11/2018 | Lin | ........................ H04N 23/71 |
| 2019/0014270 | A1* | 1/2019 | Yuan | ...................... H04N 23/57 |
| 2019/0037189 | A1* | 1/2019 | Yuan | .................... H04N 1/6077 |
| 2020/0007777 | A1* | 1/2020 | Huang | ................... H04N 23/63 |
| 2020/0106964 | A1 | 4/2020 | Cohen et al. | |
| 2020/0145633 | A1* | 5/2020 | Yuan | ...................... H04N 23/13 |
| 2020/0304723 | A1 | 9/2020 | Okiyama | |
| 2021/0112206 | A1* | 4/2021 | Hwang | ............... H04N 23/632 |
| 2023/0247286 | A1* | 8/2023 | Cui | ........................ H04N 23/60 |
| | | | | 348/207.99 |
| 2024/0267615 | A1* | 8/2024 | Huo | ...................... G11B 27/34 |
| 2025/0047979 | A1* | 2/2025 | Choi | ..................... H04N 23/57 |
| 2025/0106529 | A1* | 3/2025 | Tian | ................. H04M 1/72454 |

FOREIGN PATENT DOCUMENTS

| | | | | |
|---|---|---|---|---|
| CN | 107277355 | A | 10/2017 | |
| CN | 110248081 | A | 9/2019 | |
| CN | 110691193 | A | 1/2020 | |
| CN | 112804450 | A | 5/2021 | |
| CN | 113099102 | A | 7/2021 | |
| CN | 113747028 | A | 12/2021 | |
| JP | 2005101874 | A | 4/2005 | |
| JP | 2019134459 | A | 8/2019 | |
| WO | WO-2020073959 | A1 * | 4/2020 | ............. H04N 23/67 |
| WO | 2021244295 | A1 | 12/2021 | |

* cited by examiner

100

Rear cover

1931

1932

1933

100

Rear cover 1933
1931
1932

Ultra wide
camera

Wide angle
camera

Telephoto
camera

M          N          Zoom ratio

CAMERA SWITCHING METHOD AND ELECTRONIC DEVICE

CROSS-REFERENCE TO RELATED APPLICATIONS

This application is a national stage of International Application No. PCT/CN2022/141984, filed on Dec. 26, 2022, which claims priority to Chinese Patent Application No. 202210085026.5, filed on Jan. 25, 2022, and to Chinese Patent Application No. 202210468924.9, filed on Apr. 29, 2022. The disclosures of each of the aforementioned applications are hereby incorporated by reference in their entireties.

TECHNICAL FIELD

This application relates to the field of terminals, and specifically, to a camera switching method and an electronic device.

BACKGROUND

An electronic device is usually required to automatically switch a camera during photographing, to capture a clear image. For example, during photographing of long-range scenery, the electronic device may switch to a telephoto camera, and during photographing of short-range scenery, the electronic device may switch to an ultra wide camera.

Currently, distance information between the electronic device and a to-be-photographed object is usually determined through a laser sensor in the electronic device. Through the distance information between the electronic device and the to-be-photographed object, automatic switching between different cameras in the electronic device can be implemented. For example, when the electronic device enters a camera application, a camera to be enabled by default may be a wide angle camera. When the laser sensor in the electronic device detects that the electronic device is relatively close to the to-be-photographed object, the electronic device may switch from the wide angle camera to the ultra wide camera, to capture a clear image. However, a current camera switching method relies on the laser sensor in the electronic device. Therefore, an electronic device without the laser sensor cannot implement automatic switching between different cameras in the electronic device.

Therefore, how to implement automatic switching between different cameras in electronic devices without relying on the laser sensor becomes a problem urgently to be resolved.

SUMMARY

This application provides a camera switching method and an electronic device, which can implement automatic switching between different cameras in the electronic device without relying on a laser sensor, thereby improving photographing experience of users.

In a first aspect, a camera switching method is provided, which is applicable to an electronic device. The electronic device includes a camera module. The camera module includes a first camera and a second camera. The method includes:

enabling a camera application;

displaying a first image, where the first image is captured when the first camera serves as a main camera for image capturing;

determining that a first parameter and a second parameter satisfy a first preset condition, where the first parameter indicates distance information between the electronic device and a target object, the first parameter is a parameter from the camera module, the target object is a to-be-photographed object in the first image, and the second parameter indicates a zoom ratio of the electronic device; and displaying a second image, where the second image is captured when the second camera serves as the main camera for image capturing.

In this embodiment of this application, since the electronic device may not include a laser sensor, the distance information between the electronic device and the to-be-photographed object cannot be obtained through the laser sensor. The distance information between the electronic device and the to-be-photographed object may be obtained through obtaining of the first parameter (for example, a code value) of the camera module in the electronic device. It may be determined based on the distance information between the electronic device and the to-be-photographed object whether to switch the camera of the electronic device. For example, if the electronic device is relatively close to the to-be-photographed object, the electronic device may use an ultra wide camera as the main camera. In addition, in this embodiment of this application, the second parameter of the electronic device may be obtained, and it is determined that the second parameter satisfies the first preset condition. A picture jump during camera switching of the electronic device can be avoided when the first parameter and second parameter satisfy the first preset condition. Therefore, in this embodiment of this application, the electronic device can implement automatic switching between different cameras without relying on the laser sensor. In addition, during the switching between different cameras, stability of a displayed picture can be ensured, that is, smoothness and fluency of the displayed picture can be ensured.

In a possible implementation, a user may indicate the electronic device to start a camera application by tapping an icon of the "camera" application. Alternatively, when the electronic device is in a screen-locked state, the user may indicate the electronic device to enable the camera application through a rightward swipe gesture on a display of the electronic device. Alternatively, when the electronic device is in the screen-locked state, and the screen-locked interface includes the icon of the camera application, the user may indicate the electronic device to enable the camera application by tapping the icon of the camera application. Alternatively, when the electronic device is running another application, and the application has a permission to invoke the camera application, the user may indicate the electronic device to enable the camera application by tapping a corresponding control. For example, when the electronic device is running an instant messaging application, the user may indicate the electronic device to enable the camera application by selecting a camera function control.

In a possible implementation, during photographing, the electronic device may first determine a subject in a to-be-photographed scene. The subject is the to-be-photographed object. The distance between the electronic device and the to-be-photographed object may be a distance between the electronic device and a focal point of the to-be-photographed object after the electronic device completes focusing.

It should be understood that the enabling of the camera application may be running the camera application.

It should be further understood that the electronic device may include a plurality of cameras. For example, the plurality of cameras may include a main camera and an auxiliary camera. During image capturing, the electronic device usually uses the image captured by the main camera as a reference for processing. During the processing, partial image information acquired by the auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

In a possible implementation, the electronic device is in a single-camera mode during image capturing, that is, the electronic device enables one camera for image capturing. The camera is the main camera.

In a possible implementation, the electronic device is in a single-camera mode during image capturing, that is, the electronic device enables one camera for image capturing. The camera is the main camera.

For example, the electronic device is in a dual-camera mode during image capturing, that is, the electronic device enables two cameras for image capturing. One of the cameras is the main camera, and the other camera is the auxiliary camera. During image capturing, the image captured by the main camera is usually used as a reference for processing. During the processing, partial image information acquired by the partial auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

In a possible implementation, if the electronic device is in a multi-camera mode during image capturing, for example, the electronic device is in a three-camera mode during image capturing, the electronic device may enable three cameras for image capturing. The three cameras include one main camera and two auxiliary cameras. During image capturing, the image captured by the main camera is usually used as a reference for processing. During the processing, partial image information acquired by the two auxiliary cameras may be extracted to compensate for the image captured by the main camera, to achieve fusion of the images captured by the three cameras, and the image is processed to obtain a displayed image, thereby improving photographing quality and implementing functions such as background blur, optical zoom, and the like.

With reference to the first aspect, in some implementations of the first aspect, the determining that a first parameter and a second parameter satisfy a first preset condition includes:

determining that the first parameter is greater than a first preset threshold and the second parameter satisfies a second preset range, where the first preset threshold indicates distance information between the camera module and a sensor in the electronic device, and the second preset range indicates a zoom range of the camera module.

With reference to the first aspect, in some implementations of the first aspect, the method further includes:

obtaining a first distance range of the first camera, where the first distance range indicates an effective distance range for focusing by the first camera; and obtaining the first preset threshold based on the first distance range.

It should be understood that the effective distance range for focusing by the first camera may mean that the first camera can implement accurate focusing within the effective distance range. If the focusing distance is greater than or equal to effective distance range, the electronic device cannot implement accurate focusing, resulting in a decreased resolution of the image captured by the first camera.

In a possible implementation, the first distance range of the first camera is greater than 10 cm. That is to say, when the distance between the electronic device and the to-be-photographed object is greater than 10 cm, the first camera can implement accurate focusing on the to-be-photographed object.

In this embodiment of this application, the first preset threshold may be determined based on the effective distance range within which the first camera can implement accurate focusing. Therefore, when the electronic device recognizes that the electronic device is relatively close to or far from the to-be-photographed object, the electronic device may automatically switch to the second camera as the main camera, thereby ensuring image quality of the captured image.

With reference to the first aspect, in some implementations of the first aspect, a start point of the first distance range is a first value, and the first preset threshold is greater than or equal to the first value.

In a possible implementation, the first distance range is greater than 10 cm, that is, the start point of the first distance range is 10 cm. In this case, the first preset threshold may be greater than or equal to 10 cm.

With reference to the first aspect, in some implementations of the first aspect, the method further includes:

obtaining a zoom ratio range of the first camera; and obtaining the second preset range based on the zoom ratio range.

In this embodiment of this application, the second preset range may be determined based on a zoom ratio change range of the first camera, to ensure smoothness of the captured image, and avoid an image jump.

With reference to the first aspect, in some implementations of the first aspect, the second preset range is a subset of the zoom ratio range.

In a possible implementation, if the zoom ratio range of the first camera is [1, 3.5), the second preset range may be a subset of [1, 3.5). For example, the second preset range may be [1, 2), or the second preset range may be [1, 2.5).

With reference to the first aspect, in some implementations of the first aspect, the first parameter is a parameter of the camera module.

In a possible implementation, the first parameter may be a distance parameter of the camera module, which may indicate distance information between a lens and the sensor in the electronic device. For example, a larger distance parameter indicates a larger distance between the lens and the sensor, that is, may indicate a smaller distance between the electronic device and the to-be-photographed object. A smaller distance parameter indicates a smaller distance between the lens and the sensor, that is, may indicate a larger distance between the electronic device and the to-be-photographed object. It should be understood that the distance parameter may be referred to as a "code value", or the distance parameter may be referred to as a lens position (lens position).

In this embodiment of this application, the distance information between the electronic device and the to-be-photographed object may be determined based on the first parameter of the camera module. In this embodiment of this application, the electronic device can implement automatic switching between different cameras without relying on the laser sensor, thereby improving photographing experience of users.

With reference to the first aspect, in some implementations of the first aspect, the second parameter is the zoom ratio of the electronic device.

In a possible implementation, the second preset range may be determined based on a zoom ratio M and a zoom ratio N corresponding to the first camera. A range corresponding to the second preset range may be between [M, N).

In this embodiment of this application, since the second parameter satisfies the second preset range, a picture jump can be avoided during the switching between different cameras in the electronic device, thereby ensuring a smooth and fluent displayed picture.

In a possible implementation, the method further includes:

determining that the first parameter is less than a second preset threshold; and displaying a third image, where the third image is captured when the first camera is used as a main camera for image capturing.

In a possible implementation, the second preset threshold may be determined based on the first preset threshold, and the second preset threshold is greater than the first preset threshold; or the second preset threshold is the same as the first preset threshold.

In this embodiment of this application, when the electronic device is in a short-range photographing scenario, the electronic device may switch from the first camera (for example, a wide angle camera) as the main camera to the second camera (for example, an ultra wide camera) as the main camera. When the electronic device exits the short-range photographing scenario, the electronic device may switch, based on the first parameter and the second parameter, from the second camera (for example, an ultra wide camera) as the main camera to the first camera (for example, a wide angle camera) as the main camera.

In this embodiment of this application, when the electronic device is in a long-range photographing scenario, the electronic device may switch from the first camera (for example, a wide angle camera) as the main camera to the second camera (for example, a telephoto camera) as the main camera. When the electronic device exits the long-range photographing scenario, the electronic device may switch, based on the first parameter and the second parameter, from the second camera (for example, a telephoto camera) as the main camera to the first camera (for example, a wide angle camera) as the main camera.

With reference to the first aspect, in some implementations of the first aspect, the displaying a second image includes:

displaying the second image on a first display interface of the electronic device, where the first display interface further includes a first icon, and the first icon indicates a super macro mode.

With reference to the first aspect, in some implementations of the first aspect, the first icon includes a first control, and the method further includes:

detecting a first operation on the first control; and exiting, by the electronic device, the super macro mode in response to the first operation.

With reference to the first aspect, in some implementations of the first aspect, the electronic device is at a same position when displaying the first image and the second image.

In this embodiment of this application, during the photographing, the position of the electronic device may remain unchanged, and a focusing object of the electronic device may be changed from a long-range to-be-photographed object to a short-range to-be-photographed object. The electronic device can automatically recognize the distance between the electronic device and the to-be-photographed object, and perform automatic switching between different types of cameras as the main camera, thereby ensuring the image quality of the captured image.

With reference to the first aspect, in some implementations of the first aspect, the first camera includes a wide angle camera.

With reference to the first aspect, in some implementations of the first aspect, the second camera includes an ultra wide camera or a telephoto camera.

In a second aspect, an electronic device is provided, which includes a module/unit configured to perform the camera switching method in the first aspect or any implementation of the first aspect.

In a third aspect, an electronic device is provided. The electronic device includes one or more processors, a memory, and a camera module. The memory is coupled to the one or more processors. The memory is configured to store computer program code, the computer program code includes computer instructions, and the one or more processors invoke the computer instructions to cause the electronic device to perform the following operations:

enabling a camera application;

displaying a first image, where the first image is captured when the first camera serves as a main camera for image capturing;

determining that a first parameter and a second parameter satisfy a first preset condition, where the first parameter indicates distance information between the electronic device and a target object, the target object is a to-be-photographed object in the first image, and the second parameter indicates a zoom ratio of the electronic device; and displaying a second image, where the second image is captured when the second camera serves as the main camera for image capturing.

With reference to the third aspect, in some implementations of the third aspect, the one or more processors invoke the computer instructions to cause the electronic device to perform the following operation:

determining that the first parameter is greater than a first preset threshold and the second parameter satisfies a second preset range, where the first preset threshold indicates distance information between the camera module and a sensor in the electronic device, and the second preset range indicates a zoom range of the camera module.

With reference to the third aspect, in some implementations of the third aspect, the one or more processors invoke the computer instructions to cause the electronic device to perform the following operations:

obtaining a first distance range of the first camera, where the first distance range indicates an effective distance range for focusing by the first camera; and obtaining the first preset threshold based on the first distance range.

With reference to the third aspect, in some implementations of the third aspect, the one or more processors invoke the computer instructions to cause the electronic device to perform the following operations:

obtaining a zoom ratio range of the first camera; and obtaining the second preset range based on the zoom ratio range.

With reference to the third aspect, in some implementations of the third aspect, a start point of the first distance range is a first value, and the first preset threshold is greater than or equal to the first value.

With reference to the third aspect, in some implementations of the third aspect, the second preset range is a subset of the zoom ratio range.

With reference to the third aspect, in some implementations of the third aspect, the first parameter is a parameter from the first camera.

With reference to the third aspect, in some implementations of the third aspect, the second parameter is the zoom ratio of the electronic device.

With reference to the third aspect, in some implementations of the third aspect, the one or more processors invoke the computer instructions to cause the electronic device to perform the following operation:

displaying the second image on a first display interface of the electronic device, where a first icon includes a first control, the first display interface further includes the first icon, and the first icon indicates a super macro mode.

With reference to the third aspect, in some implementations of the third aspect, the one or more processors invoke the computer instructions to cause the electronic device to perform the following operations:

detecting a first operation on the first control; and exiting, by the electronic device, the super macro mode in response to the first operation.

With reference to the third aspect, in some implementations of the third aspect, the first camera includes a wide angle camera, and the second camera includes an ultra wide camera or a telephoto camera.

With reference to the third aspect, in some implementations of the third aspect, the electronic device is at a same position when displaying the first image and the second image.

In a fourth aspect, an electronic device is provided. The electronic device includes one or more processors and a memory. The memory is coupled to the one or more processors. The memory is configured to store computer program code, the computer program code includes computer instructions, and the one or more processors invoke the computer instructions to cause the electronic device to perform the method in the first aspect or any implementation of the first aspect.

In a fifth aspect, a chip system is provided, which is applicable to an electronic device. The chip system includes one or more processors. The processors are configured to invoke computer instructions to cause the electronic device to perform the method in the first aspect or any implementation of the first aspect.

In a sixth aspect, a computer-readable storage medium is provided, which stores computer program code. The computer program code, when run by an electronic device, causes the electronic device to perform the method in the first aspect or any implementation of the first aspect.

In a seventh aspect, a computer program product is provided, which includes computer program code. The computer program code, when run by an electronic device, causes the electronic device to perform the method in the first aspect or any implementation of the first aspect.

In this embodiment of this application, since the electronic device may not include a laser sensor, the distance information between the electronic device and the to-be-photographed object cannot be obtained through the laser sensor. The distance information between the electronic device and the to-be-photographed object may be obtained through obtaining of the first parameter (for example, a code value) of the camera module in the electronic device. It may be determined based on the distance information between the electronic device and the to-be-photographed object whether to switch the camera of the electronic device. For example, if the electronic device is relatively close to the to-be-photographed object, the electronic device may use an ultra wide camera as the main camera. In addition, in this embodiment of this application, the second parameter of the electronic device may be obtained, and it is determined that the second parameter satisfies the first preset condition. A picture jump during camera switching of the electronic device can be avoided when the first parameter and second parameter satisfy the first preset condition. Therefore, in this embodiment of this application, the electronic device can implement automatic switching between different cameras without relying on the laser sensor. In addition, during the switching between different cameras, stability of a displayed picture can be ensured, that is, smoothness and fluency of the displayed picture can be ensured.

9

Figure 14:
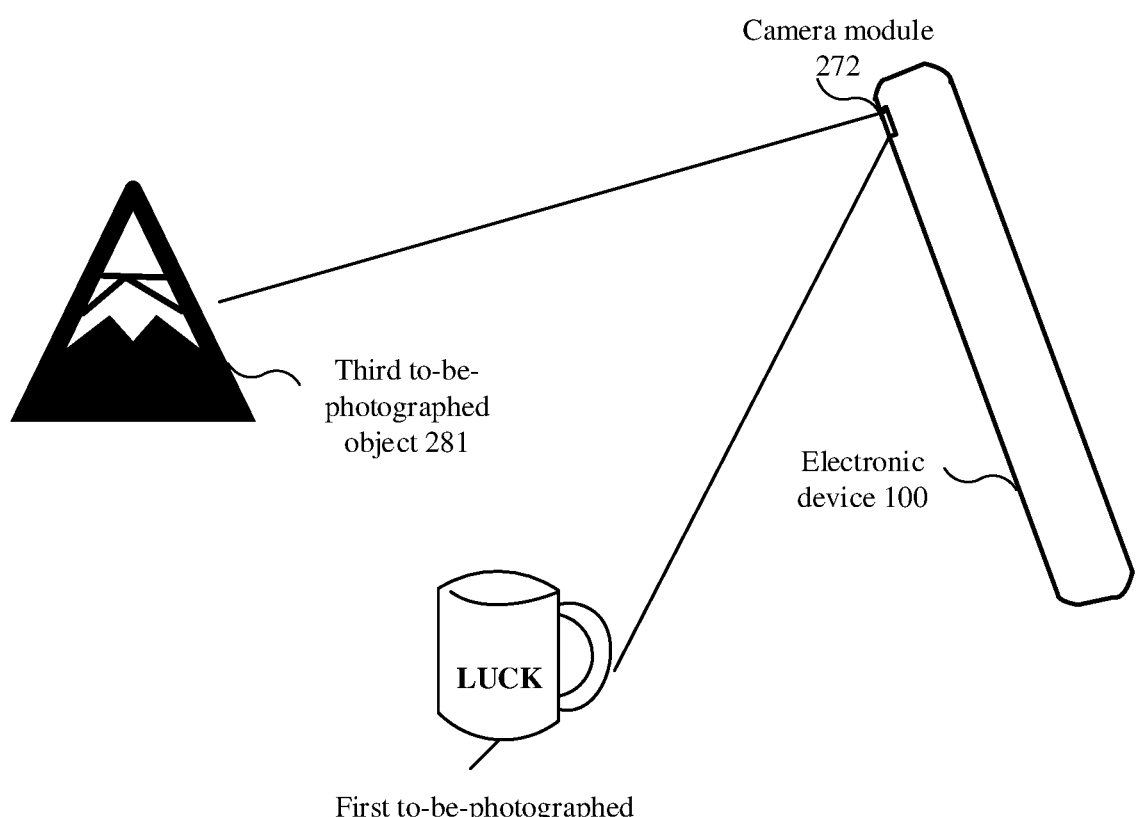
Figure 15:
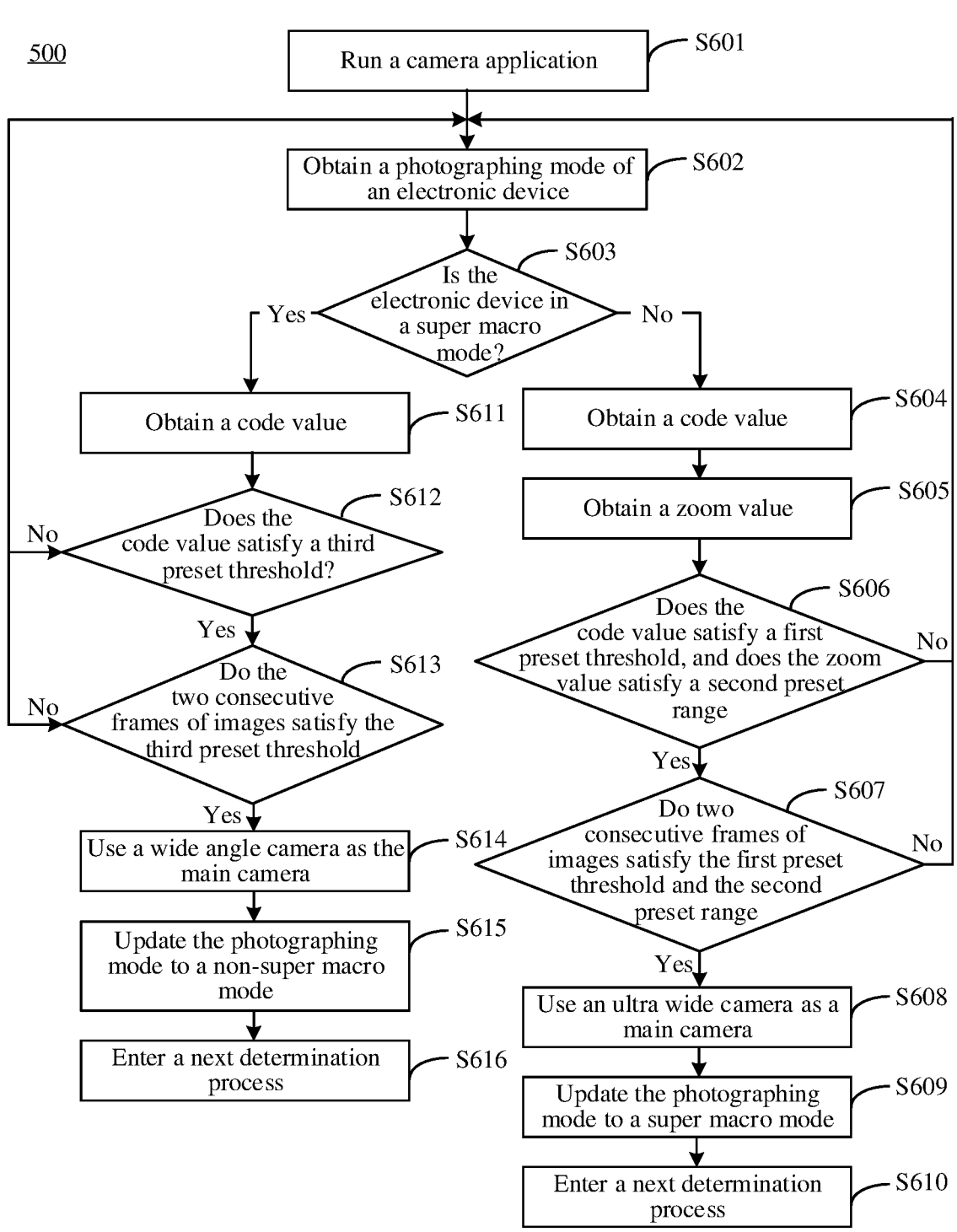
Figure 16A:
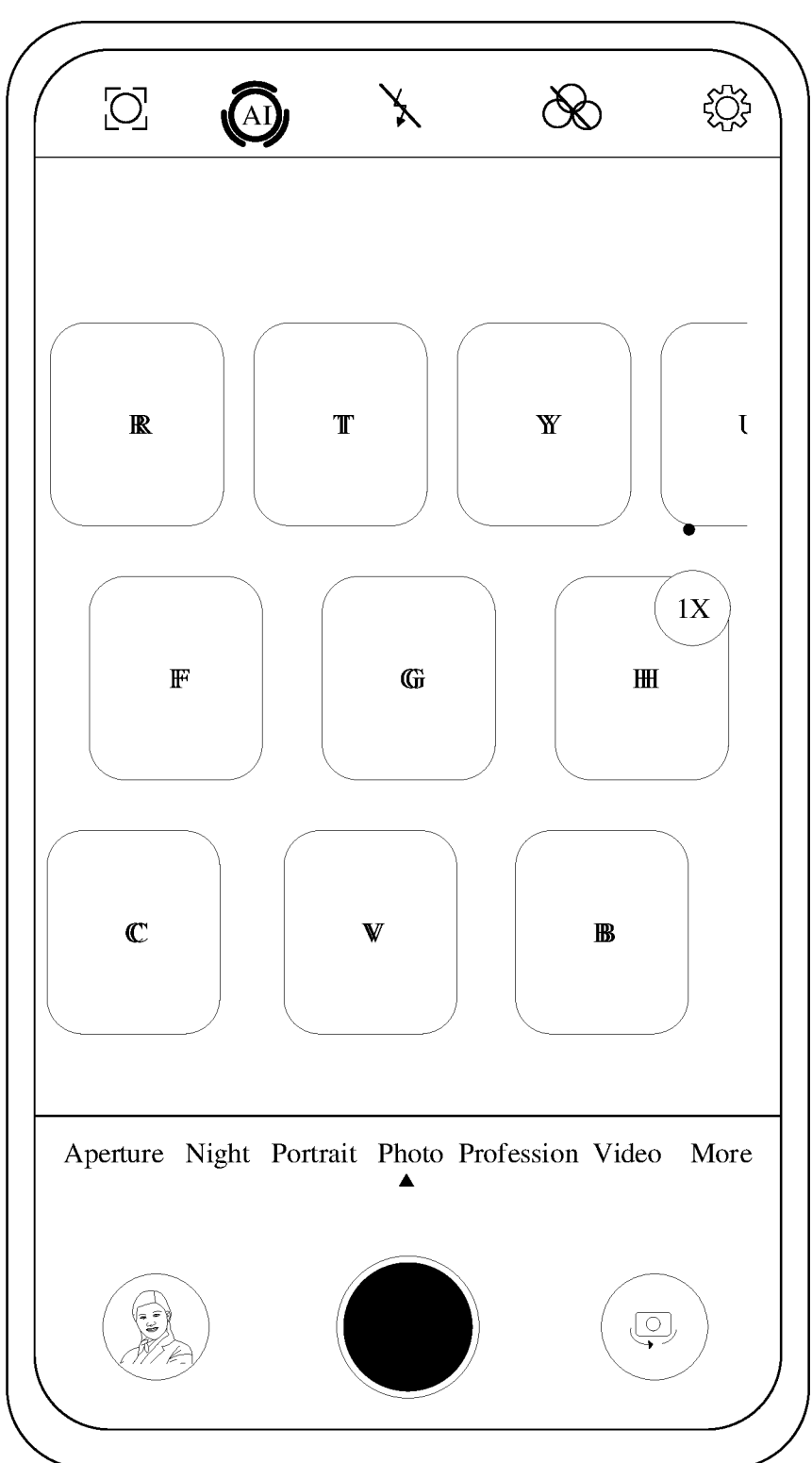
Figure 16B:
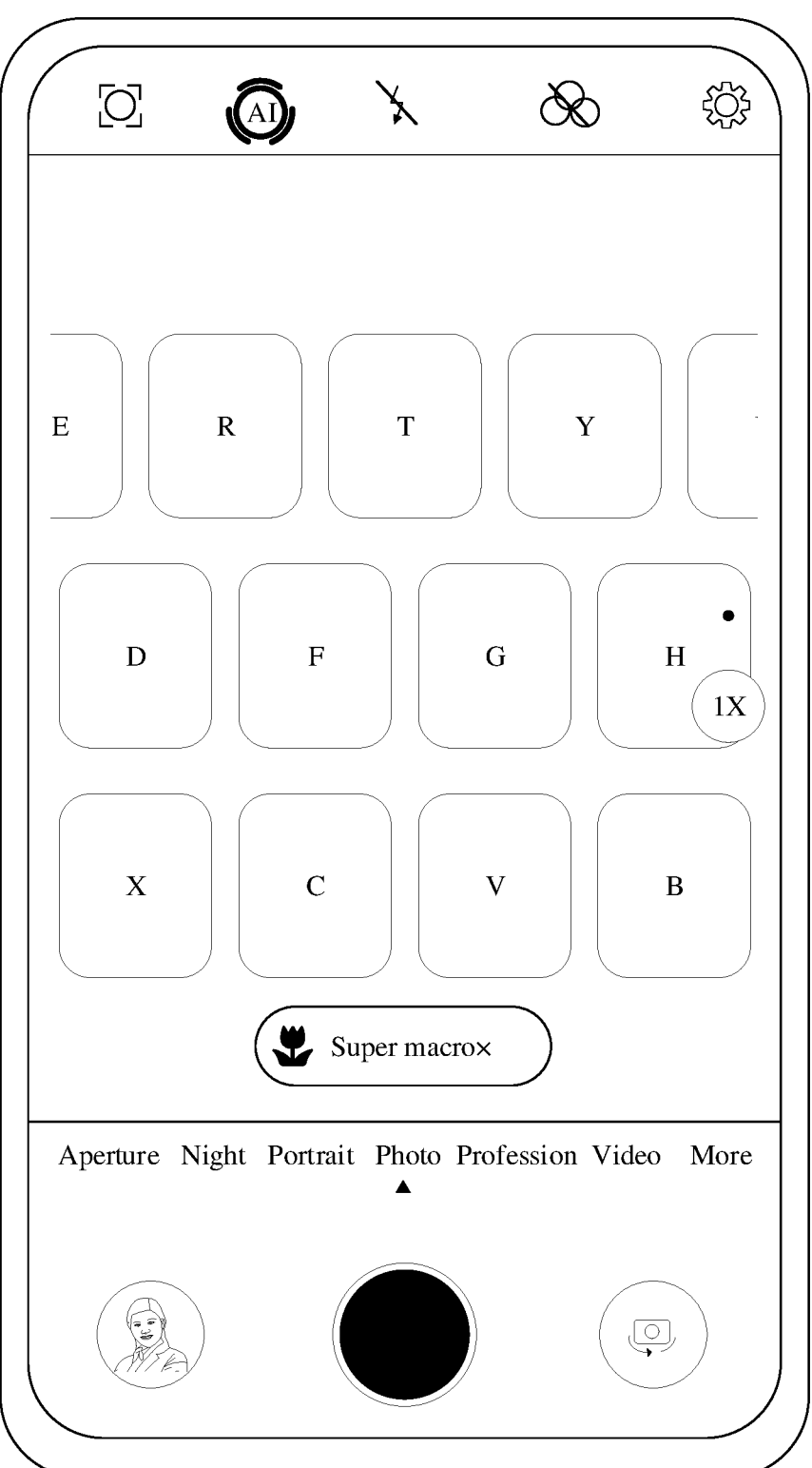
Figure 17A:
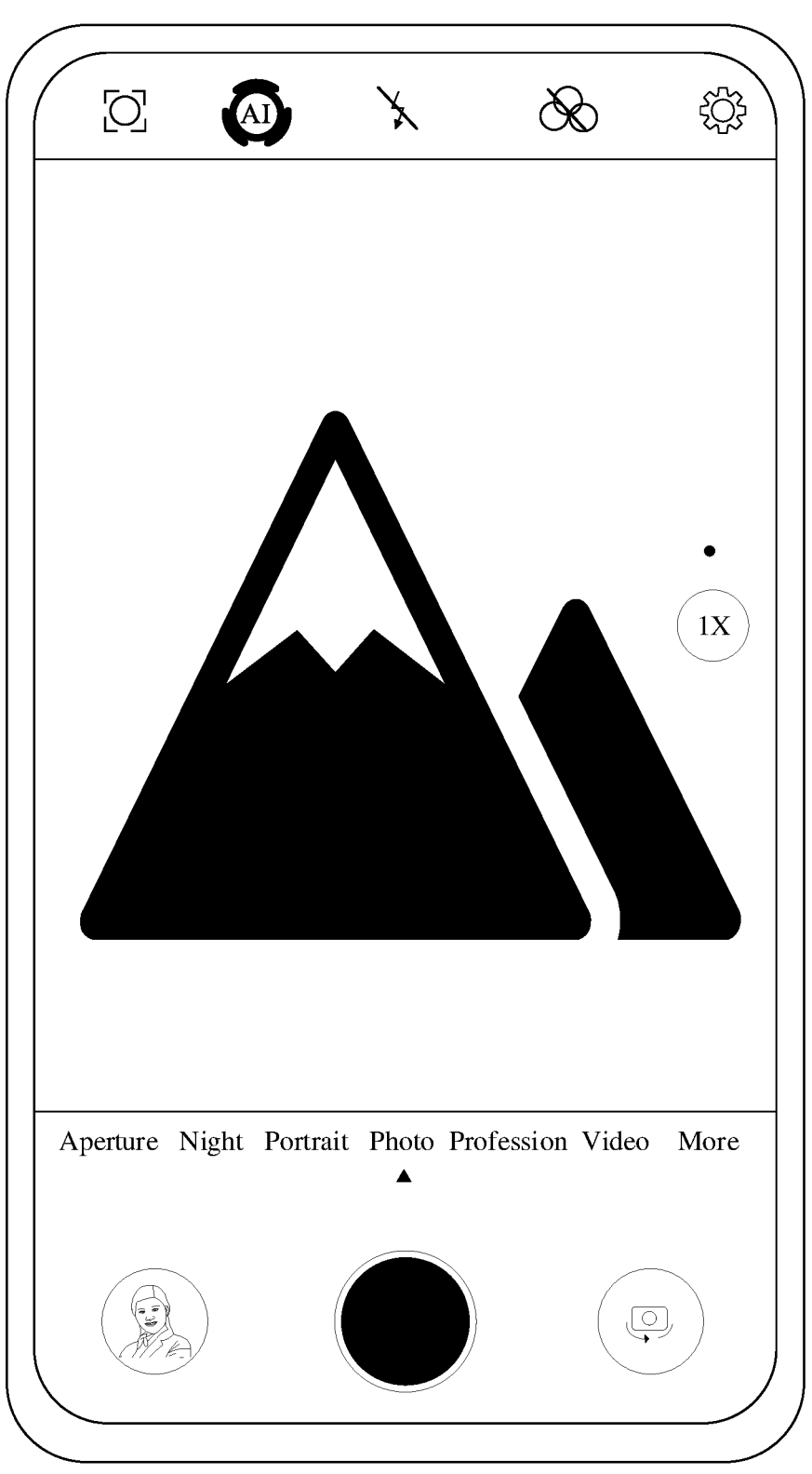
Figure 17B:
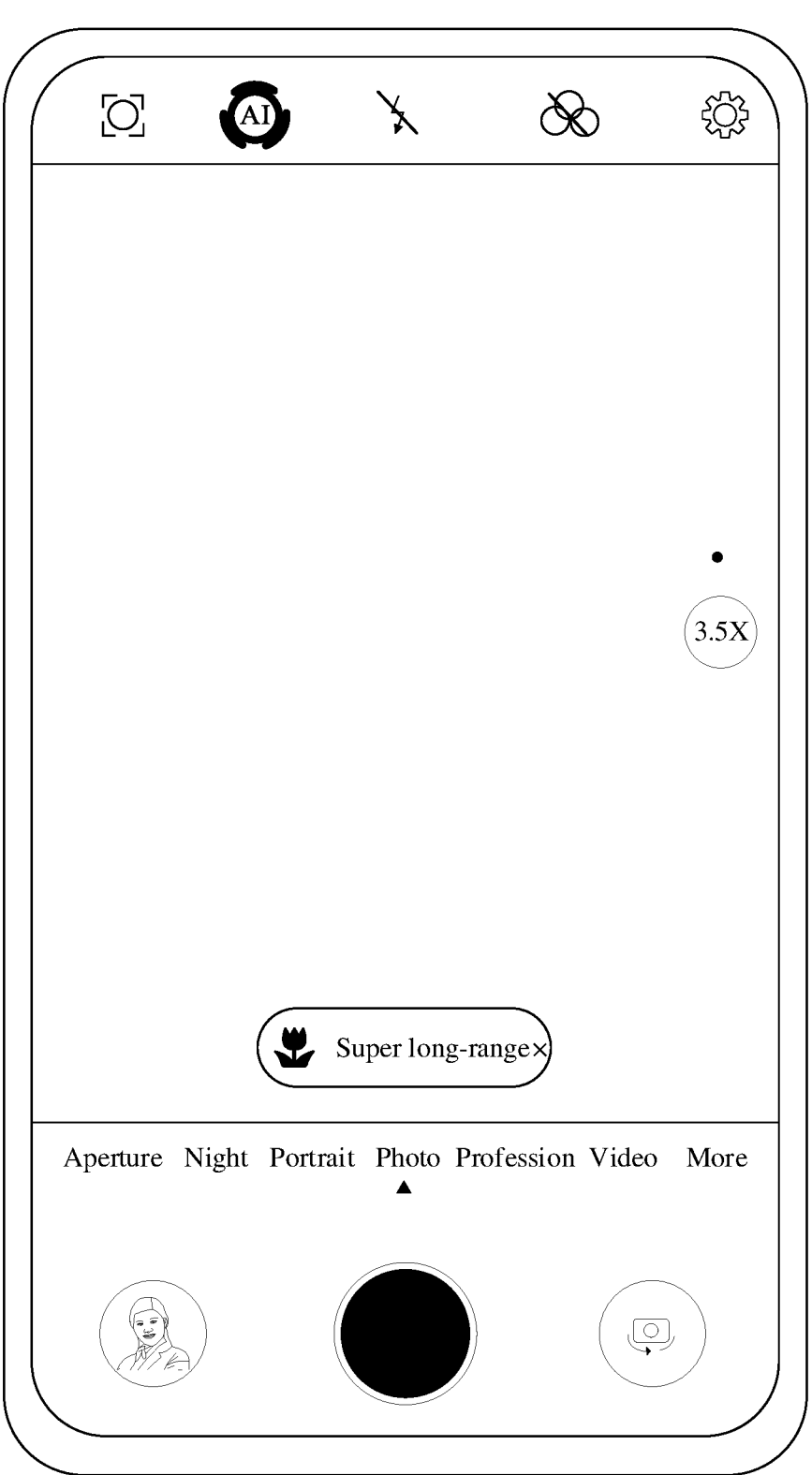
Figure 18:
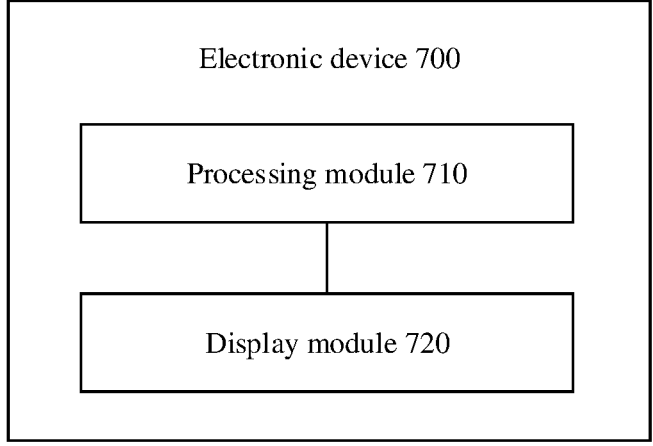
Figure 19:
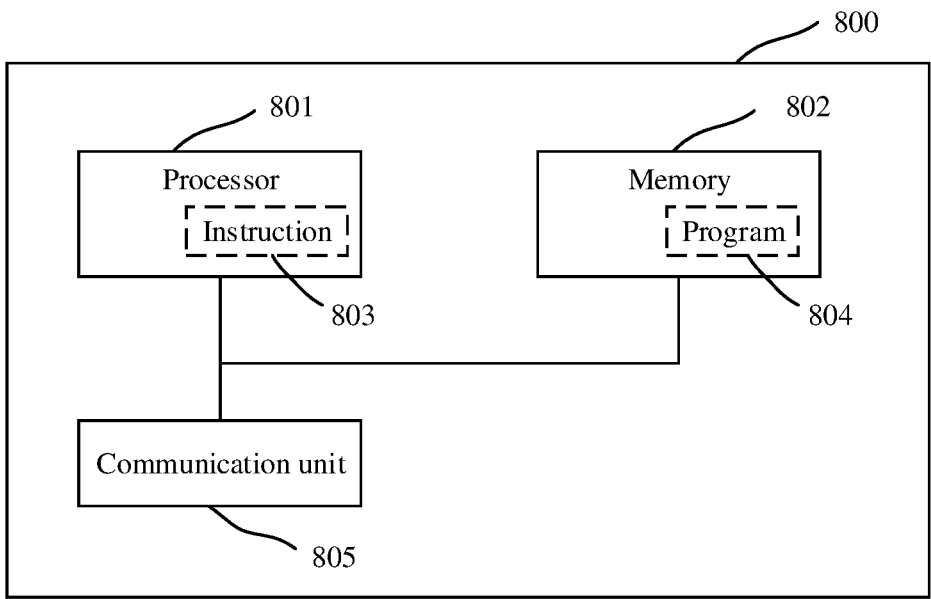

FIG. 14 is a side view of an application scenario according to an embodiment of this application;

FIG. 15 is a schematic flowchart of another camera switching method according to an embodiment of this application;

FIG. 16A and FIG. 16B are schematic diagrams of a preview interface of a camera application according to an embodiment of this application;

FIG. 17A and FIG. 17B are schematic diagrams of a preview interface of a camera application according to an embodiment of this application;

FIG. 18 is a schematic structural diagram of an electronic device according to an embodiment of this application; and FIG. 19 is a schematic structural diagram of an electronic device according to an embodiment of this application.

DESCRIPTION OF EMBODIMENTS

In embodiments of this application, the following terms such as "first" and "second" are merely used for description, and should not be construed as indicating or implying relative importance or implicitly indicating a quantity of technical features that are indicated. Therefore, features defined by "first" and "second" may explicitly or implicitly include one or more such features. In the description of the embodiments, unless otherwise specified, "a plurality of" means two or more.

For ease of understanding embodiments of this application, terms and concepts related to embodiments of this application are first briefly described.

1. Field of View (Field of View, FOV)

The field of view is also referred to as a view field in optical engineering, and a visual range of an optical instrument depends on a magnitude of the field of view. A field of view of an electronic device indicates a maximum photographing angle of a camera during photographing of a to-be-photographed object by the electronic device.

It should be understood that the field of view may also be referred to as a "visual field range", a "visual range", a "visual area", or the like.

2. Distance Parameter

The distance parameter may indicate distance information between a lens and a sensor in an electronic device. For example, a larger distance parameter indicates a larger distance between the lens and the sensor, that is, may indicate a smaller distance between the electronic device and the to-be-photographed object. A smaller distance parameter indicates a smaller distance between the lens and the sensor, that is, may indicate a larger distance between the electronic device and the to-be-photographed object. It should be understood that the distance parameter may be referred to as a "code value", or the distance parameter may be referred to as a lens position (lens position).

3. Zoom Ratio (Zoom)

The zoom ratio indicates a zoom magnitude of the electronic device during photographing.

4. Main Camera and Auxiliary Camera

The electronic device may include a plurality of cameras. For example, the plurality of cameras may include a main camera and an auxiliary camera. During image capturing, the electronic device usually uses the image captured by the main camera as a reference for processing. During the processing, partial image information acquired by the auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

For example, the electronic device is in a single-camera mode during image capturing, that is, the electronic device enables one camera for image capturing. The camera is the main camera.

For example, the electronic device is in a dual-camera mode during image capturing, that is, the electronic device enables two cameras for image capturing. One of the cameras is the main camera, and the other camera is the auxiliary camera. During image capturing, the image captured by the main camera is usually used as a reference for processing. During the processing, partial image information acquired by the partial auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

In an example, the dual cameras in the electronic device may include a wide angle camera and a telephoto camera. The wide angle camera may be used as the main camera, and the telephoto camera may be used as the auxiliary camera. The image captured by the wide angle camera is used as a reference. During the processing of the image captured by the wide angle camera, image information of a distant to-be-photographed object acquired by the telephoto camera may be extracted, to achieve fusion of the images captured by the wide angle camera and the telephoto camera. Details of the distant to-be-photographed object may be supplemented through the telephoto camera. In addition, the image is processed to obtain a displayed image. In this way, the electronic device may have a further optical zoom during photographing.

For example, the dual-camera mode in the electronic device may further include a wide angle camera and an ultra wide camera, a color camera and a black and white camera, a color camera and a depth camera, or the like.

For example, if the electronic device is in a multi-camera mode during image capturing, for example, the electronic device is in a three-camera mode during image capturing, the electronic device may enable three cameras for image capturing. The three cameras include one main camera and two auxiliary cameras. During image capturing, the image captured by the main camera is usually used as a reference for processing. During the processing, partial image information acquired by the two auxiliary cameras may be extracted to compensate for the image captured by the main camera, to achieve fusion of the images captured by the three cameras, and the image is processed to obtain a displayed image, thereby improving photographing quality and implementing functions such as background blur, optical zoom, and the like.

For example, the multi-camera mode in the electronic device may include a wide angle camera, a black and white camera, and a near-infrared camera. The wide angle camera may be used as the main camera, and the black and white camera and the near-infrared camera may be used as the auxiliary cameras. A main image may be obtained through the wide angle camera. Details of an image of a dark region of the to-be-photographed object may be supplemented through the black and white camera. Details of distant scenery of the to-be-photographed object may be supplemented through the near-infrared camera.

It should be understood that, although the single-camera mode, the dual-camera mode, and the multi-camera mode of the electronic device are described by using examples, camera types in the single-camera mode, the dual-camera mode, and the multi-camera mode are not limited in this application.

5. Super Macro Mode

The super macro mode is a photographing mode in which the electronic device automatically switches between a zoom ratio of 1 (1×) and a zoom ratio of 2 (2×) to the ultra wide camera as the main camera for photographing.

For example, the electronic device is in a zoom-in photographing scenario. For example, in a case that a position of the electronic device remains unchanged, a zoom center of the electronic device at a first moment is a first to-be-photographed object, and a zoom center of the electronic device at a second moment is a second to-be-photographed object. The first to-be-photographed object is relatively far from the electronic device, and the second to-be-photographed object is relatively close to the electronic device. Therefore, during photographing of the second to-be-photographed object by the electronic device, the electronic device may automatically use the ultra wide camera as the main camera, and enter the super macro mode, thereby increasing the field of view of the electronic device during the photographing.

Optionally, the expression "the electronic device is in a zoom-in photographing scenario" may mean that during photographing of a same to-be-photographed object by the electronic device, the electronic device moves such that a distance between the electronic device and the to-be-photographed object gradually decreases.

Figure 5A:
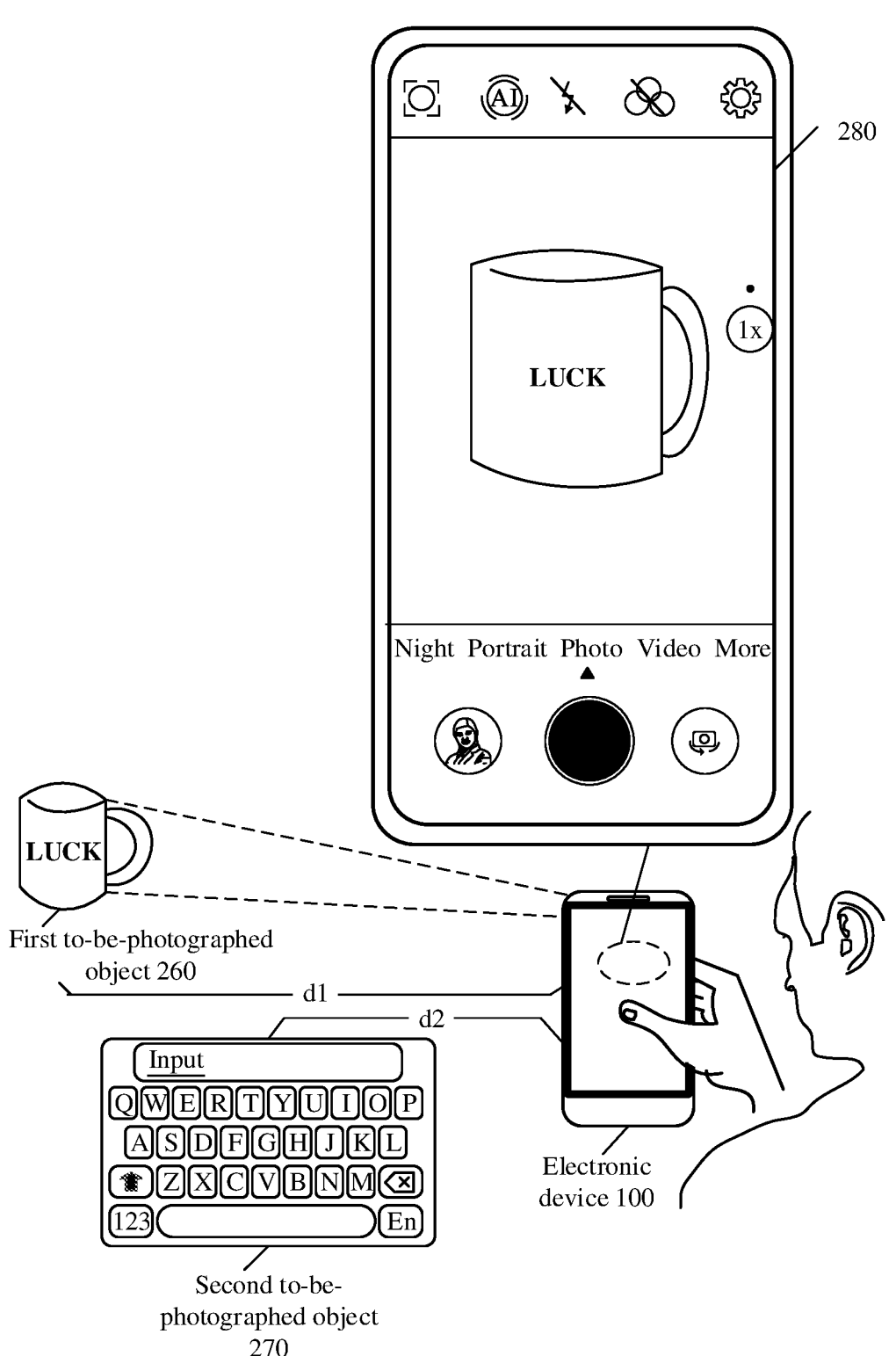
FIG. 5A and FIG. 5B are schematic diagrams of an application scenario according to an embodiment of this application.
Figure 5B:
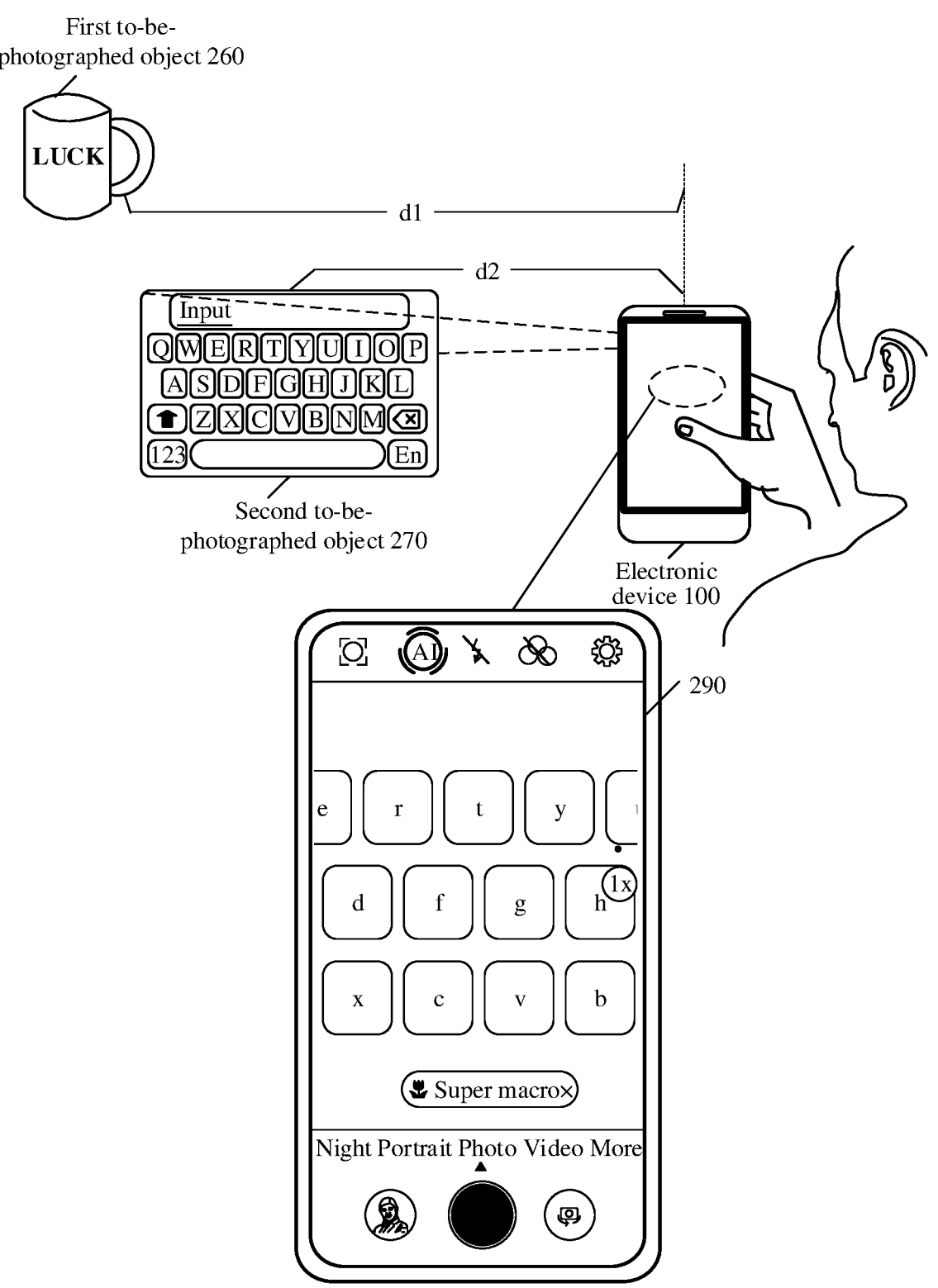
Figure 6:
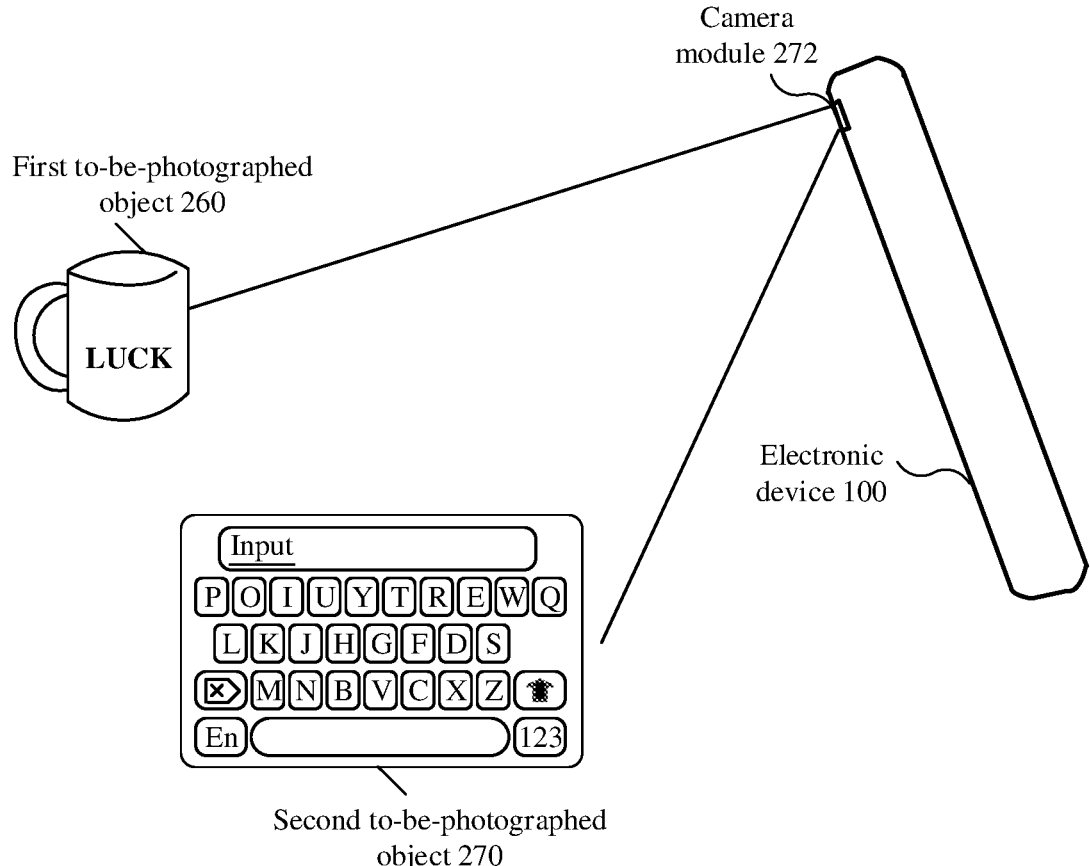
FIG. 6 is a side view of an application scenario according to an embodiment of this application.

For example, as shown in FIG. 5A, a to-be-photographed scene includes a first to-be-photographed object 260 and a second to-be-photographed object 270. A distance between the first to-be-photographed object and the electronic device is d1, and a distance between the second to-be-photographed object and the electronic device is d2. d2 is less than d1. FIG. 6 is a side view of the to-be-photographed scene. During the photographing, the position of the electronic device remains unchanged. The electronic device enables a camera application. At a first moment, the electronic device aligns at the first to-be-photographed object 260 for focusing, and may display a display interface 280. In this case, a zoom ratio of the electronic device is 1× (it may be understood that the zoom ratio may be any value between 1× and 2×, or may be another value, which is not limited in this embodiment of this application). As shown in FIG. 5B, at a second moment, the electronic device keeps a zoom ratio of 1× (it may be understood that the zoom ratio may be any value between 1× and 2×, or may be another value, which is not limited in this embodiment of this application) and switches to another to-be-photographed object. For example, when the electronic device aligns at the second to-be-photographed object 270 for focusing, if the electronic device recognizes that the second to-be-photographed object 270 is relatively close to the electronic device, the electronic device may enter the super macro mode, automatically switch to the ultra wide camera as the main camera for focusing, and display a display interface 290.

It should be understood that the super macro photographing mode of the electronic device is not enabled through user selection. Instead, the photographing mode is usually automatically switched by the electronic device.

6. Super Long-Range Mode

The super long-range mode is a photographing mode in which the electronic device automatically uses the telephoto camera as the main camera for image capturing.

For example, the electronic device is in a zoom-out photographing scenario. For example, in a case that a position of the electronic device remains unchanged, a zoom center of the electronic device at a first moment is a first to-be-photographed object, and a zoom center of the electronic device at a second moment is a third to-be-photographed object. The first to-be-photographed object is relatively close to the electronic device, and the third to-be-photographed object is relatively close to the electronic device. During photographing of the third to-be-photographed object by the electronic device, the electronic device may automatically use the telephoto camera as the main camera, and enter the super long-range mode, thereby increasing details of the long-range to-be-photographed object.

Figure 13A:
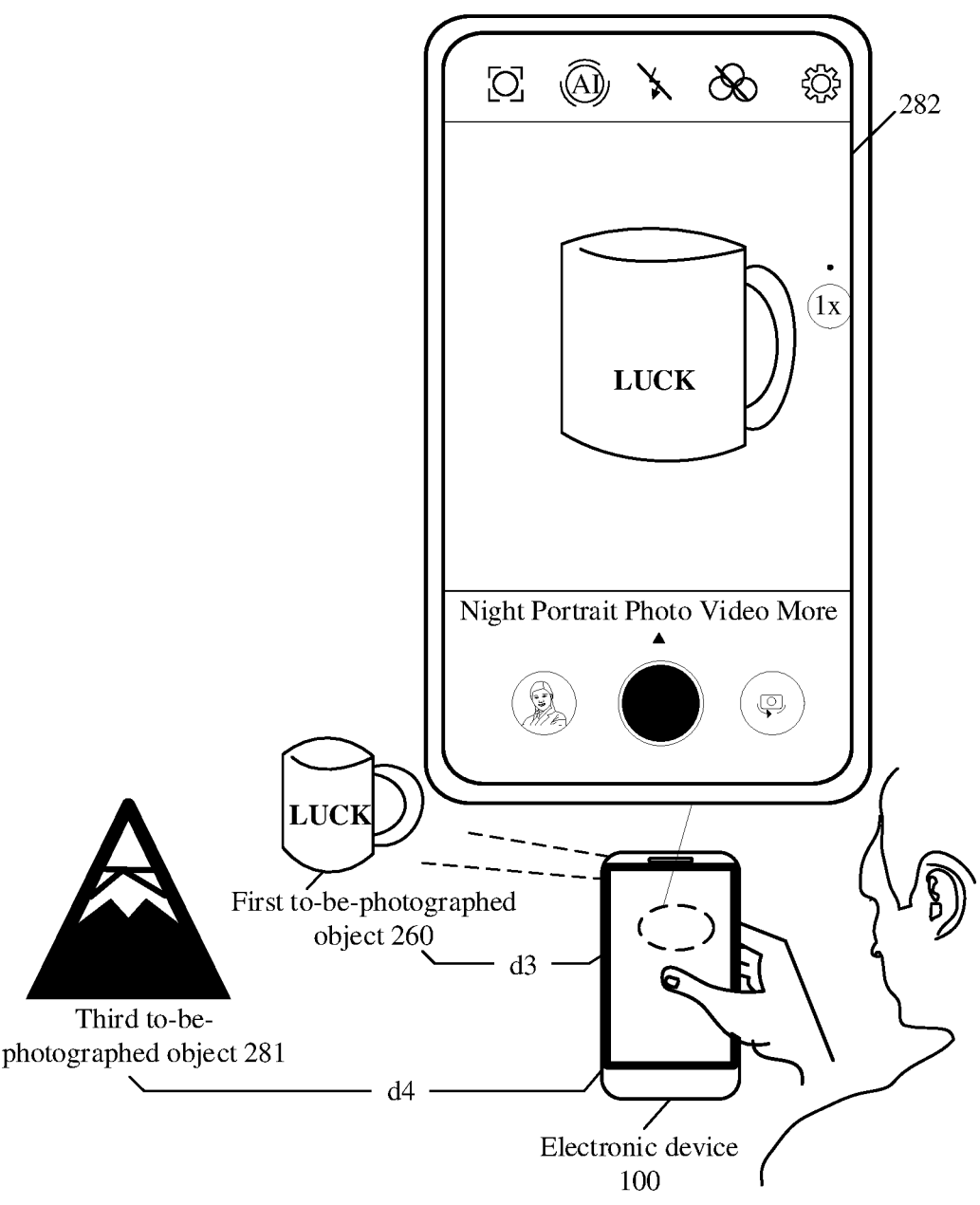
FIG. 13A and FIG. 13B are schematic diagrams of an application scenario according to an embodiment of this application.
Figure 13B:
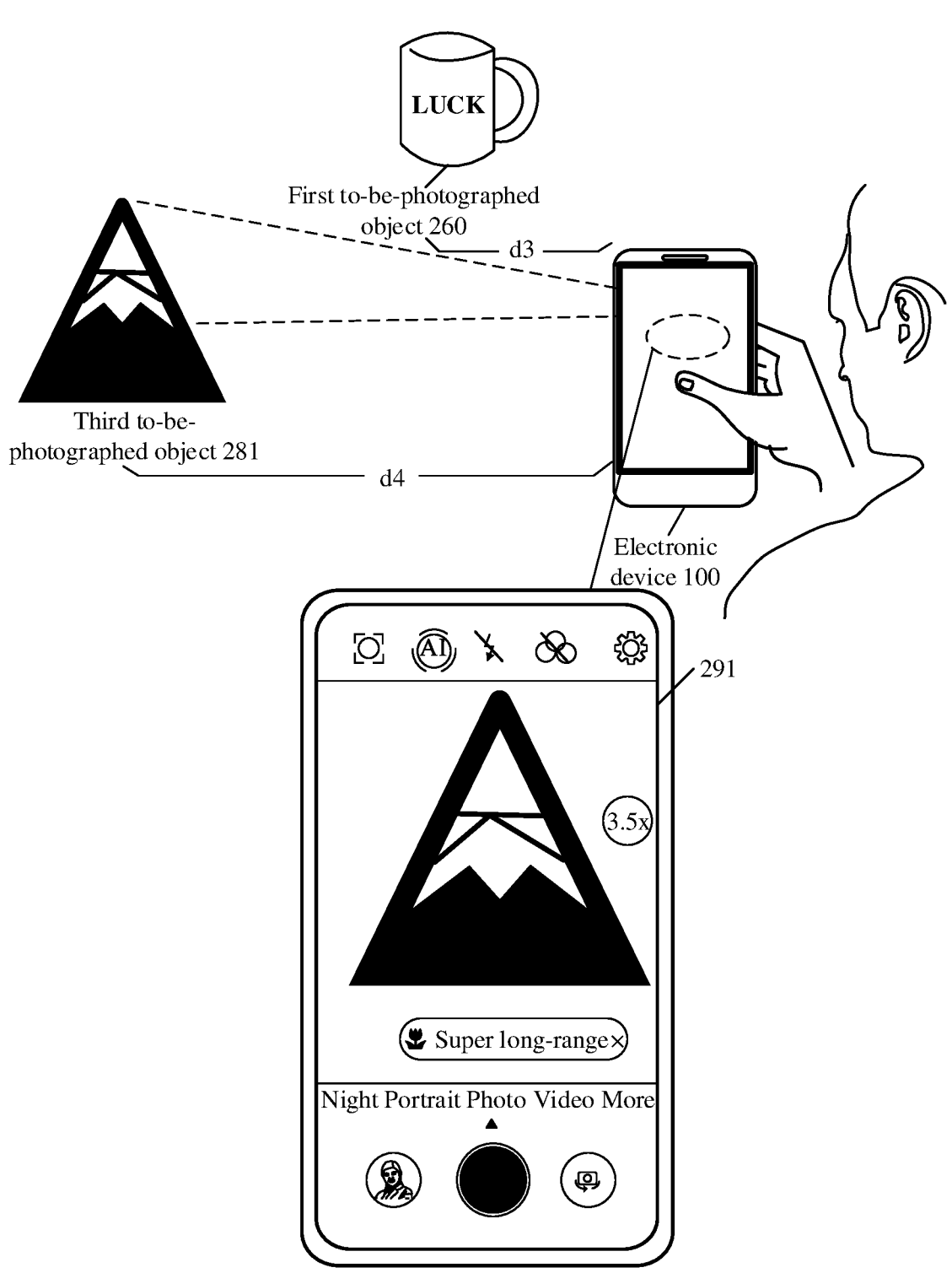

For example, as shown in FIG. 13A, a to-be-photographed scene includes the first to-be-photographed object 260 and a third to-be-photographed object 281. A distance between the first to-be-photographed object and an electronic device 100 is d3, and a distance between the third to-be-photographed object and the electronic device 100 is d4. d3 is less than d4. FIG. 14 is a side view of the to-be-photographed scene. The electronic device 100 includes a camera module 272. During the photographing, a position of the electronic device 100 remains unchanged. The electronic device 100 enables a camera application. At a first moment, the electronic device 100 aligns at the first to-be-photographed object 260 for focusing, and may display a display interface 282. In this case, a zoom ratio of the electronic device 100 is a zoom ratio of 1. As shown in FIG. 13B, at the second moment, the electronic device 100 switches to another to-be-photographed object. For example, when the electronic device 100 aligns at the third to-be-photographed object 281 for focusing, if the electronic device 100 recognizes that the third to-be-photographed object 281 is relatively far from the electronic device 100, the electronic device 100 may enter the super long-range mode. That is to say, the electronic device 100 may automatically switch to a super telephoto camera as the main camera for focusing, and display a display interface 291.

7. Timer

The timer is a device for measuring time by using a specific principle.

A camera switching method and an electronic device in embodiments of this application are described below with reference to the drawings.

Figure 1:
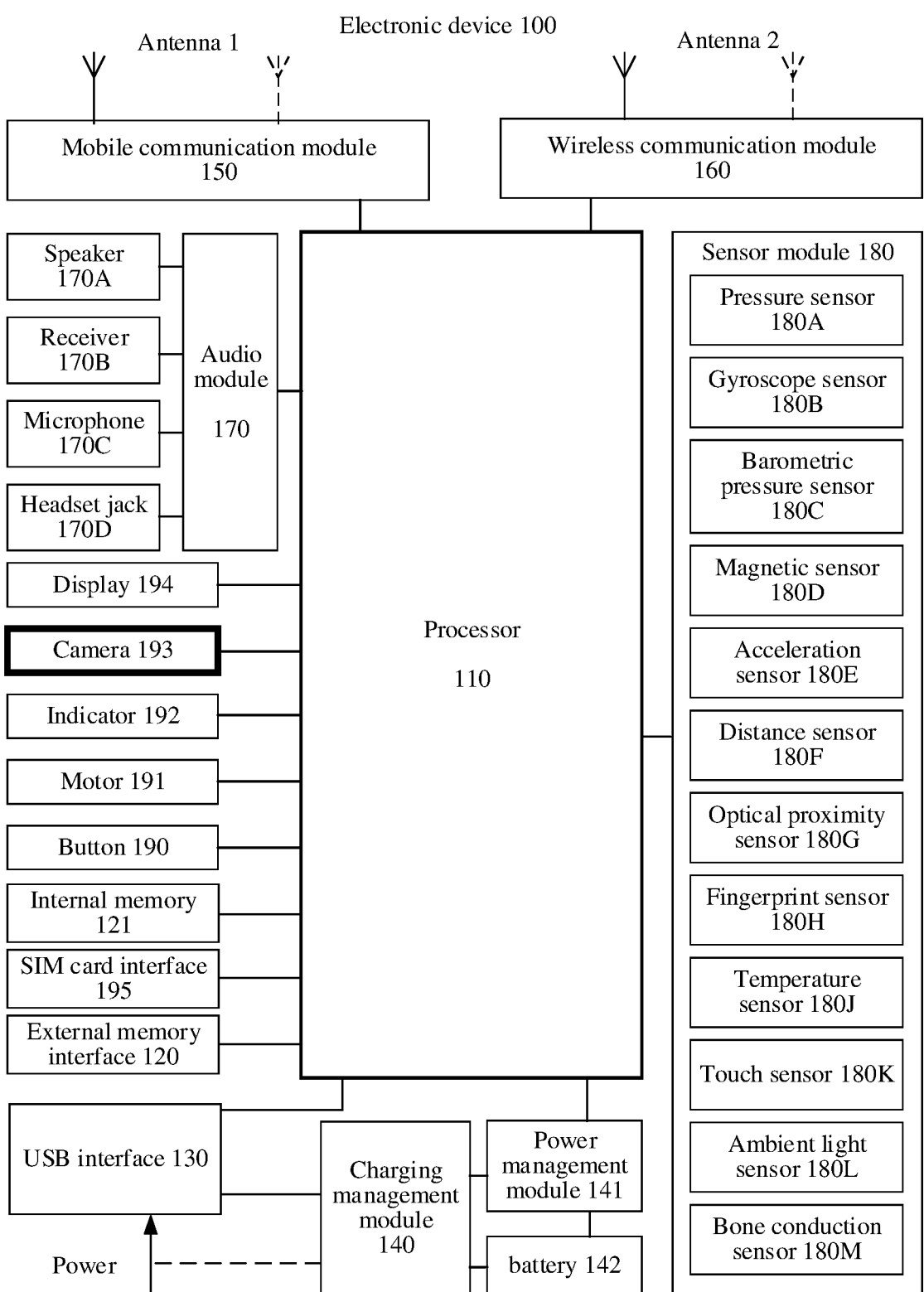
FIG. 1 is a schematic diagram of a hardware system of an electronic device applicable to this application.

FIG. 1 shows a hardware system of an electronic device applicable to this application.

The electronic device 100 may be a mobile phone, a smart screen, a tablet computer, a wearable electronic device, an on-board electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that, the structure shown in FIG. 1 does not constitute a specific limitation on the electronic device 100. In some other embodiments of this application, the electronic device 100 may include more or fewer components than the components shown in FIG. 1, or the electronic device 100 may include a combination of some of the components shown in FIG. 1, or the electronic device 100 may include subcomponents of some of the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be integrated devices. The controller may generate an operation control signal based on instruction operation code and a timing signal, to control instruction fetch and instruction execution.

A memory may be further arranged in the processor 110, which is configured to store instructions and data. In some embodiments, the memory in the processor 110 is a cache. The memory may store instructions or data recently used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

For example, the processor 110 may be configured to perform the camera switching method in embodiments of this application. For example, the processor may be configured to: enable a camera application; display a first image, where the first image is captured when a first camera serves as a main camera for image capturing; determine that a first parameter and a second parameter satisfy a first preset condition, where the first parameter indicates distance information between the electronic device and a target object, the first parameter is a parameter from the camera module, the target object is a to-be-photographed object in the first image, and the second parameter indicates a zoom ratio of the electronic device; and display a second image, where the second image is captured when the second camera serves as the main camera for image capturing.

A connection relationship between the modules shown in FIG. 1 is merely an example for description, and does not constitute a limitation on the connection relationship between the modules of the electronic device 100. Optionally, the modules of the electronic device 100 may use a combination of a plurality of connection manners in the above embodiments.

A wireless communication function of the electronic device 100 may be implemented through devices such as the antenna 1, the antenna 2, the mobile communication module 150, the wireless communication module 160, the modem processor, and the baseband processor.

The antenna 1 and the antenna 2 are configured to transmit and receive an electromagnetic wave signal. Each antenna of the electronic device 100 may be configured to cover one or more communication frequency bands. Different antennas may be multiplexed to improve utilization of the antennas. For example, the antenna 1 may be multiplexed as a diversity antenna of a wireless local area network. In some other embodiments, the antennas may be used with a tuning switch.

The electronic device 100 may implement a display function through the GPU, the display 194, and the application processor. The GPU is a microprocessor for image processing and is connected to the display 194 and the application processor. The GPU is configured to perform mathematical and geometric calculations and graphics rendering. The processor 110 may include one or more GPUs, and is configured to execute program instructions to generate or change display information.

The display 194 may be configured to display an image or a video.

For example, in this embodiment of this application, the display 194 may be configured to display the second image.

The electronic device 100 may implement a photographing function through the ISP, the camera 193, the video codec, the GPU, the display 194, the application processor, and the like.

The ISP is configured to process data fed back by the camera 193. For example, during photographing, a shutter is enabled. Light is transmitted to a photosensitive element of the camera through a camera, and an optical signal is converted into an electrical signal. The photosensitive element of the camera transmits the electrical signal to the ISP for processing, and the electrical signal is converted into an image visible to a naked eye. The ISP may perform algorithm optimization for noise, a brightness, and a color of the image. The ISP may further optimize parameters such as an exposure and a color temperature of a to-be-photographed scene. In some embodiments, the ISP may be arranged in the camera 193.

The camera 193 (or referred to as a lens) is configured to capture a still image or a video. The camera may be enabled through triggering by an application instruction to implement a photographing function, such as capturing an image of any scene. The camera may include components such as an imaging lens, a light filter, and an image sensor. A light emitted or reflected by an object enters the imaging lens, passes through the light filter, and finally converges on the image sensor. The imaging lens is mainly configured to converge light emitted or reflected by all objects in a photographing perspective (or referred to as a to-be-photographed scene or a target scene, or may be understood as a scene image that a user wants to take a photograph) for imaging. The light filter is mainly configured to filter out excess light waves (for example, light waves other than visible lights, such as an infrared light) in the light. The image sensor may be a charge coupled device (charge coupled device, CCD) or a complementary metal-oxide-semiconductor (complementary metal-oxide-semiconductor, CMOS) phototransistor. The image sensor is mainly configured to perform optical-to-electrical conversion on a received optical signal, to convert the optical signal into an electrical signal, and then transmit the electrical signal to the ISP to convert the electrical signal into a digital image signal. The ISP outputs the digital image signal to the DSP for processing. The DSP converts the digital image signal into an image signal in a standard format such as RGB or YUV.

In some embodiments, the electronic device 100 may include 1 or N cameras 193. N is a positive integer greater than 1.

The camera 193 may be located on a front of the electronic device 100 or may be located on a back of the electronic device 100. A specific quantity and arrangement of cameras may be set as required, which are not limited in this application.

For example, the electronic device 100 includes a front camera and a rear camera. For example, the front camera or the rear camera each may include 1 or more cameras. For example, the electronic device 100 has 4 rear cameras. When the electronic device 100 enables the 4 rear cameras for photographing, the camera switching method provided in this embodiment of this application may be used.

Alternatively, the cameras are arranged on an external component of the electronic device 100. The external component may be rotatably connected to a frame of a mobile phone. An angle formed between the external component and the display 194 of the electronic device 100 is any angle from 0 degrees to 360 degrees. For example, when the electronic device 100 is used to take a selfie, the external component drives the cameras to rotate to face a user. Certainly, when a mobile phone has a plurality of cameras, only some of the cameras may be arranged on the external component, and remaining cameras may be arranged on a body of the electronic device 100. This is not limited in this embodiment of this application.

The digital signal processor is configured to process a digital signal. In addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The gyroscope sensor 180B may be configured to determine a motion pose of the electronic device 100. In some embodiments, an angular velocity of the electronic device 100 around three axes (that is, x, y, and z axes) may be determined through the gyroscope sensor 180B. The gyro sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and causes the lens to offset the jitter of the electronic device 100 through reverse motion, thereby implementing image stabilization. The gyroscope sensor 180B may be further used for scenarios such as navigation and a somatosensory game.

The acceleration sensor 180E may detect magnitudes of accelerations of the electronic device 100 in all directions (generally, on the x, y, and z axes). When the electronic device 100 is stationary, a magnitude and a direction of a gravity may be detected. The acceleration sensor 180E may be further configured to recognize a pose of the electronic device 100, which is used as an input parameter for an application such as landscape/portrait screen switching and a pedometer.

The distance sensor 180F is configured to measure a distance. The electronic device 100 may measure a distance through infrared light or laser. In some embodiments, for example, in a to-be-photographed scene, the electronic device 100 may measure a distance by using the distance sensor 180F, to implement quick focusing.

The ambient light sensor 180L is configured to perceive ambient light brightness. The electronic device 100 may adaptively adjust a brightness of the display 194 based on the perceived ambient light brightness. The ambient light sensor 180L may be further configured to automatically adjust white balance during photographing. The ambient light sensor 180L may further cooperate with the optical proximity sensor 180G to detect whether the electronic device 100 is in a pocket to prevent an accidental touch.

The fingerprint sensor 180H is configured to acquire a fingerprint. The electronic device 100 may implement functions such as unlocking, application lock accessing, photographing, and call answering by using a characteristic of the acquired fingerprint.

The touch sensor 180K is also referred to as a touch device. The touch sensor 180K may be arranged on the display 194. The touch sensor 180K and the display 194 form a touchscreen, which is also referred to as a touch control screen. The touch sensor 180K is configured to detect a touch operation performed on or near the touch sensor. The touch sensor 180K may transmit the detected touch operation to the application processor, to determine a type of the touch event. A visual output related to the touch operation may be provided through the display 194. In some other embodiments, the touch sensor 180K may be alternatively arranged on a surface of the electronic device 100 at a position different from that of the display 194.

The hardware system of the electronic device 100 is described in detail above. A software system of electronic device 100 is described below.

Figure 2:
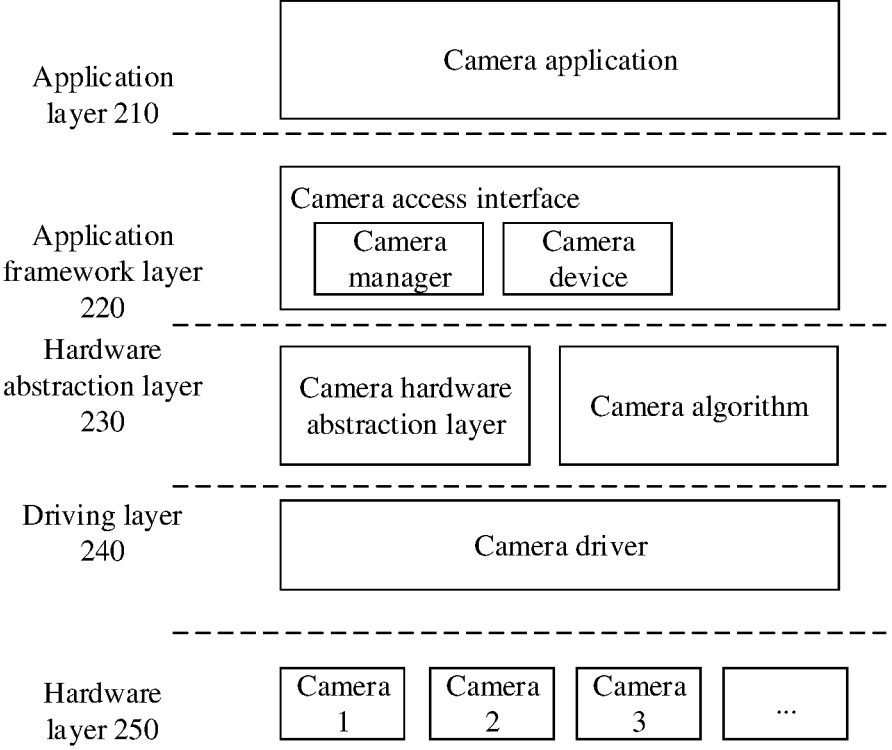
FIG. 2 is a schematic diagram of a software system of an electronic device applicable to this application.

FIG. 2 is a schematic diagram of a software system of an electronic device according to an embodiment of this application.

As shown in FIG. 2, a system architecture may include an application layer 210, an application framework layer 220, a hardware abstraction layer 230, a driver layer 240, and a hardware layer 250.

The application layer 210 may include applications such as Camera, Photos, Calendar, Phone, Maps, Navigation, WLAN, Bluetooth, Music, Videos, and Messages.

The application framework layer 220 provides an application programming interface (application programming interface, API) and a programming framework for an application in the application layer. The application framework layer may include some predefined functions.

For example, the application framework layer 220 may include a camera access interface. The camera access interface may include a camera manager and a camera device. The camera manager may be configured to provide an access interface for managing the camera. The camera device may be configured to provide an interface for accessing the camera.

The hardware abstraction layer 230 is used for abstraction of hardware. For example, the hardware abstraction layer may include a camera abstraction layer and another hardware device abstraction layer. The camera hardware abstraction layer may invoke a camera algorithm.

For example, the hardware abstraction layer 230 includes the camera hardware abstraction layer and the camera algorithm. The camera algorithm may include the software algorithm for camera switching provided in embodiments of this application.

For example, a camera algorithm library may include an algorithm corresponding to the camera switching method provided in embodiments of this application.

For example, the algorithm in the camera algorithm may be an algorithm that may be implemented without relying on specific hardware, for example, code that usually may be run in a CPU.

The driver layer 240 is configured to provide drive for different hardware devices. For example, the driver layer may include a camera driver.

The hardware layer 250 is located at a lowest layer of an operating system. As shown in FIG. 2, the hardware layer 250 may include a camera 1, a camera 2, a camera 3, and the like. The camera 1, the camera 2, and the camera 3 may be a plurality of cameras on the electronic device.

For ease of understanding, a camera and an interface on the electronic device 100 to which the camera switching method provided in embodiments of this application is applicable are first described in detail below by using an example that the electronic device 100 is a mobile phone with the above software and hardware structures.

The camera switching method provided in embodiments of this application is applicable to an electronic device that has at least a plurality of cameras 193, for example, three types of cameras 193. The three types of cameras include a main camera (for example, a wide angle camera), an ultra wide camera, and a telephoto camera. The three types of cameras may be configured to take a photograph of a same to-be-photographed scene.

Optionally, the electronic device 100 may have another camera 193, and the types of the cameras 193 and a quantity of cameras 193 of each type may be set as required, which are not limited in this embodiment of this application.

Figures 3A, 3B, 4:
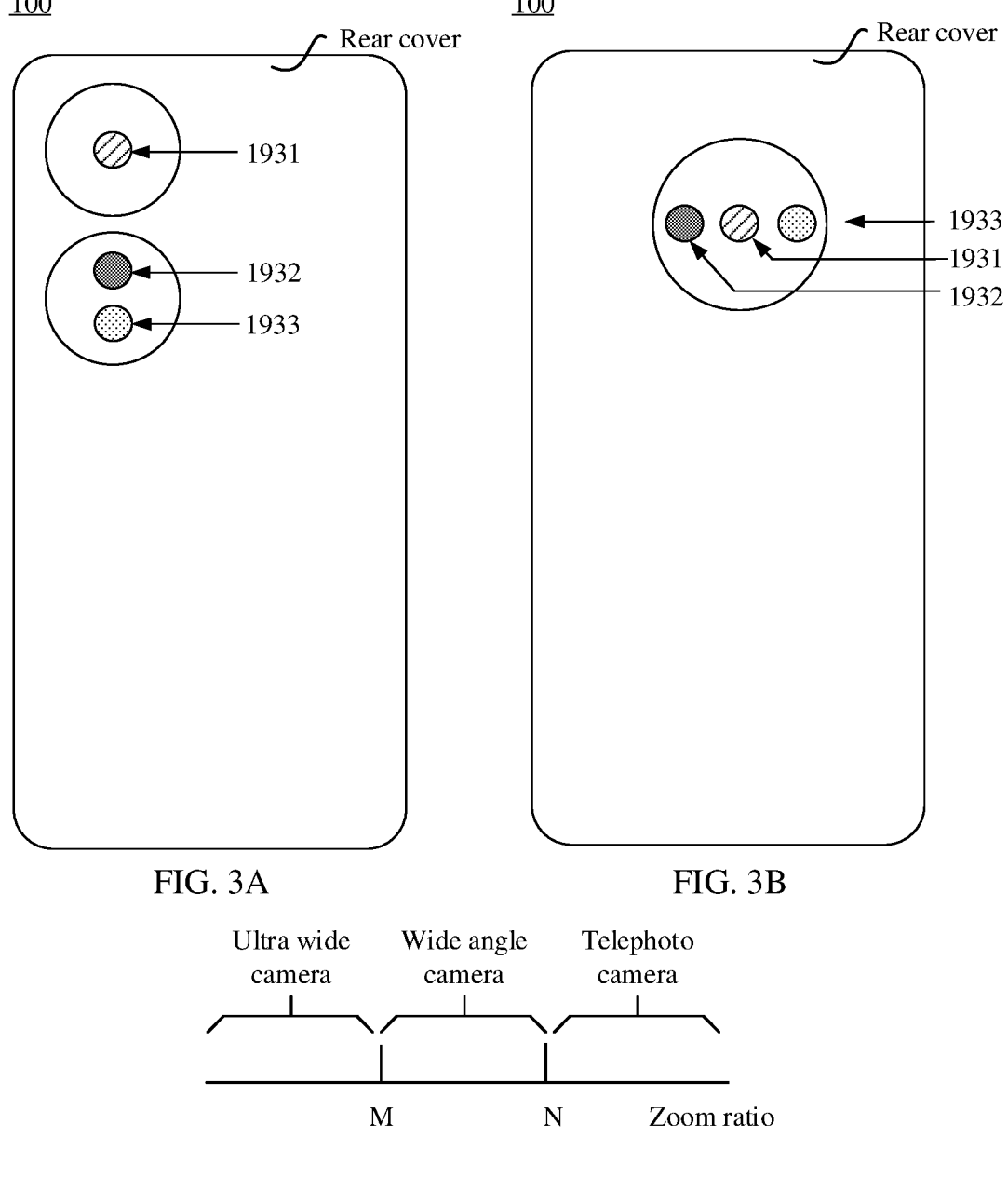
FIG. 3A and FIG. 3B are schematic arrangement diagrams of a plurality of cameras on an electronic device according to an embodiment of this application.
FIG. 4 is a schematic diagram of zoom ratios corresponding to different types of cameras according to an embodiment of this application.

For example, as shown in FIG. 3A and FIG. 3B, the electronic device 100 may have three cameras 193. An arrangement of the three cameras may be shown in FIG. 3A, or shown in FIG. 3B. For example, the three cameras 193 include a main camera 1931 (for example, a wide angle camera), an ultra wide camera 1932, and a telephoto camera 1933.

It should be understood that the above two arrangements are merely examples, and another arrangement may also be used. A specific arrangement may be designed and changed as required, which is not limited in this embodiment of this application.

It should be noted that, during photographing by the three cameras, a field of view range corresponding to the main camera 1931 is usually greater than a field of view range corresponding to the telephoto camera 1933, a field of view range corresponding to ultra wide camera 1932 is greater than the field of view range corresponding to the main camera 1931, and a field of view of the ultra wide camera 1932 may overlap with a field of view of the main camera 1931, that is, the ultra wide camera 1932 may take a photograph of a scene content and a surrounding scene content for which the main camera 1931 takes a photograph.

It should be understood that the field of view range corresponding to the telephoto camera 1933 is less than the field of view range corresponding to the main camera 1931, and the field of view of the main camera 1931 may overlap with a field of view of the telephoto camera 1933, that is, the main camera 1931 may take a photograph of a scene content and a surrounding scene content for which the telephoto camera 1933 takes a photograph. The field of view of the ultra wide camera 1932 may overlap with the field of view of the telephoto camera 1933, that is, the ultra wide camera 1932 may take a photograph of the scene content and the surrounding scene content for which the telephoto camera 1933 takes a photograph.

The ultra wide camera 1932 has a relatively small focusing distance, and therefore is suitable for photographing of a short-range scene. In addition, as the name suggests, the ultra wide camera 1932 is suitable for photographing of a scene with a large field of view. The main camera 1931 has a relatively high resolution, and therefore is relatively suitable for capturing a portrait. The telephoto camera 1933 is relatively suitable for capturing a closeup of a long-range scene.

For example, as shown in FIG. 4, a zoom ratio of the ultra wide camera may be less than a zoom ratio of M. A zoom ratio range of the wide angle camera, that is, the main camera, may be [M, N). A zoom ratio of the telephoto camera may be greater than or equal to a zoom ratio of N.

For example, M may be 1, and N may be 3.5. A zoom ratio of the ultra wide camera is less than a zoom ratio of 1 (1×). The zoom ratio range of the wide angle camera is from the zoom ratio of 1 to the zoom ratio of 3.5 [1× to 3.5×). The zoom ratio of the telephoto camera is greater than or equal to the zoom ratio of 3.5.

It should be understood that, during photographing of the electronic device, a larger zoom ratio indicates a smaller corresponding field of view.

Currently, the electronic device usually determines distance information between the electronic device and a to-be-photographed object through a laser sensor in the electronic device. Through the distance information between the electronic device and the to-be-photographed object, automatic switching between different cameras in the electronic device can be implemented. For example, when the electronic device enters a camera application, a camera for photographing may be a wide angle camera by default. When the laser sensor in the electronic device detects that the electronic device is relatively close to the to-be-photographed object, the electronic device may switch from the wide angle camera to the ultra wide camera, to capture a clear image. However, a current camera switching method relies on the laser sensor in the electronic device. Therefore, an electronic device without the laser sensor cannot implement automatic switching between different cameras in the electronic device.

In view of this, an embodiment of this application provides a camera switching method. The electronic device may obtain a first parameter (for example, a code value) and a second parameter without relying on a laser sensor of an electronic device. In a case that it is determined that the first parameter and the second parameter satisfy a first preset condition, automatic switching between different cameras in the electronic device is implemented, thereby improving photographing experience of users and improving image quality. For example, in a short-range photographing scenario, the electronic device may automatically switch to an ultra wide camera as a main camera, thereby increasing a field of view of the electronic device. Since the field of view of the electronic device is increased, the electronic device acquires more image information of a to-be-photographed object, so that an image resolution can be increased. In a long-range photographing scenario, the electronic device may automatically switch to a telephoto camera as the main camera, so that the electronic device can obtain more image details.

The application scenario of the camera switching method provided in this embodiment of this application is described below by using examples with reference to FIG. 5A and FIG. 5B.

The camera switching method in this embodiment of this application is applicable to a photographing scenario (for example, a single-scene photographing scenario, or a dual-scene photographing scenario), a preview scenario, a video-recording scenario, a video call scenario, or the like. Through the camera switching method provided in this embodiment of this application, automatic switching between different cameras in the electronic device can be implemented based on an obtained lens position and zoom value without relying on a laser sensor in the electronic device, thereby improving photographing experience of users and improving image quality.

For example, the preview scenario includes but is not limited to the following scenarios:

photo preview, aperture preview, night view preview, portrait preview, video preview, or professional preview.

It should be understood that the preview scenario may be a scenario in which the electronic device captures an image before tapping a button indicating photographing in a specific photographing mode.

In an example, after entering the camera application, the electronic device may enable a default photo camera mode. In the photo camera mode, the electronic device may enter a default photographing mode. The default photographing mode may be a photographing mode in which a wide angle camera serves as the main camera and a zoom ratio is a zoom ratio of 1 (1×). The default photographing mode is a non-super macro focus mode. In the non-super macro mode, a distance parameter (for example, a code value) and a zoom ratio (for example, a zoom value) of the electronic device may be obtained. When the distance parameter satisfies a first preset threshold and the zoom ratio satisfies the second preset range, the electronic device may switch to the ultra wide camera for image capturing.

For example, the camera switching method in this embodiment of this application is further applicable to a video call scenario. The video call scenario may include but is not limited to the following portrait photographing scenarios, such as:

a video call, a video conference application, a long/short video application, a video livestreaming application, an online video course application, an application scenario in which intelligent camera movement is performed for portrait photography, recording a video by using a recording function of a system camera, video monitoring, or intelligent cat eye.

It should be understood that the above is an example of the application scenario, and does not constitute any limitation on the application scenario of this application.

In an example, as shown in FIG. 5A, a to-be-photographed scene includes a first to-be-photographed object 260 and a second to-be-photographed object 270. A distance between the first to-be-photographed object 260 and an electronic device 100 is d1, and a distance between the second to-be-photographed object and the electronic device is d2. d2 is less than d1. FIG. 6 is a side view of the to-be-photographed scene. The electronic device 100 includes a camera module 272. During the photographing, a position of the electronic device 100 remains unchanged.

The electronic device 100 enables a camera application. At a first moment, the electronic device 100 aligns at the first to-be-photographed object 260 for focusing, and may display a display interface 280. In this case, a zoom ratio of the electronic device 100 is a zoom ratio of 1. As shown in FIG. 5B, at a second moment, the electronic device 100 maintains the zoom ratio of 1 and switches to another to-be-photographed subject. For example, when the electronic device 100 aligns at the second to-be-photographed object 270 for focusing, if the electronic device 100 recognizes that the second to-be-photographed object 270 is relatively close to the electronic device 100, the electronic device 100 may enter a super macro mode, automatically switch to the ultra wide camera as the main camera for focusing, and display a display interface 290.

Figure 10A:
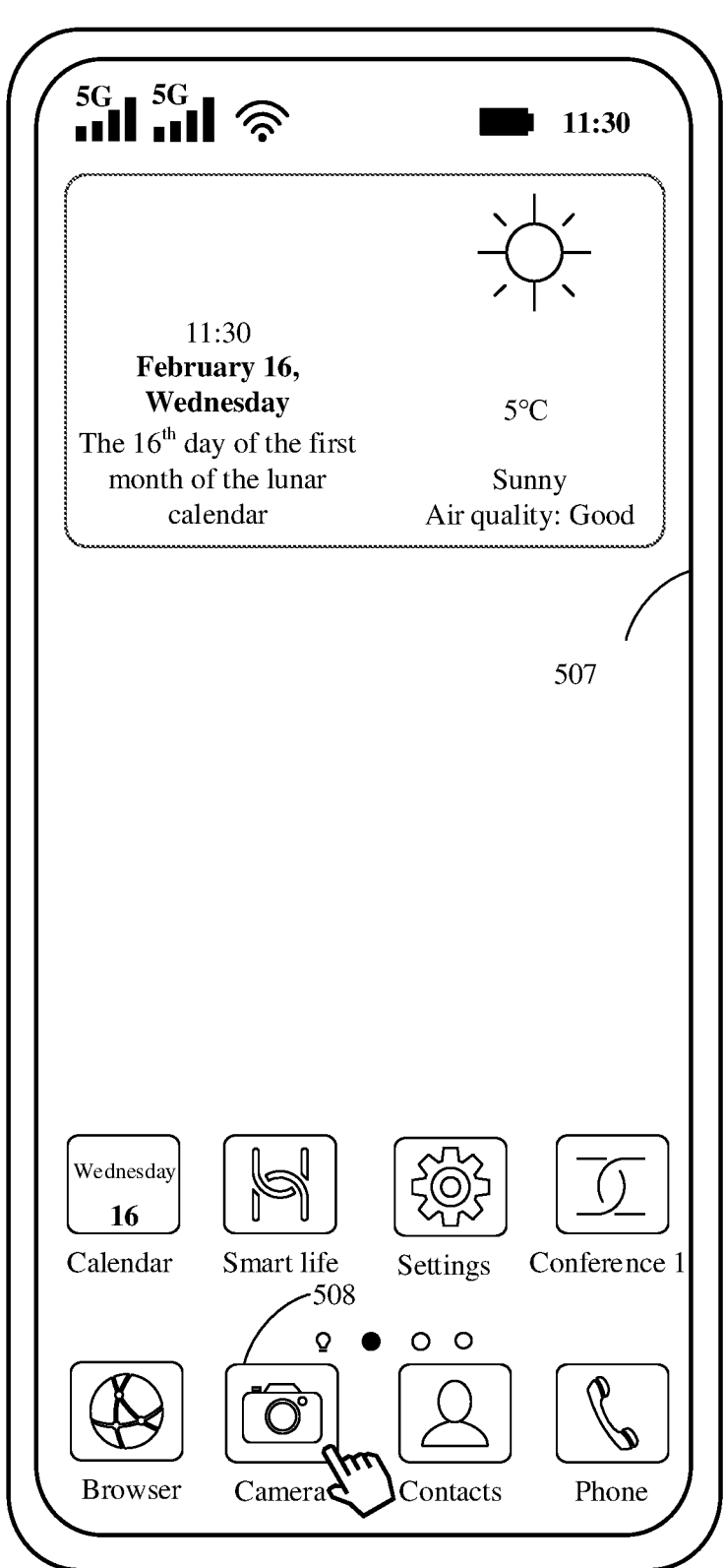
FIG. 10A, FIG. 10B, FIG. 10C, FIG. 10D, FIG. 10E, and FIG. 10F are schematic diagrams of another graphical user interface according to an embodiment of this application.
Figure 10B:
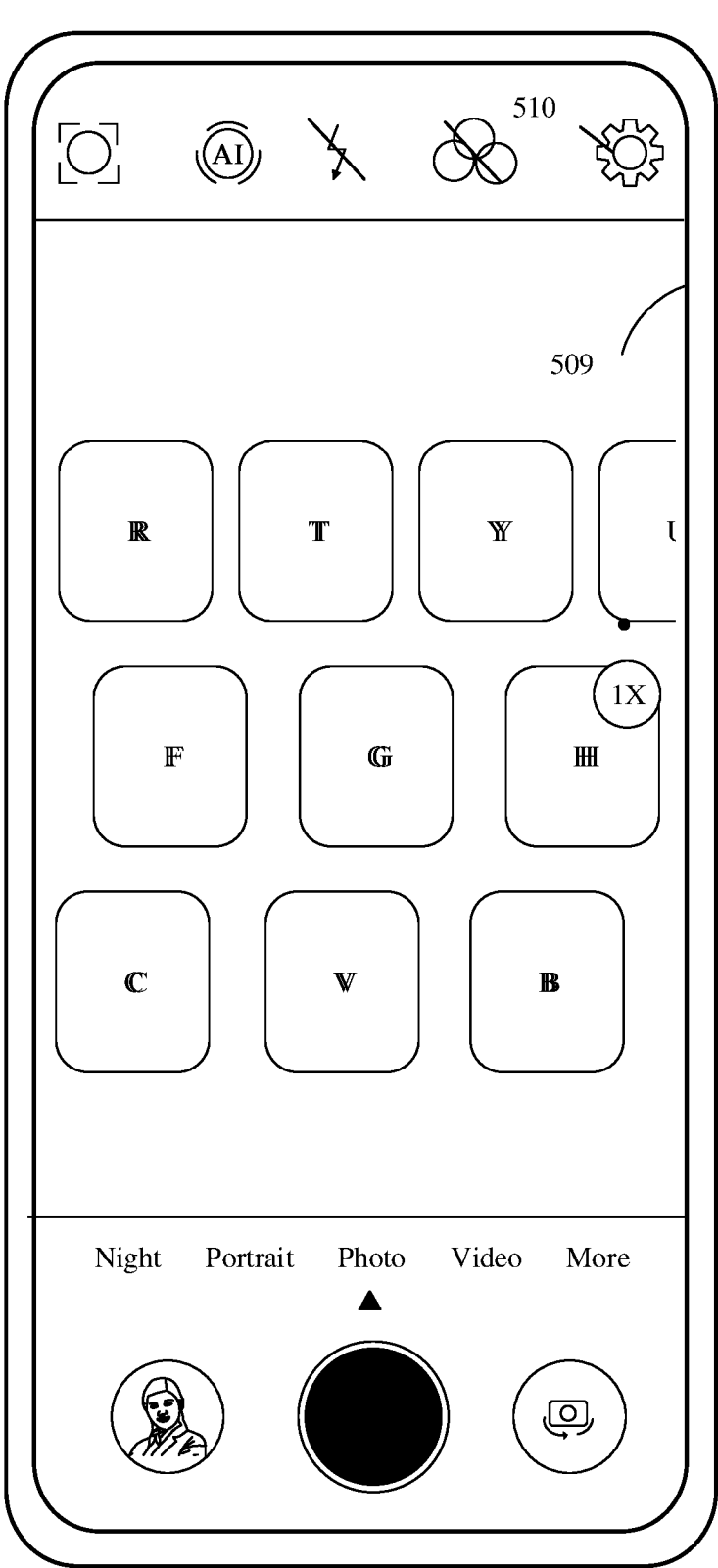

It should be noted that, assuming that at the first moment, that is, when the electronic device 100 aligns at the first to-be-photographed object 260 for focusing, the wide angle camera in the electronic device 100 serves as the main camera, if the electronic device 100 does not enable the super macro mode at the second moment, that is, when the electronic device 100 aligns at the second to-be-photographed object 270 for focusing, the wide angle camera still serves as the main camera, a display interface of the electronic device 100 is shown in FIG. 10B. Since the second to-be-photographed object 270 is relatively close to the electronic device 100, a position of the second to-be-photographed object 270 may be outside an effective range in which the wide angle camera can implement accurate focusing, resulting in a low definition of a captured preview image. In the camera switching method provided in this embodiment of this application, when the electronic device 100 recognizes that the electronic device is relatively close to the second to-be-photographed object 270, the electronic device 100 may automatically enter the super macro mode. That is to say, the electronic device may automatically use the ultra wide camera as the main camera without a user operation, and display the display interface 290 shown in FIG. 5B.

In the camera switching method provided in this embodiment of this application, the electronic device may automatically switch the main camera (for example, switch from the wide angle camera as the main camera to the ultra wide camera as the main camera) without relying on a laser sensor in the electronic device, thereby increasing a field of view of the electronic device. Since the field of view of the electronic device is increased, the electronic device acquires more image information of a to-be-photographed object, so that an image resolution can be increased.

The camera switching method provided in this embodiment of this application is described below in detail with reference to FIG. 7 to FIG. 17A and FIG. 17B.

Figure 7:
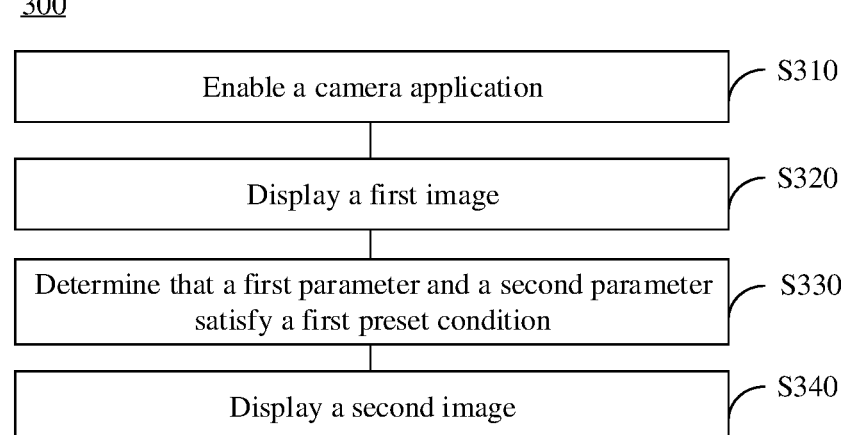
FIG. 7 is a schematic flowchart of a camera switching method according to an embodiment of this application.

FIG. 7 is a schematic flowchart of a camera switching method according to an embodiment of this application. The method may be performed by the electronic device shown in FIG. 1. A method 300 includes step S310 to step S340. Step S310 to step S340 are respectively described below in detail.

It should be understood that, in this embodiment of this application, the electronic device includes a camera module. The camera module includes a first camera and a second camera. The first camera and the second camera are cameras of different types.

Step S310: Enable a camera application.

Figure 9A:
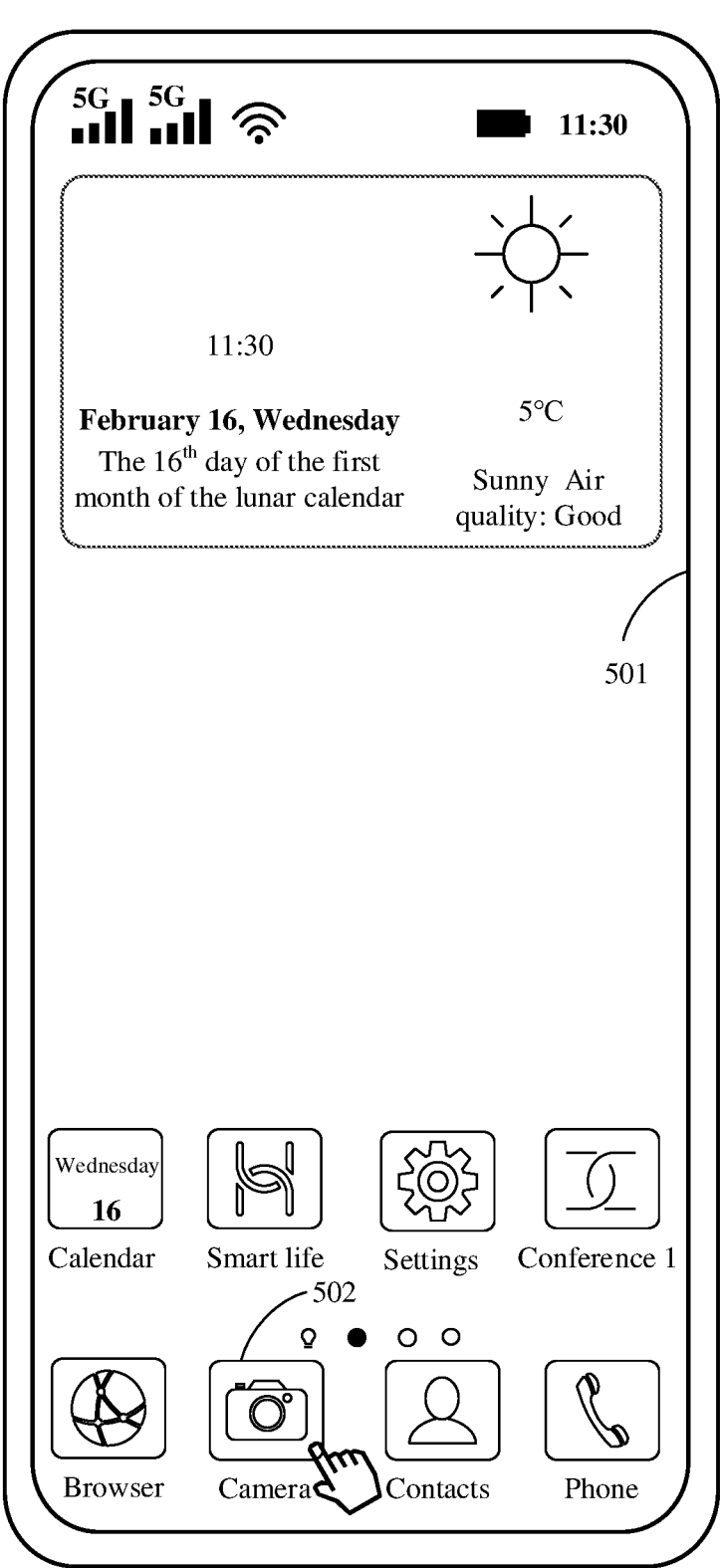
FIG. 9A, FIG. 9B, FIG. 9C, and FIG. 9D are schematic diagrams of a graphical user interface according to an embodiment of this application.
Figure 11A:
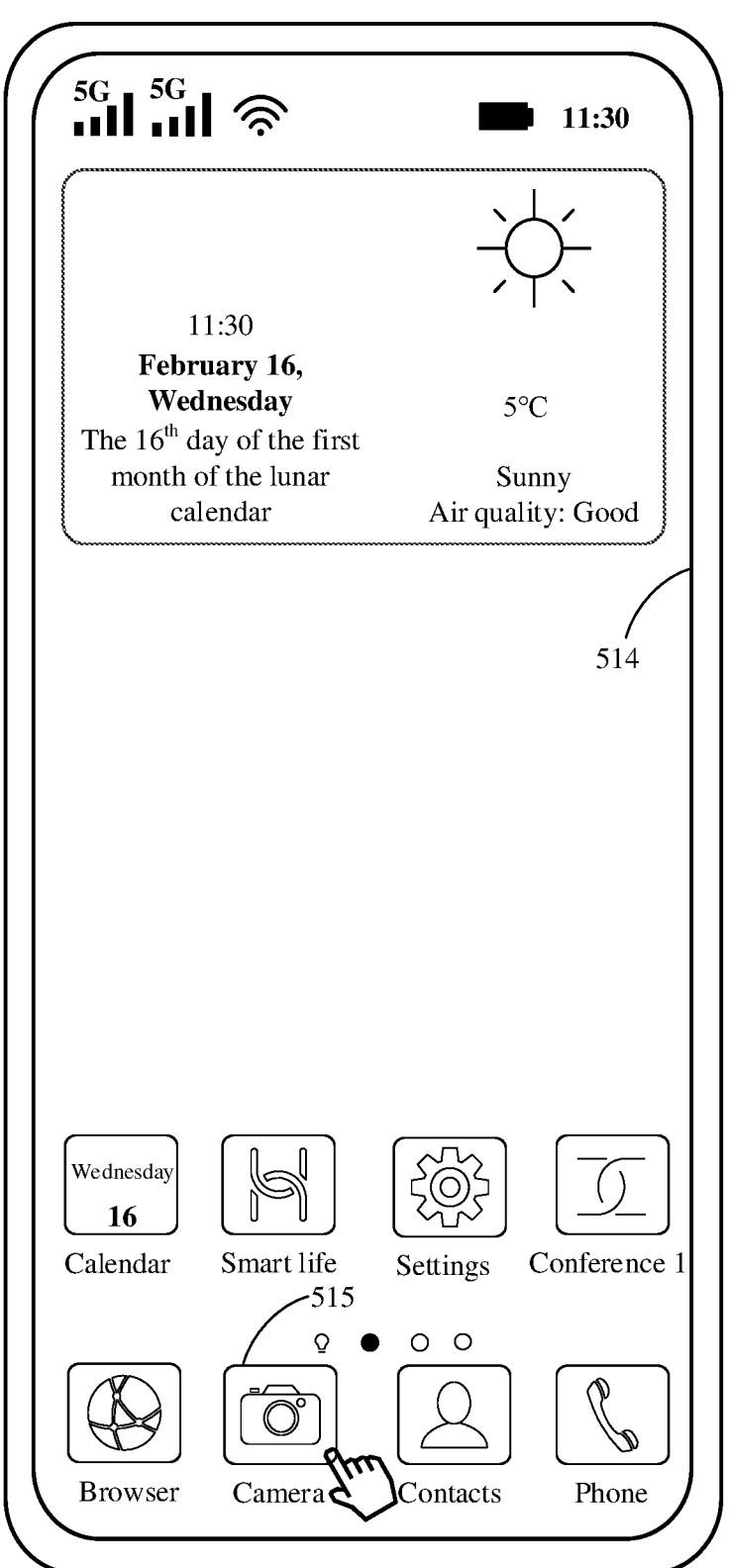
FIG. 11A, FIG. 11B, FIG. 11C, and FIG. 11D are schematic diagrams of another graphical user interface according to an embodiment of this application.

For example, a user may indicate the electronic device to enable the camera application by tapping an icon of the "camera" application, for example, as shown in FIG. 9A, or as shown in FIG. 10A, or as shown in FIG. 11A.

For example, when the electronic device is in a screen-locked state, the user may indicate the electronic device to enable the camera application through a rightward swipe gesture on a display of the electronic device. Alternatively, when the electronic device is in the screen-locked state, and the screen-locked interface includes the icon of the camera application, the user may indicate the electronic device to enable the camera application by tapping the icon of the camera application. Alternatively, when the electronic device is running another application, and the application has a permission to invoke the camera application, the user may indicate the electronic device to enable the camera application by tapping a corresponding control. For example, when the electronic device is running an instant messaging application, the user may indicate the electronic device to enable the camera application by selecting a camera function control.

It should be understood that the above is an example of the operation of enabling the camera application. The electronic device may alternatively be indicated through a voice instruction operation or another operation to enable camera application. This is not limited in this application.

It should be further understood that the enabling of the camera application may be running the camera application.

Step S320: Display a first image.

The first image is captured when the first camera serves as a main camera for image capturing.

It should be understood that the electronic device may include a plurality of cameras. For example, the plurality of cameras may include a main camera and an auxiliary camera. During image capturing, the electronic device usually uses the image captured by the main camera as a reference for processing. During the processing, partial image information acquired by the auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

For example, the main camera may be a main camera of the electronic device in a single-camera mode, a main camera of the electronic device in a dual-camera mode, or a main camera of the electronic device in a multi-camera mode.

It should be understood that types of cameras of the electronic device in the single-camera mode, the dual-camera mode, and the multi-camera mode are not limited in this application.

Figure 11B:
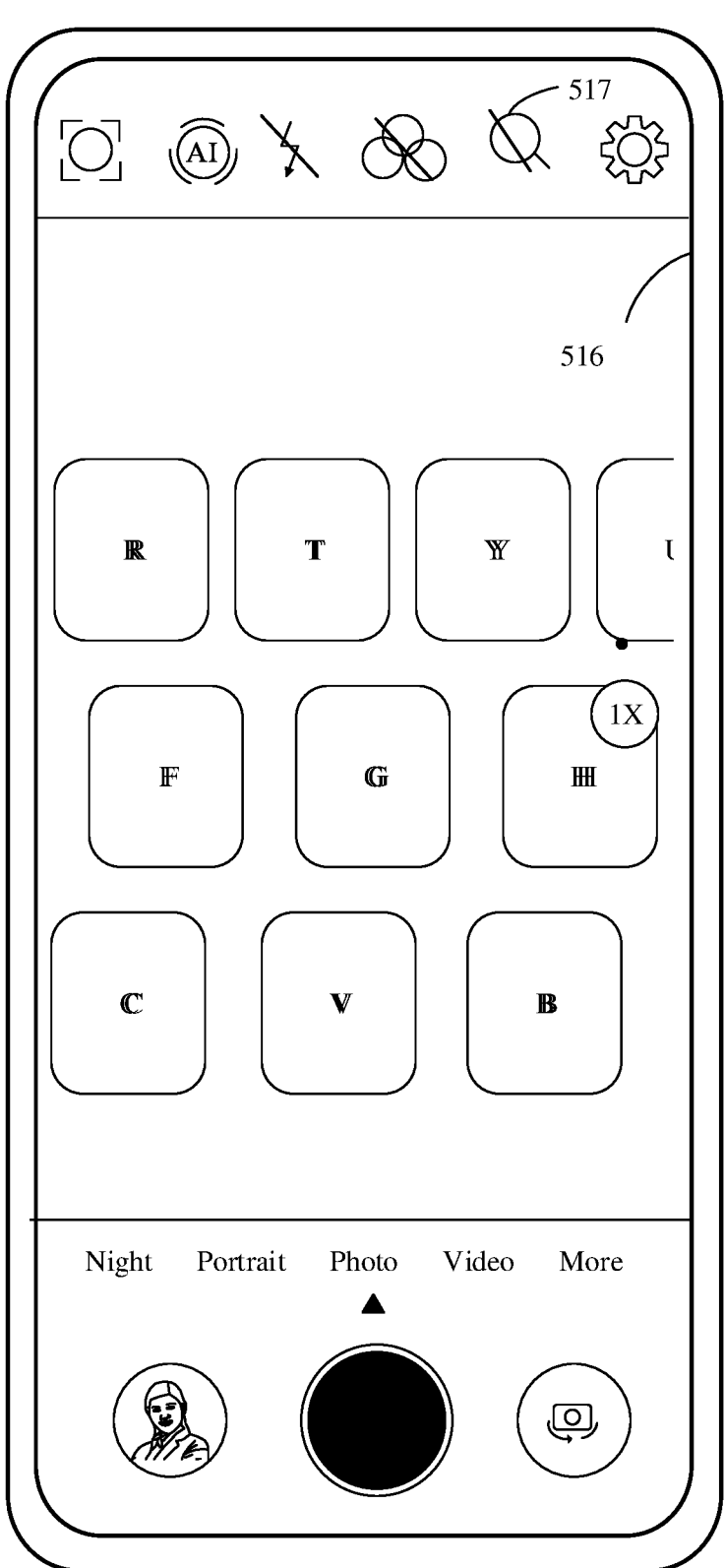
Figure 12A:
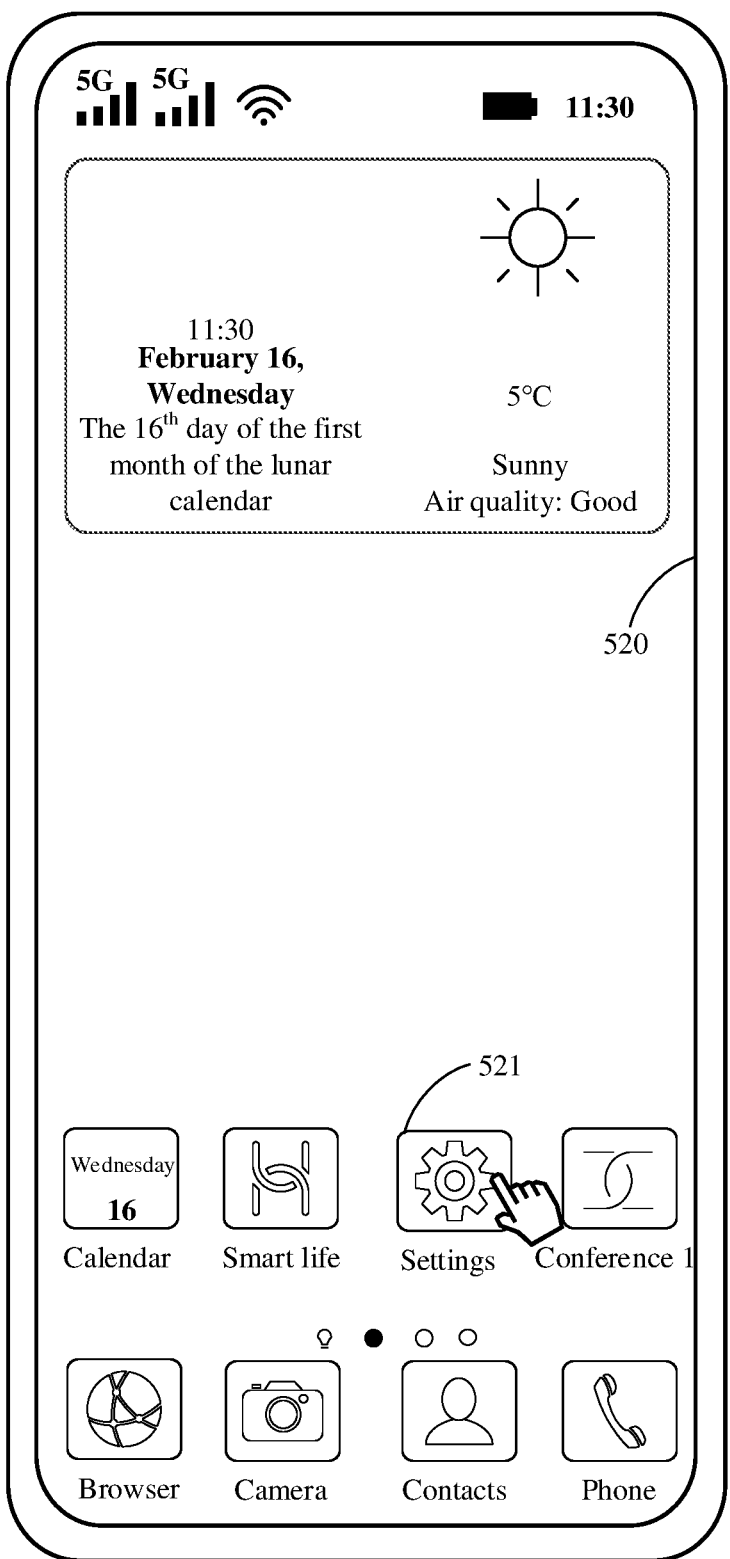
FIG. 12A, FIG. 12B, FIG. 12C, FIG. 12D, FIG. 12E, FIG. 12F, FIG. 12G, and FIG. 12H are schematic diagrams of another graphical user interface according to an embodiment of this application.
Figure 12B:
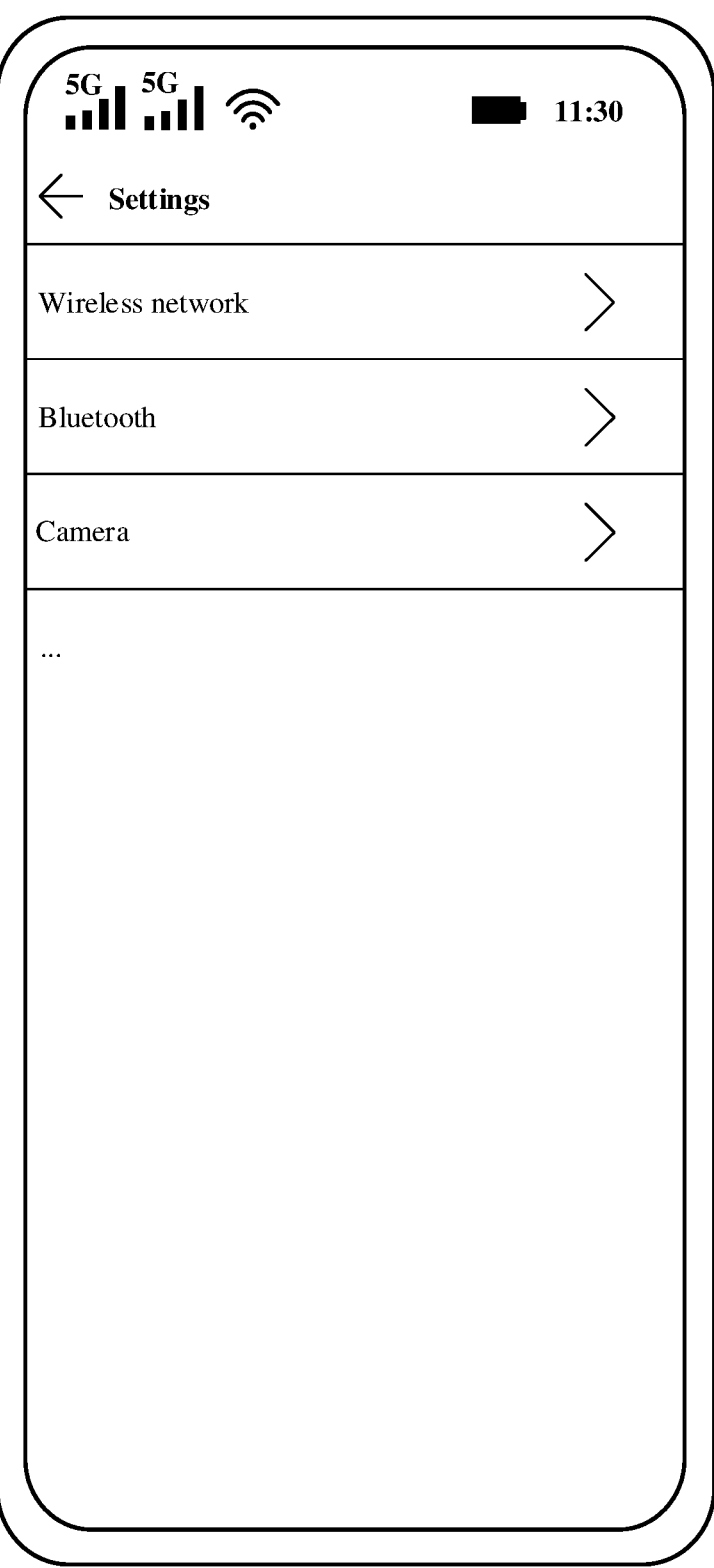

In an example, the displayed first image may be a preview image shown in FIG. 11B, or the displayed first image may be a preview image shown in FIG. 12B.

Step S330: Determine that a first parameter and a second parameter satisfy a first preset condition.

The first parameter may indicate distance information between the electronic device and a target object, the first parameter is a parameter from the camera module, the target object is a to-be-photographed object in the first image, the to-be-photographed object may also be referred to as a to-be-photographed subject, and the second parameter indicates a zoom ratio of the electronic device.

For example, during photographing of the electronic device, a to-be-photographed scene may include a to-be-photographed subject area and a background area. A to-be-photographed subject in the to-be-photographed scene may be determined first. The to-be-photographed subject is a to-be-photographed object in the to-be-photographed scene.

The to-be-photographed subject may be determined by using an existing technology, or may be determined through tapping on the screen by the user. This is not limited in this application. The distance between the electronic device and the to-be-photographed object may be a distance between the electronic device and a focal point of the to-be-photographed object after the electronic device completes focusing.

Optionally, the first parameter may be a parameter of the camera module.

For example, the first parameter may be a distance parameter of the camera module. For example, the first parameter may be a distance parameter of the first camera.

It should be understood that the distance parameter may indicate distance information between a lens and a sensor in the electronic device. For example, a larger distance parameter indicates a larger distance between the lens and the sensor, that is, may indicate a smaller distance between the electronic device and the to-be-photographed object. A smaller distance parameter indicates a smaller distance between the lens and the sensor, that is, may indicate a larger distance between the electronic device and the to-be-photographed object. It should be understood that the distance parameter may be referred to as a "code value", or the distance parameter may be referred to as a lens position (lens position).

Optionally, the first parameter may be a distance parameter of the second camera.

For example, in this embodiment of this application, the code value may indicate a magnitude of a current. Based on the magnitude of the current, a magnitude of a magnetic field may be determined, thereby determining a distance parameter between the electronic device and the to-be-photographed object. That is to say, based on the obtained magnitude of the current of the camera module, a current value may be mapped to any value between 0 and 1024, thereby indicating the distance information between the electronic device and the to-be-photographed object.

Optionally, the second parameter may be the zoom ratio of the electronic device, that is, a zoom value.

For example, the determination that the first parameter and the second parameter satisfy the first preset condition includes:

determining that the first parameter is greater than a first preset threshold and the second parameter satisfies a second preset range, where the first preset threshold indicates distance information between the camera module and a sensor in the electronic device, and the second preset range indicates a zoom range of the camera module.

For example, it is assumed that the first preset threshold is 0.15 mA and the second preset range is 1× to 2×. If the obtained first parameter is 0.2 mA, and the obtained second parameter is 1.2×, it means that the first parameter and the second parameter satisfy the first preset condition.

For example, the second preset range is determined based on a zoom ratio corresponding to the first camera.

For example, as shown in FIG. 4, the second preset range may be determined based on a zoom ratio of M and a zoom ratio of N corresponding to a wide angle camera. A range corresponding to the second preset range may be between [M, N).

In an example, the main camera is the wide angle camera. If a zoom ratio corresponding to the wide angle camera is a zoom ratio of 1 (1×) to a zoom ratio of 3.5 (3.5×), the second preset range may be in a range of 1× to 2×.

In an example, the main camera is the wide angle camera. If the zoom ratio corresponding to the wide angle camera a zoom ratio of 0.8 (0.8×) to a zoom ratio of 3.5 (3.5×), the second preset range may be in a range of 0.8× to 1.5×.

Optionally, for specific implementation steps, refer to step S404 to step S406 shown below in FIG. 8.

In this embodiment of this application, since the electronic device may not include a laser sensor, the electronic device cannot obtain the distance information between the electronic device and the to-be-photographed object through the laser sensor. In this case, the distance information between the electronic device and the to-be-photographed object may be determined through obtaining of the distance parameter of the camera module. Automatic switching between different types of cameras in the electronic device is implemented based on the distance information, thereby satisfying photographing requirements of uses, and improving photographing experience of users.

In addition, the second parameter is obtained to avoid a jump in a displayed picture during camera switching of the electronic device. Therefore, in a case that it may be determined that the first parameter and the second parameter satisfy the first preset condition, it may be ensured that a displayed picture remains smooth and fluent during the camera switching.

Optionally, a first distance range of the first camera is obtained, where the first distance range indicates an effective distance range for focusing by the first camera; and the first preset threshold is obtained based on the first distance range.

It should be understood that the effective distance range for focusing by the first camera may mean that the first camera can implement accurate focusing within the effective distance range. If the focusing range is greater than or equal to effective distance range, the electronic device cannot implement accurate focusing, resulting in a decreased resolution of the image captured by the first camera.

For example, the first distance range of the first camera is greater than 10 cm. That is to say, when the distance between the electronic device and the to-be-photographed object is greater than 10 cm, the first camera can implement accurate focusing on the to-be-photographed object.

In this embodiment of this application, the first preset threshold may be determined based on the effective distance range within which the first camera can implement accurate focusing. Therefore, when the electronic device recognizes that the electronic device is relatively close to or far from the to-be-photographed object, the electronic device may automatically switch to the second camera as the main camera, thereby ensuring image quality of the captured image.

Optionally, a start point of the first distance range is a first value, and the first preset threshold is greater than or equal to the first value.

For example, the first distance range is greater than 10 cm, that is, the start point of the first distance range is 10 cm. In this case, the first preset threshold may be greater than or equal to 10 cm.

Optionally, a zoom ratio range of the first camera is obtained; and the second preset range is obtained based on the zoom ratio range.

In this embodiment of this application, the second preset range may be determined based on a zoom ratio change range of the first camera, to ensure smoothness of the captured image, and avoid an image jump.

Optionally, the second preset range is a subset of the zoom ratio range.

For example, if the zoom ratio range of the first camera is [1, 3.5), the second preset range may be a subset of [1, 3.5).

For example, the second preset range may be [1, 2), or the second preset range may be [1, 2.5).

Optionally, before the determination that the first parameter and the second parameter satisfy the first preset condition, the method further includes:

obtaining a current photographing mode of the electronic device; and obtaining the first parameter and the second parameter in a case that the photographing mode is not a super macro mode.

It should be understood that, the super macro mode is a photographing mode in which the electronic device automatically switches between a zoom ratio of 1 (1×) and a zoom ratio of 2 (2×) to an ultra wide camera as the main camera for photographing.

For example, in a short-range photographing scenario of the electronic device, the electronic device is relatively close to the to-be-photographed object. In this embodiment of this application, the electronic device may automatically use an ultra wide camera as the main camera, and enter the super macro mode, thereby increasing a field of view of the electronic device during photographing.

As shown in FIG. 5A, a to-be-photographed scene includes a first to-be-photographed object 260 and a second to-be-photographed object 270. A distance between the first to-be-photographed object and the electronic device is d1, and a distance between the second to-be-photographed object and the electronic device is d2. d2 is less than d1. FIG. 6 is a side view of the to-be-photographed scene. During the photographing, the position of the electronic device remains unchanged. The electronic device enables a camera application. At a first moment, the electronic device aligns at the first to-be-photographed object 260 for focusing, and may display a display interface 280. In this case, the zoom ratio of the electronic device is a zoom ratio of 1. As shown in FIG. 5B, at a second moment, the electronic device maintains the zoom ratio of 1 and switches to another to-be-photographed object. For example, when the electronic device aligns at the second to-be-photographed object 270 for focusing, if the electronic device recognizes that the second to-be-photographed object 270 is relatively close to the electronic device, the electronic device may enter the super macro mode, automatically switch to the ultra wide camera as the main camera for focusing, and display a display interface 290.

It should be understood that the super macro photographing mode of the electronic device is not enabled through user selection. Instead, the photographing mode is usually automatically switched by the electronic device.

Step S340: Display a second image.

The second image is captured when the second camera serves as the main camera for image capturing.

It should be understood that the electronic device may include a plurality of cameras. For example, the plurality of cameras may include a main camera and an auxiliary camera. During image capturing, the electronic device usually uses the image captured by the main camera as a reference for processing. During the processing, partial image information acquired by the auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

For example, the electronic device is in a single-camera mode during image capturing, that is, the electronic device enables one camera for image capturing. The camera is the main camera.

For example, the electronic device is in a dual-camera mode during image capturing, that is, the electronic device enables two cameras for image capturing. One of the cameras is the main camera, and the other camera is the auxiliary camera. During image capturing, the image captured by the main camera is usually used as a reference for processing. During the processing, partial image information acquired by the partial auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

For example, if the electronic device is in a multi-camera mode during image capturing, for example, the electronic device is in a three-camera mode during image capturing, the electronic device may enable three cameras for image capturing. The three cameras include one main camera and two auxiliary cameras. During image capturing, the image captured by the main camera is usually used as a reference for processing. During the processing, partial image information acquired by the two auxiliary cameras may be extracted to compensate for the image captured by the main camera, to achieve fusion of the images captured by the three cameras, and the image is processed to obtain a displayed image, thereby improving photographing quality and implementing functions such as background blur, optical zoom, and the like.

Optionally, the electronic device is at a same position during displaying of the first image and the second image by the electronic device.

In this embodiment of this application, during the photographing, the position of the electronic device may remain unchanged, and a focusing object of the electronic device may be changed from a long-range to-be-photographed object to a short-range to-be-photographed object. The electronic device can automatically recognize the distance between the electronic device and the to-be-photographed object, and perform automatic switching between different types of cameras as the main camera, thereby ensuring the image quality of the captured image.

In a possible implementation, the electronic device may be at different positions during displaying of the first image and the second image by the electronic device. For example, for a same to-be-photographed object, during zoom-in or zoom-out photographing by the electronic device, the first image and the second image are displayed.

Optionally, after displaying the second image, the electronic device may update the photographing mode of the electronic device to the super macro mode.

Optionally, after the displaying of the second image, the method further includes:

determining that the first parameter is less than a second preset threshold, where the second preset threshold may be obtained based on the first preset threshold; and displaying a third image, where the third image is captured when the first camera serves as a main camera for image capturing.

For example, when the electronic device is in a short-range photographing scenario, the electronic device may switch from the first camera (for example, a wide angle camera) as the main camera to the second camera (for example, an ultra wide camera) as the main camera. When the electronic device exits the short-range photographing scenario, the electronic device may switch, based on the first parameter and the second parameter, from the second camera (for example, an ultra wide camera) as the main camera to the first camera (for example, a wide angle camera) as the main camera.

For example, when the electronic device is in a long-range photographing scenario, the electronic device may switch from the first camera (for example, a wide angle camera) as the main camera to the second camera (for example, a telephoto camera) as the main camera. When the electronic device exits the long-range photographing scenario, the electronic device may switch, based on the first parameter and the second parameter, from the second camera (for example, a telephoto camera) as the main camera to the first camera (for example, a wide angle camera) as the main camera.

In an example, the second preset threshold is greater than the first preset threshold; or the second preset threshold is equal to the first preset threshold.

It should be understood that, the switching between the wide angle camera and the ultra wide camera and the switching between the wide angle camera and the telephoto camera are described above as examples. A camera type is not limited in this application.

Optionally, the second image may be displayed on a first display interface of the electronic device, where the first display interface further includes a first icon, and the first icon indicates the super macro mode. For example, the first icon may be 506 shown in FIG. 9A, FIG. 9B, FIG. 9C, and FIG. 9D.

Optionally, the first icon may include a first control. The electronic device detects a first operation on the first control. The electronic device may exit a target photographing mode in response to the first operation.

Figure 9B:
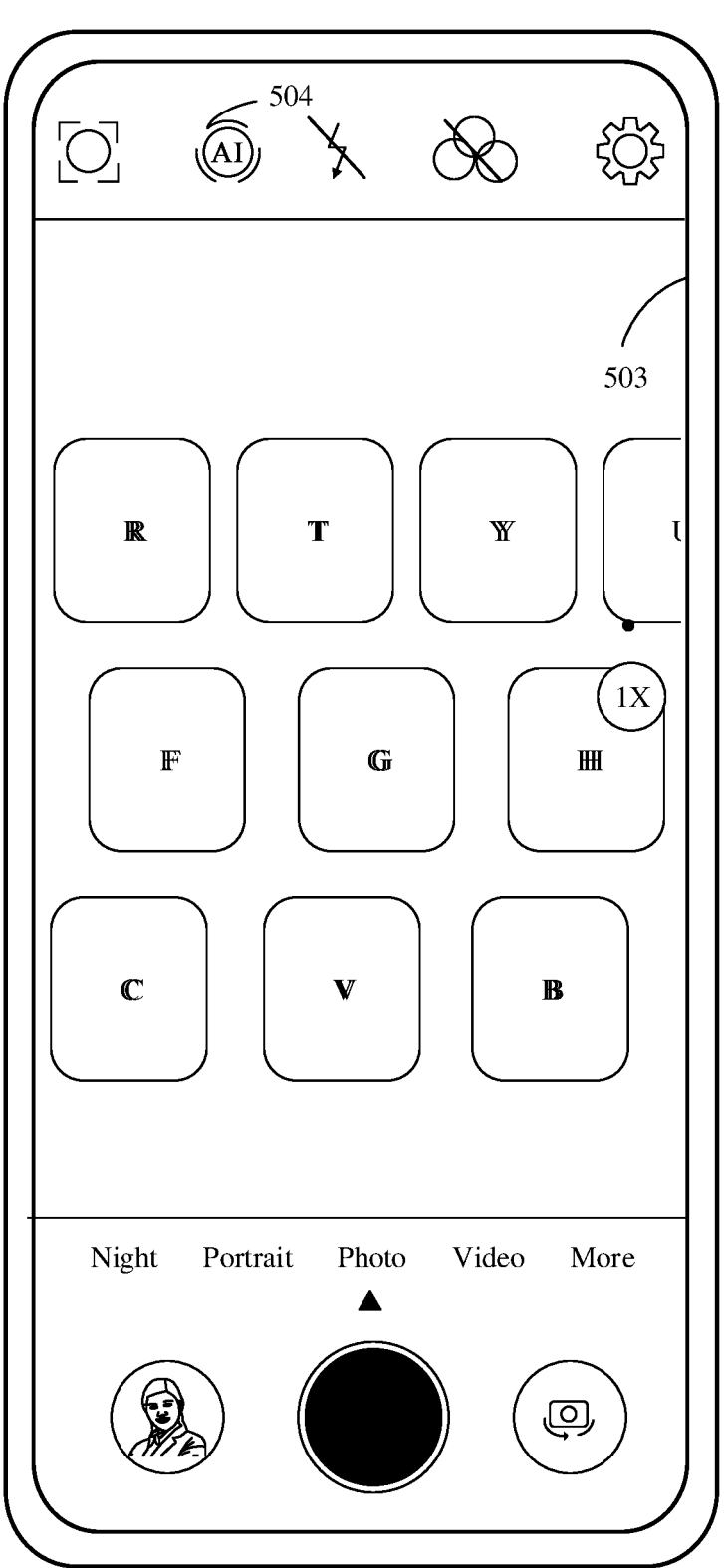
Figure 9C:
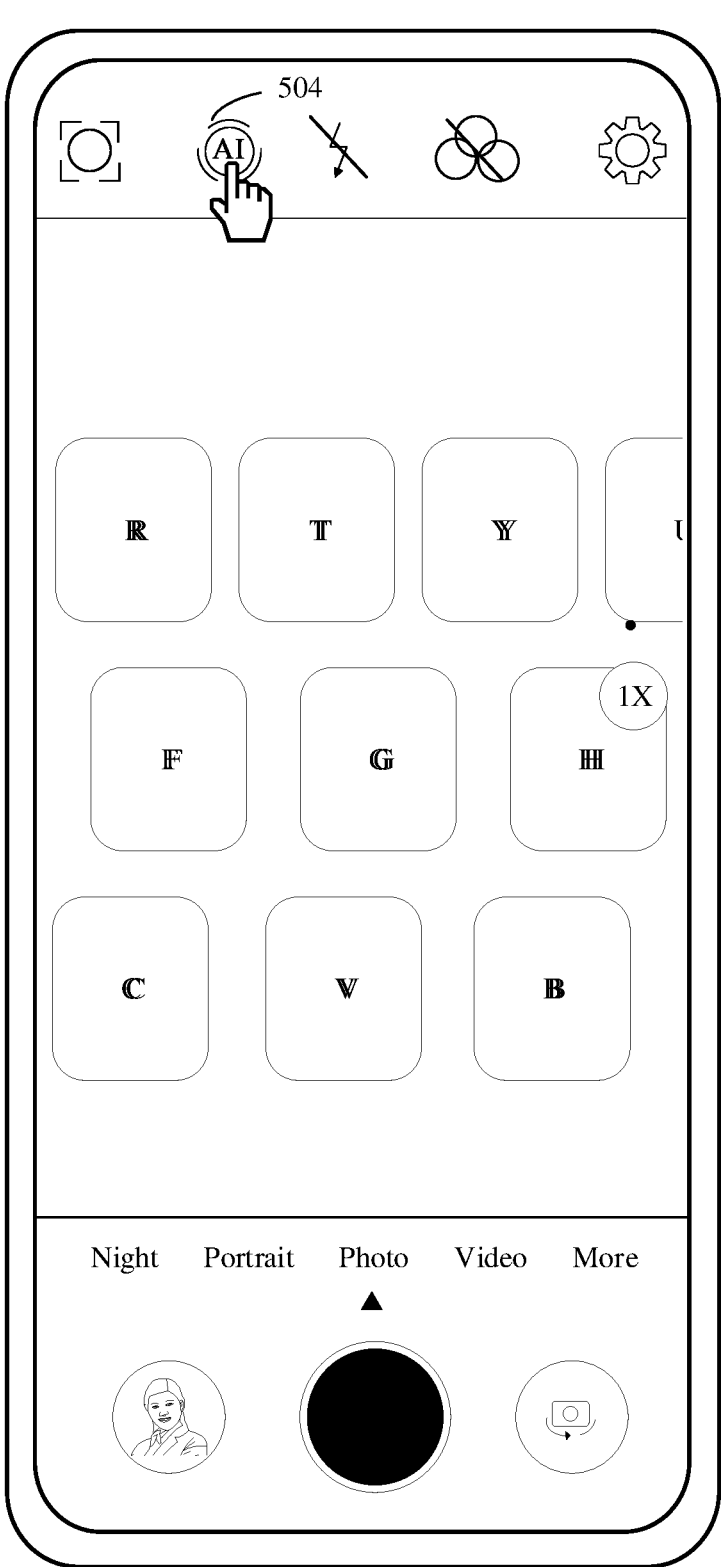
Figure 9D:
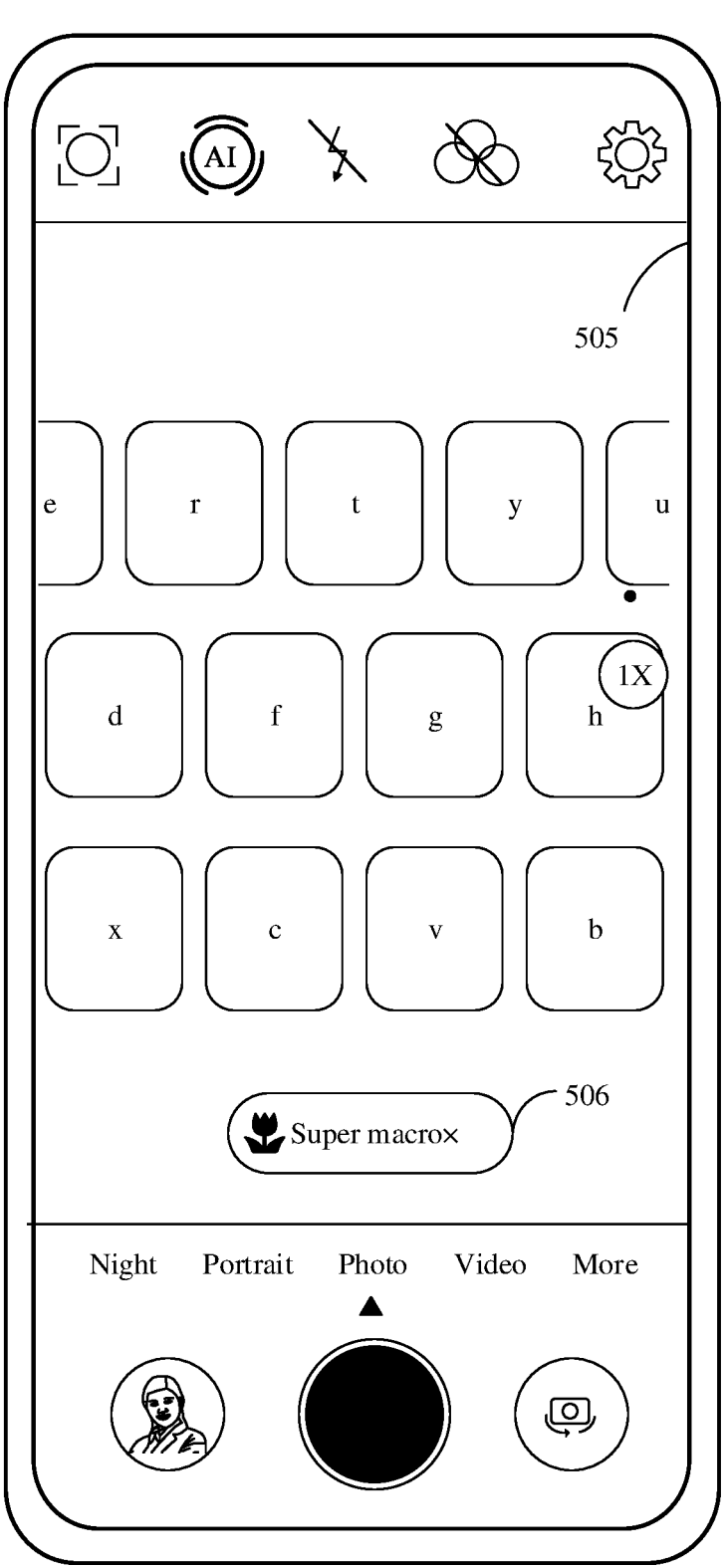
Figure 10C:
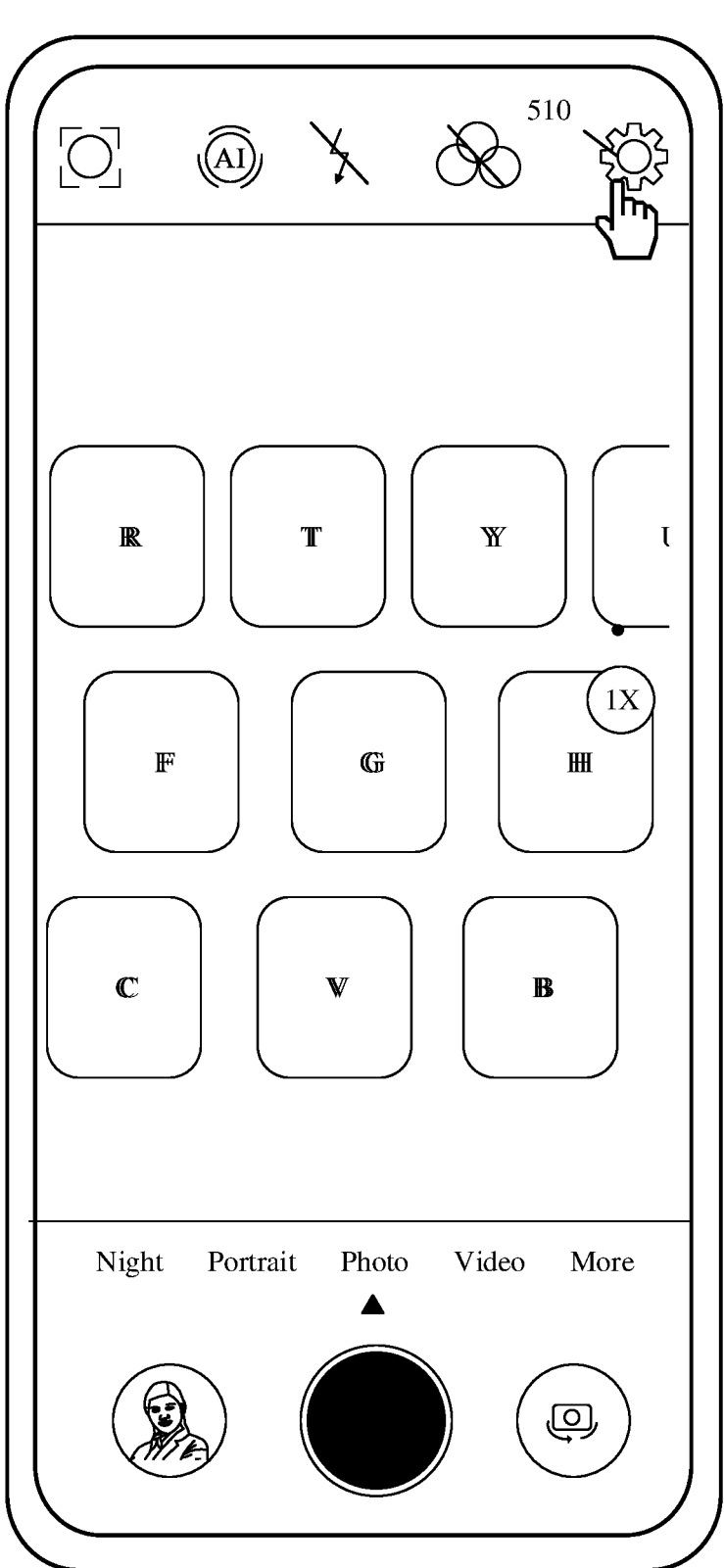
Figure 10D:
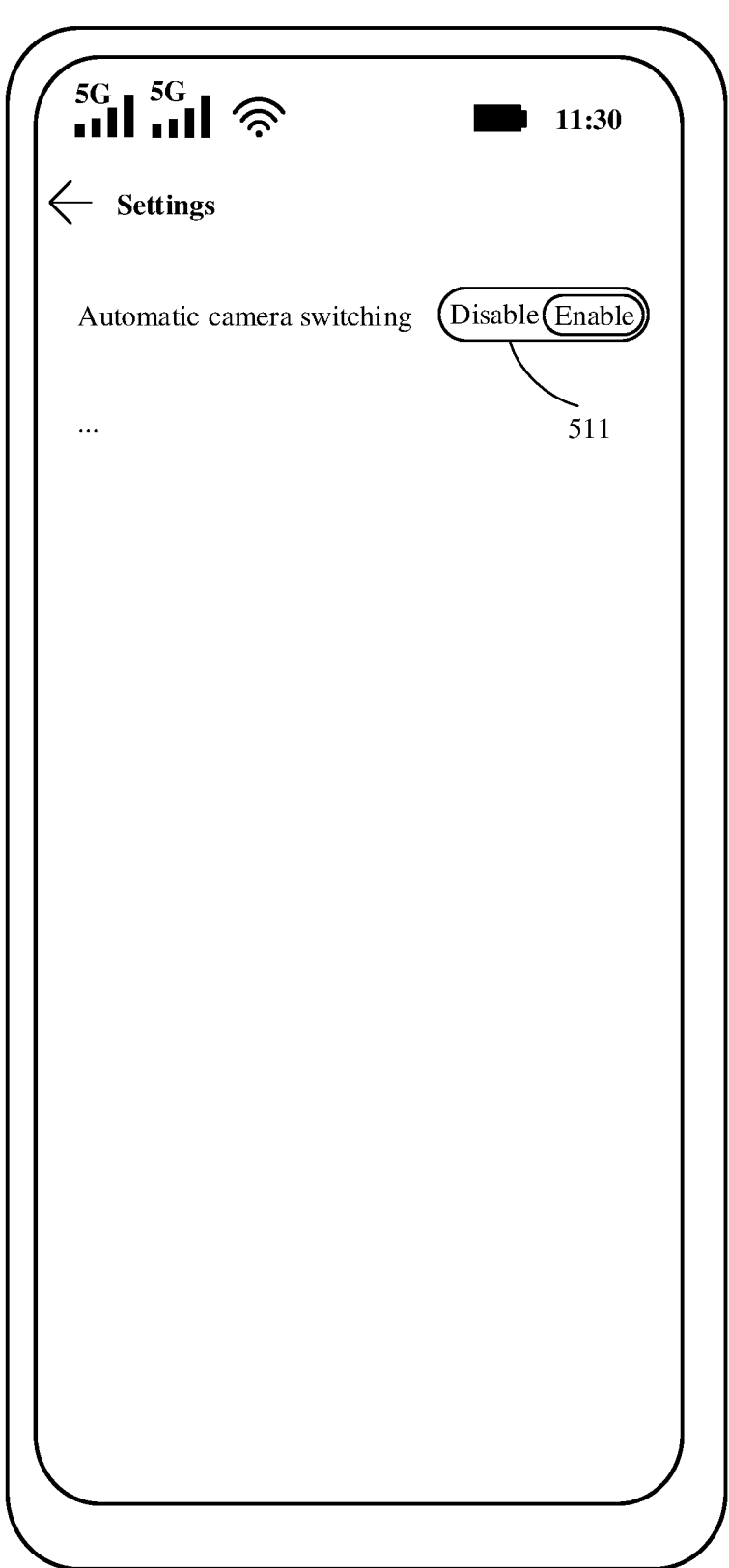
Figure 10E:
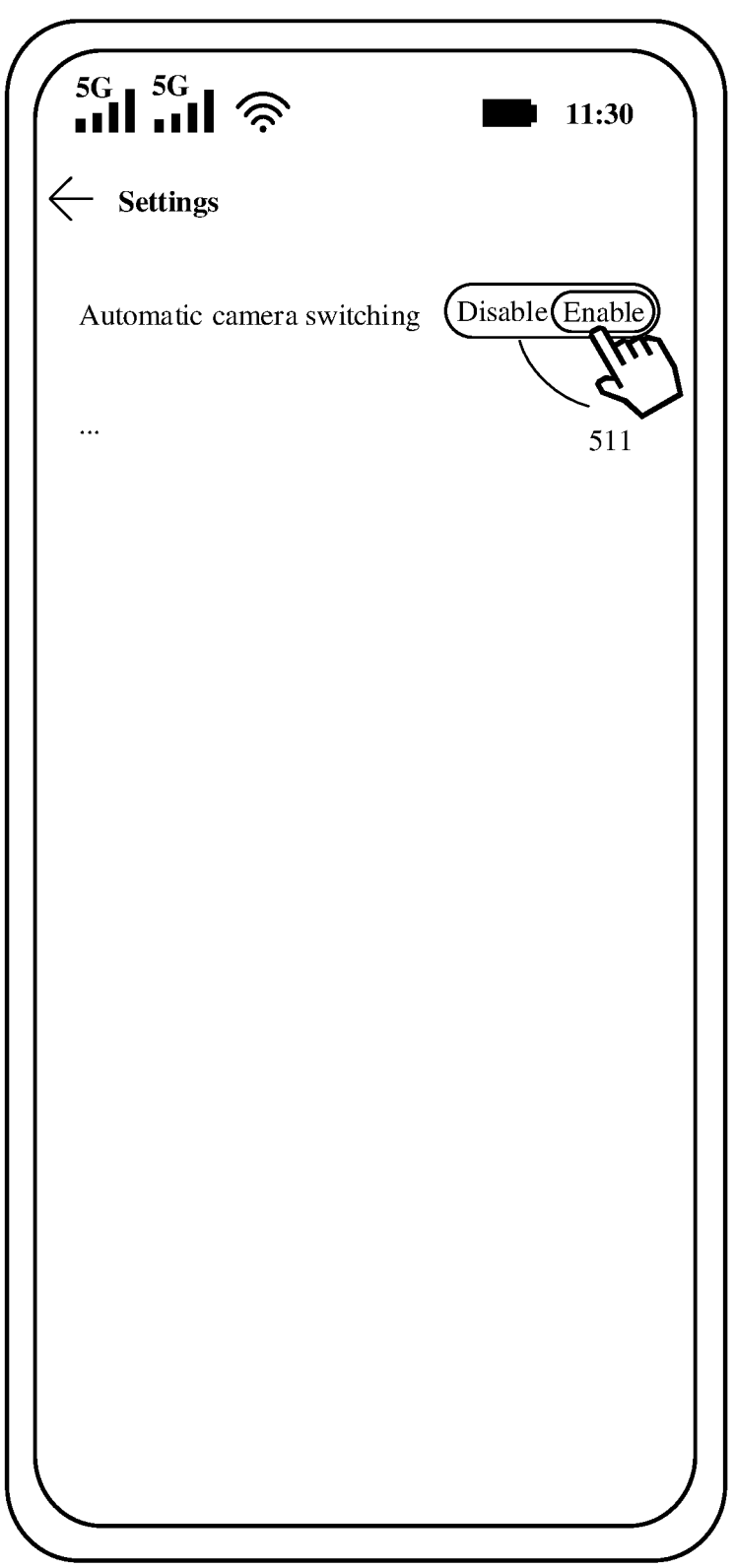
Figure 10F:
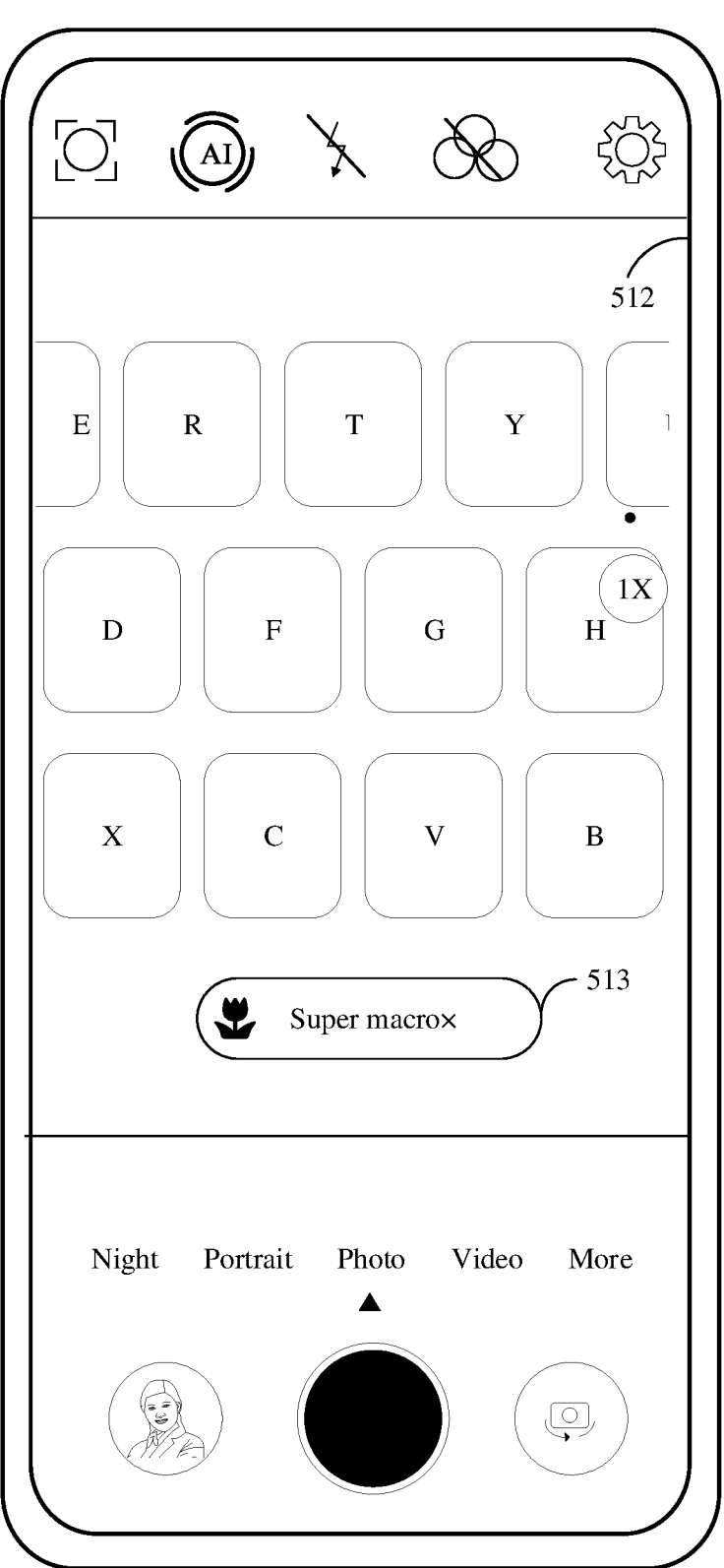
Figure 11C:
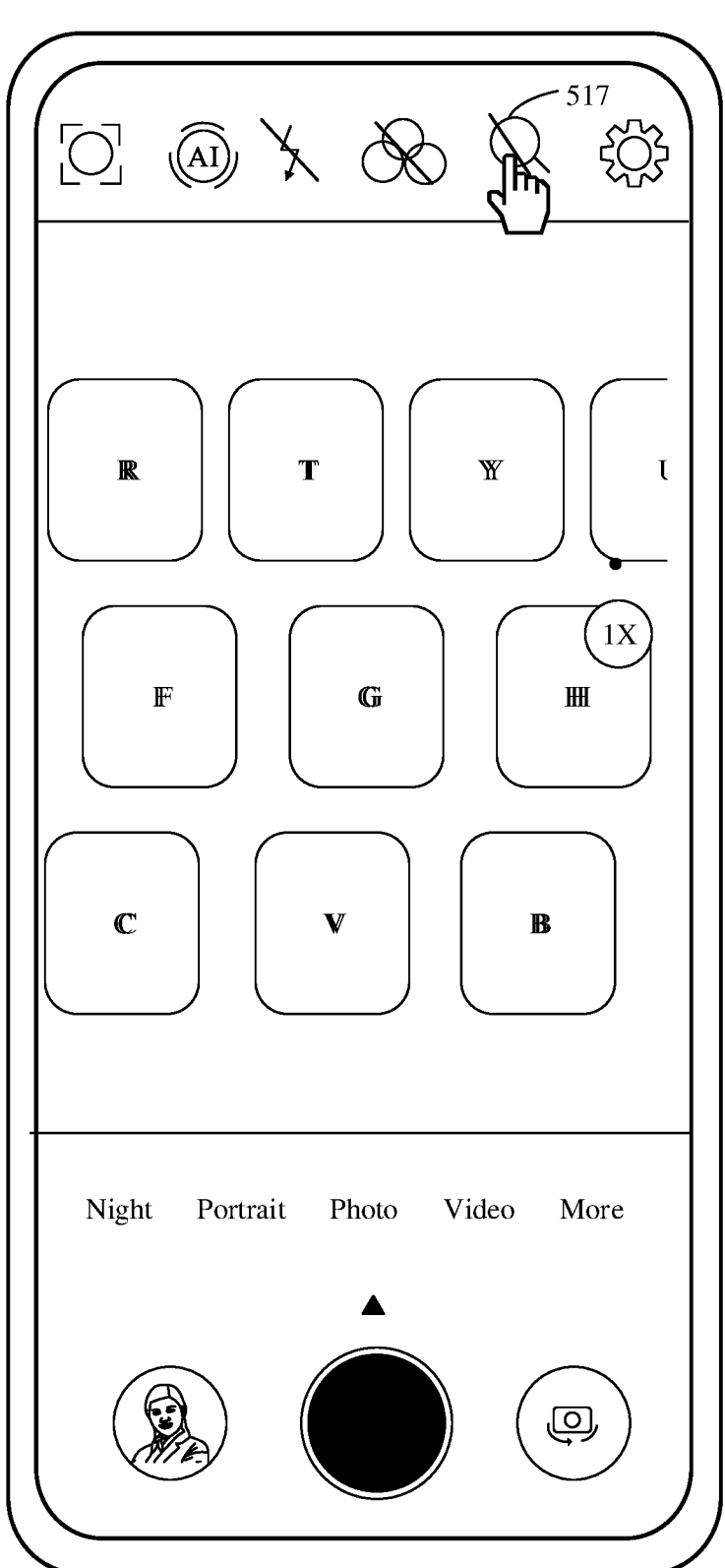
Figure 11D:
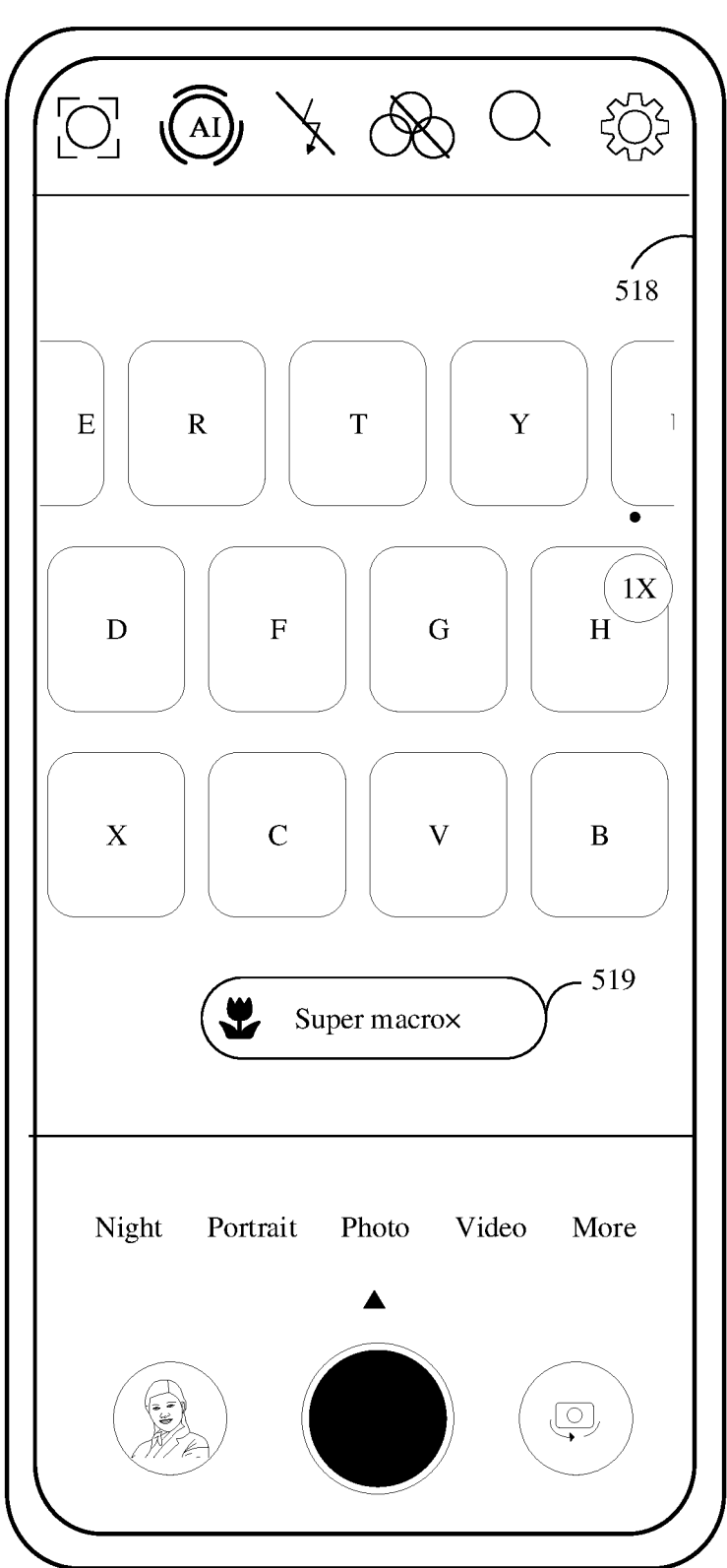
Figure 12C:
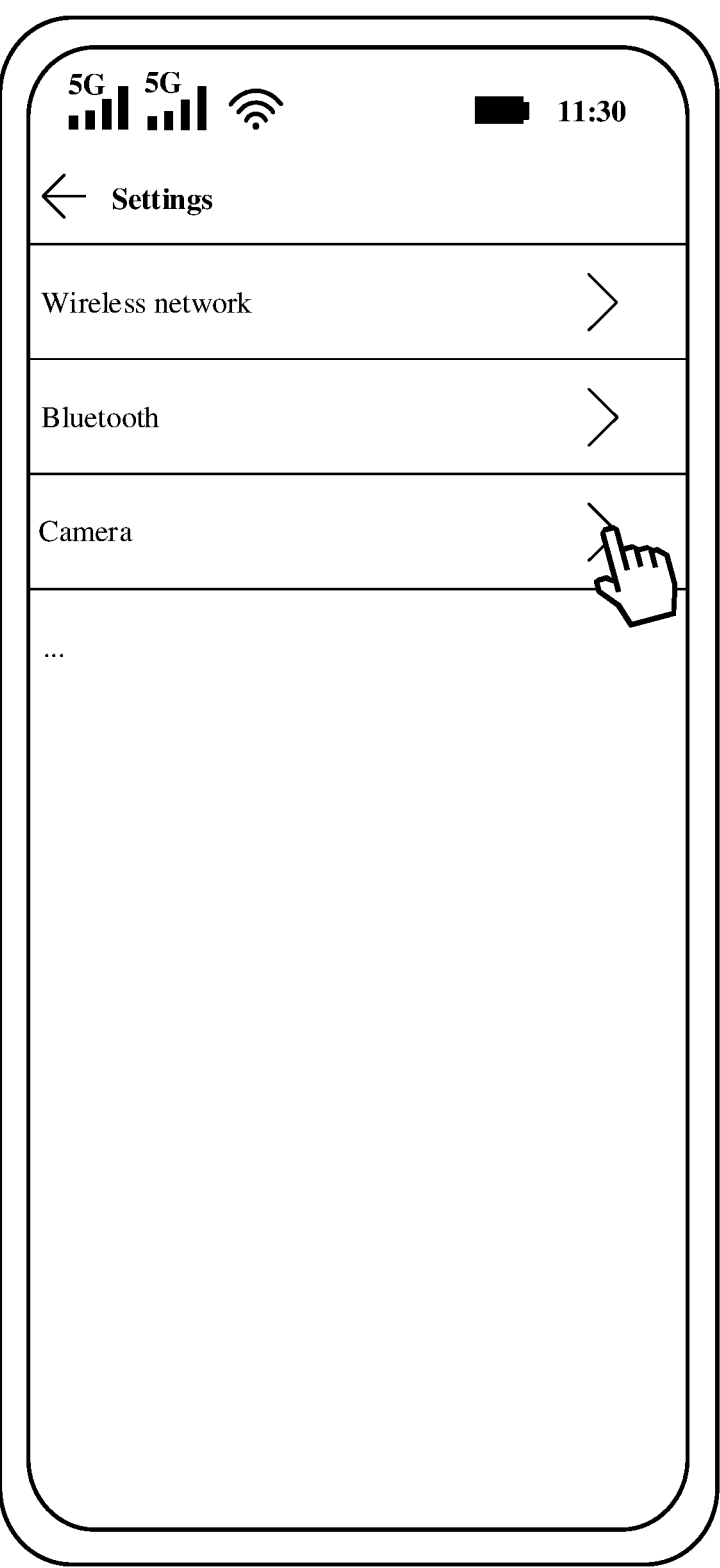
Figure 12D:
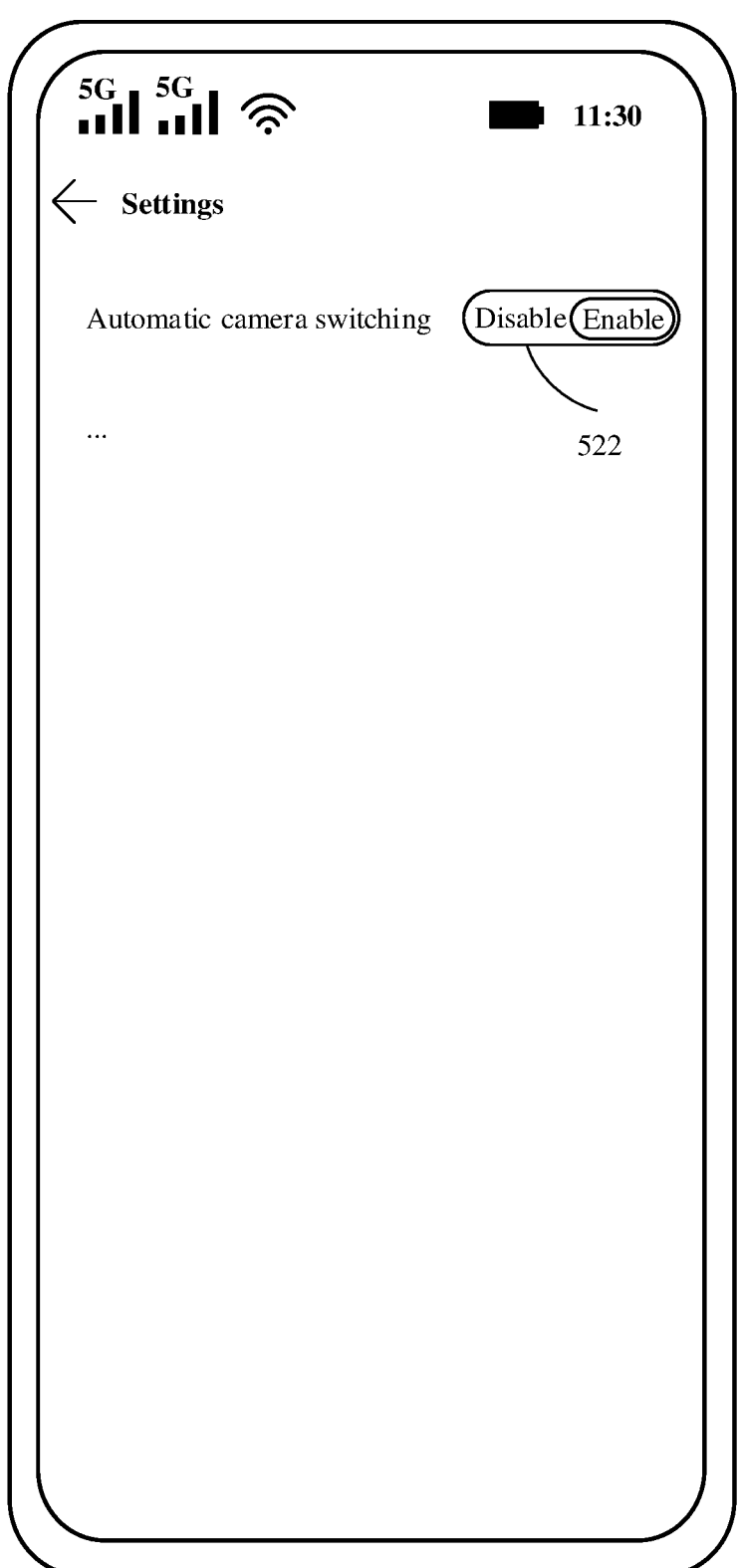
Figure 12E:
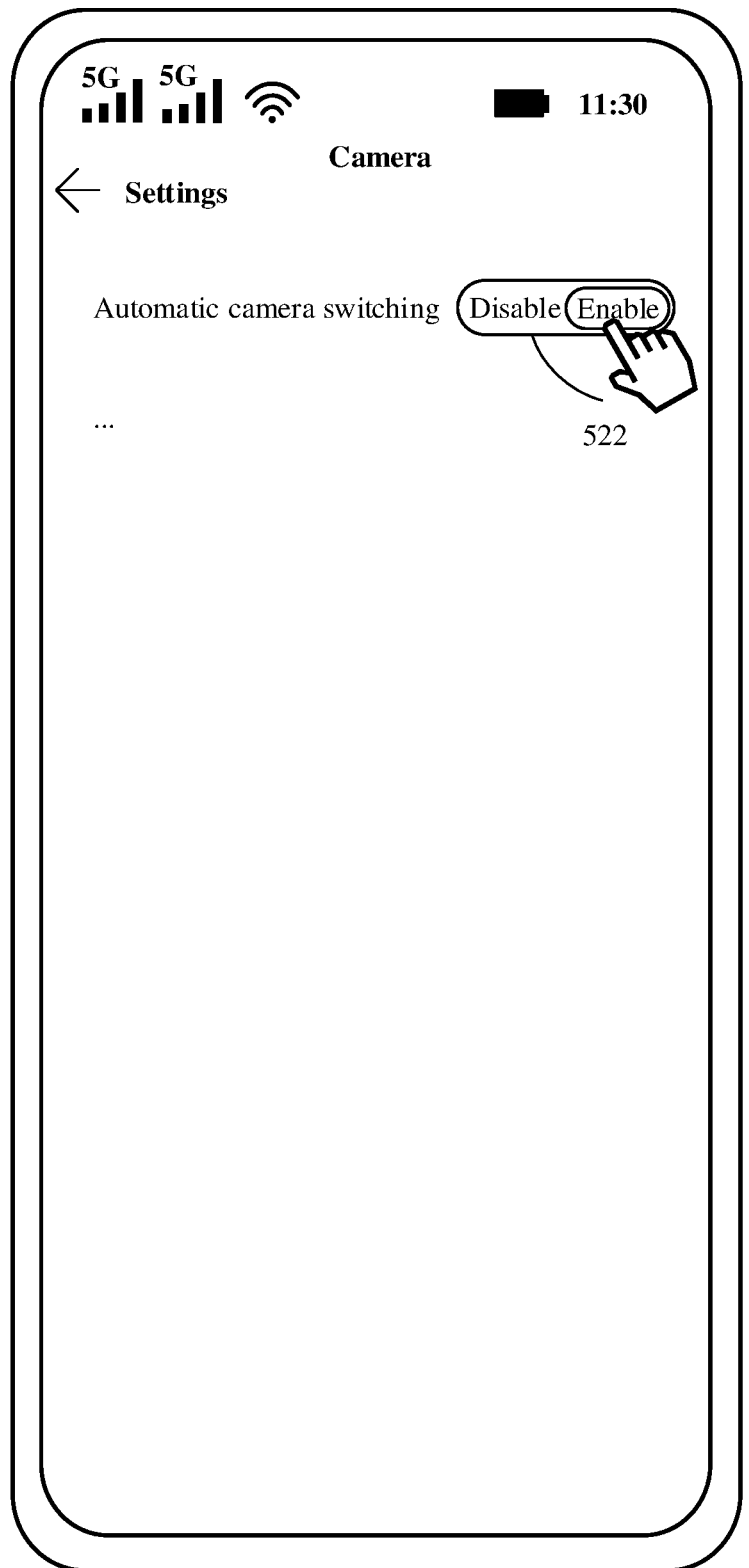
Figure 12F:
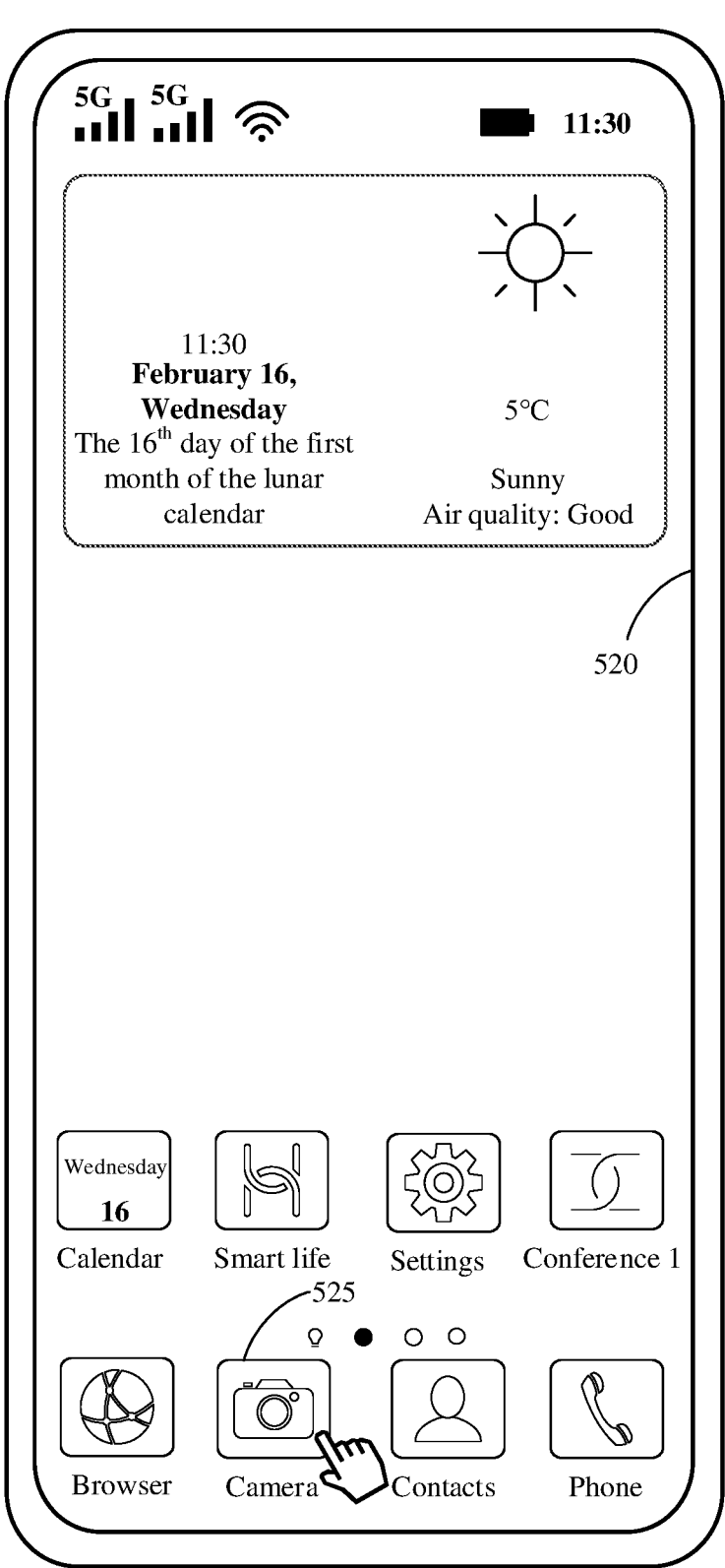
Figure 12G:
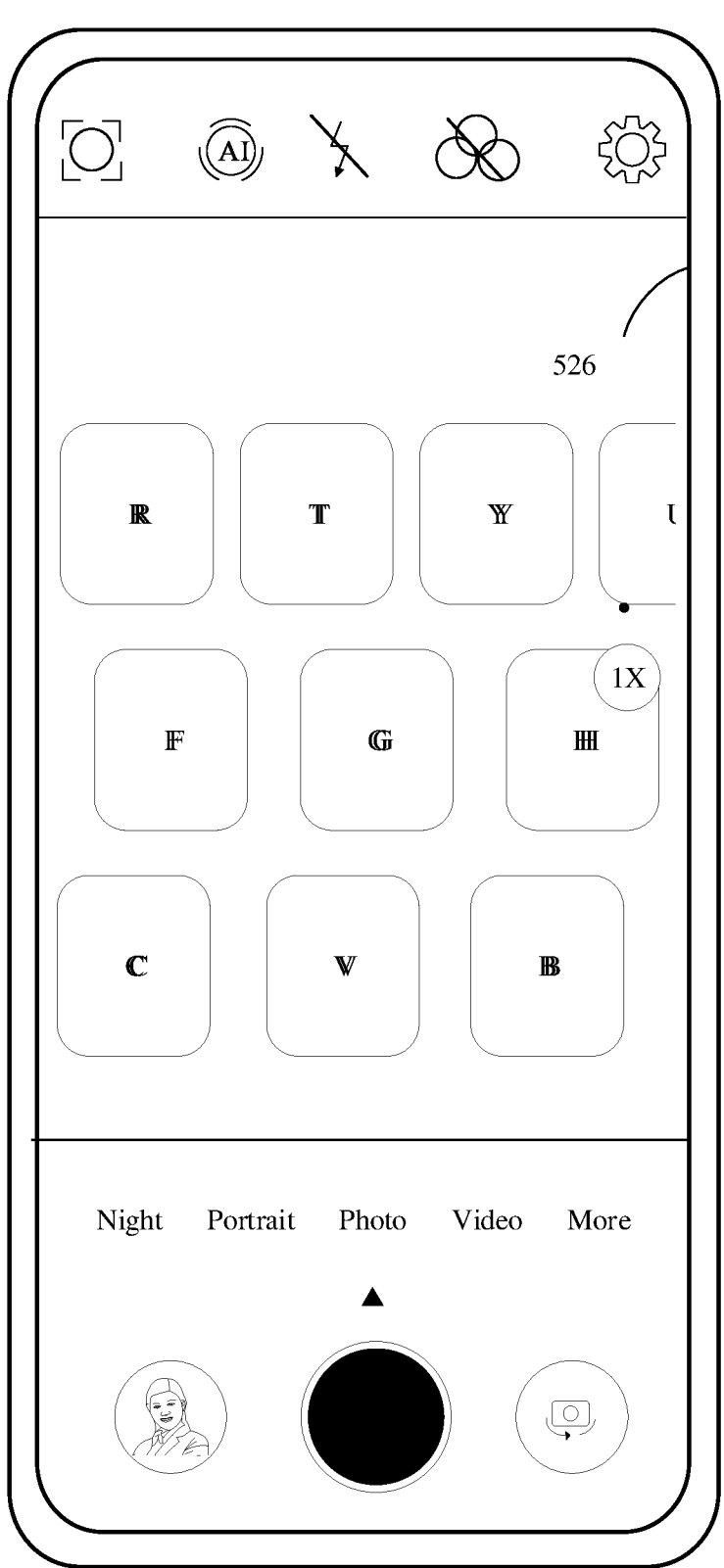
Figure 12H:
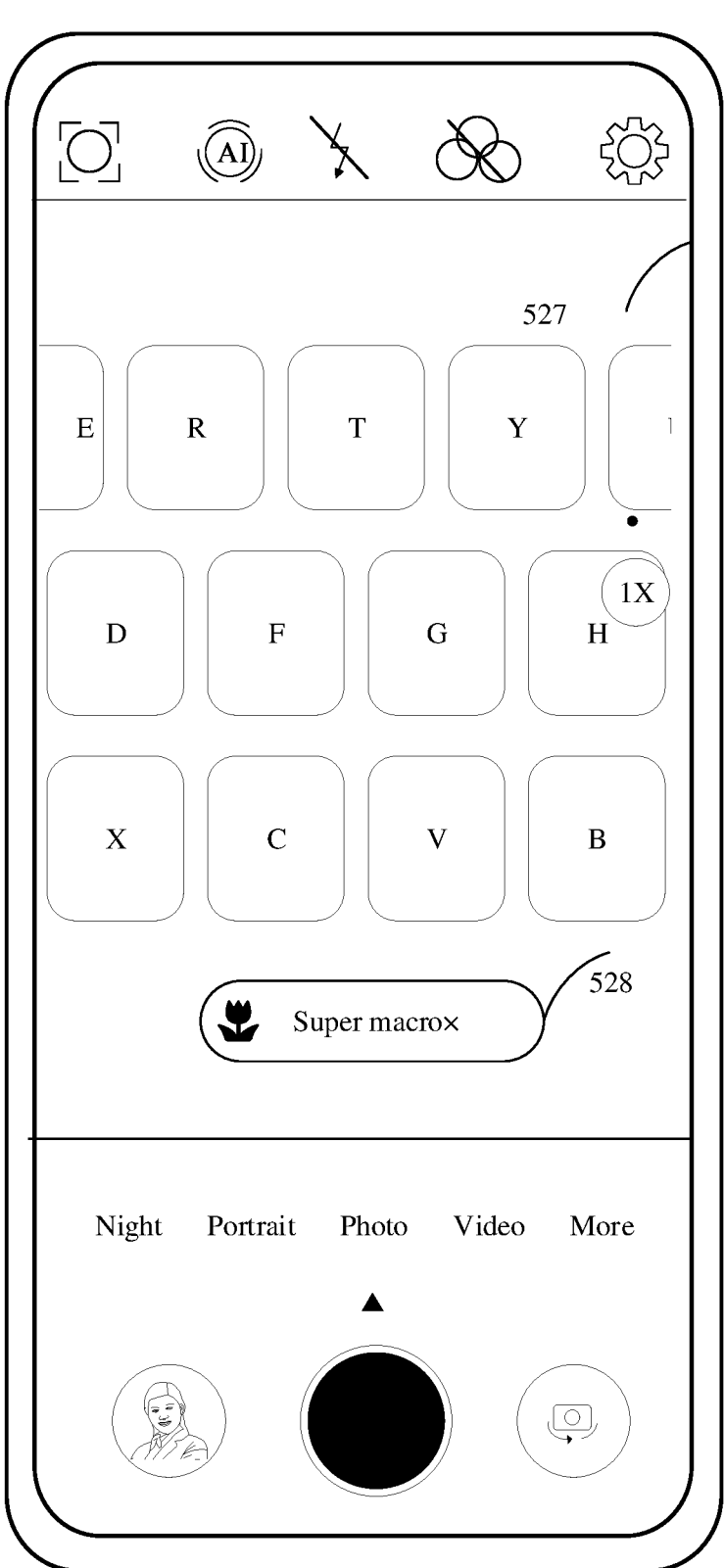

For example, the first display interface may be a display interface 505 shown in FIG. 9D, and the first control may be a first icon 506 of the super macro mode; or the first display interface may be a display interface 512 shown in FIG. 10F, and the first icon may be an icon 513 used for the super macro mode; or the first display interface may be a display interface 518 shown in FIG. 11D, and the first control may be an icon 519 of the super macro mode; or the first display interface may be a display interface 527 shown in FIG. 12H, and the first control may be an icon 528 of the super macro mode.

For example, the first operation may be disabling the super macro mode. For example, as shown in FIG. 9D, the first icon may be the icon 506, the first control may be "x" in the icon 506, and the first operation may be tapping "x" in "super macrox". In this case, the electronic device may disable the super macro mode. Optionally, after the super macro mode is disabled, the electronic device may not push the super macro mode in the preview display interface.

In this embodiment of this application, since the electronic device does not include a laser sensor, distance information between the electronic device and the to-be-photographed object cannot be obtained through the laser sensor. The distance information between the electronic device and the to-be-photographed object may be obtained through obtaining of the distance parameter (for example, a code value) of the camera module in the electronic device. It may be determined based on the distance information between the electronic device and the to-be-photographed object whether to switch the camera of the electronic device. For example, if the electronic device is relatively close to the to-be-photographed object, the electronic device may use an ultra wide camera as the main camera. In addition, in this embodiment of this application, the second parameter of the electronic device may be obtained, and it is determined that the second parameter satisfies the first preset condition. A picture jump during camera switching of the electronic device can be avoided when the first parameter and second parameter satisfy the first preset condition. Therefore, in this embodiment of this application, the electronic device can implement automatic switching between different cameras without relying on the laser sensor. In addition, during the switching between different cameras, smoothness and fluency of the displayed picture can be still ensured.

Figure 8:
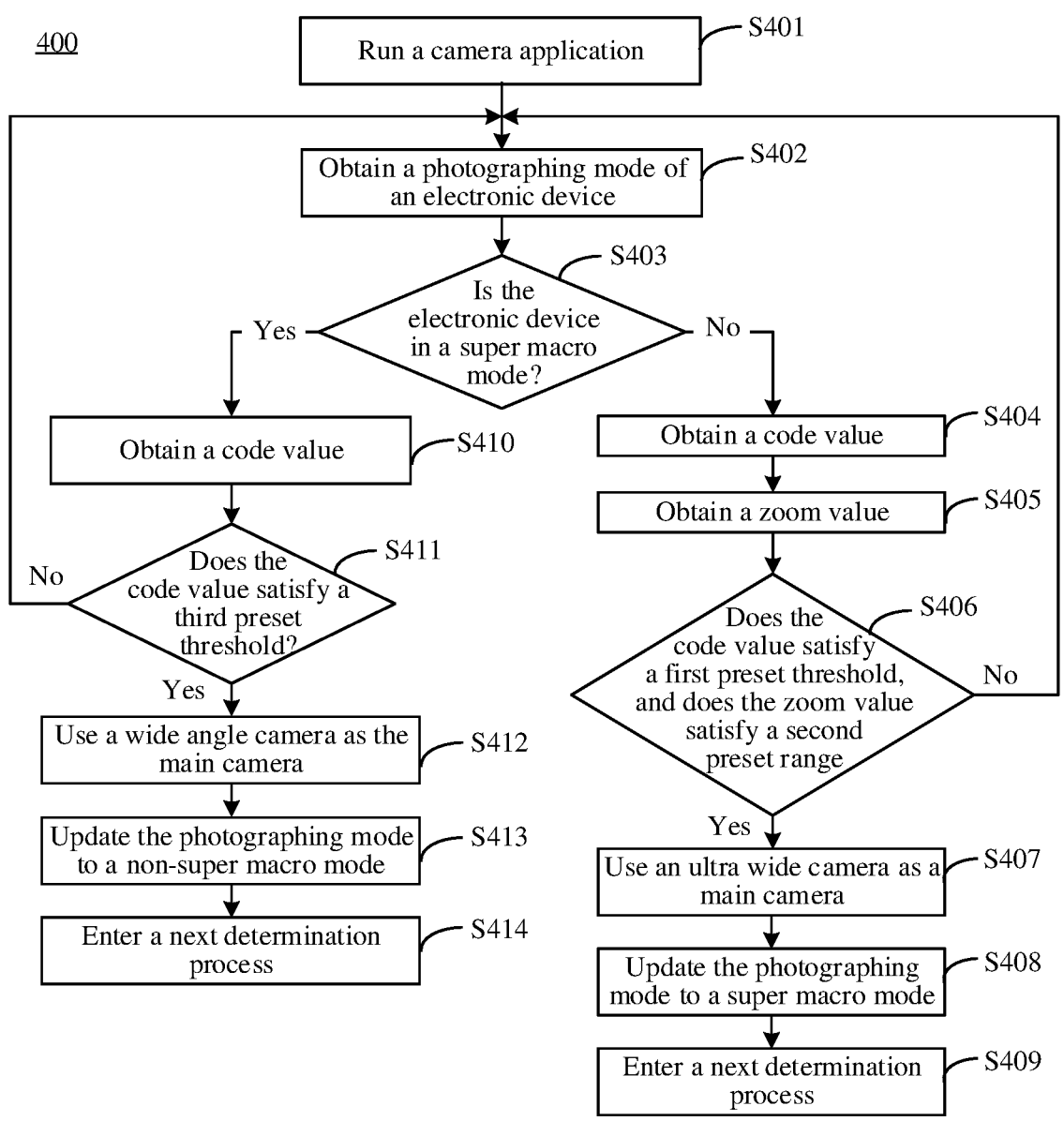
FIG. 8 is a schematic flowchart of another camera switching method according to an embodiment of this application.

FIG. 8 is a schematic flowchart of a camera switching method according to an embodiment of this application. The method may be performed by the electronic device shown in FIG. 1. A method 400 includes step S401 to step S414. Step S401 to step S414 are respectively described below in detail.

It should be understood that in step S401 to step S414, switching between a wide angle camera and an ultra wide camera is used as an example for description. Step S401 to step S414 are further applicable to switching between cameras of other types. A camera type is not limited in this application.

Step S401: Run a camera application.

For example, a user may indicate the electronic device to enable the camera application by tapping an icon of the "camera" application, as shown in FIG. 9A, as shown in FIG. 10A, as shown in FIG. 11A, or as shown in FIG. 12F. Alternatively, when the electronic device is in a screen-locked state, the user may indicate the electronic device to enable the camera application through a rightward swipe gesture on a display of the electronic device. Alternatively, when the electronic device is in the screen-locked state, and the screen-locked interface includes the icon of the camera application, the user may indicate the electronic device to enable the camera application by tapping the icon of the camera application. Alternatively, when the electronic device is running another application, and the application has a permission to invoke the camera application, the user may indicate the electronic device to enable the camera application by tapping a corresponding control. For example, when the electronic device is running an instant messaging application, the user may indicate the electronic device to enable the camera application by selecting a camera function control.

It should be understood that the above is an example of the operation of enabling the camera application. The electronic device may alternatively be indicated through a voice instruction operation or another operation to enable camera application. This is not limited in this application.

Step S402: Obtain a current photographing mode of the electronic device.

For example, the obtaining of the photographing mode of the electronic device means obtaining of a current photographing mode of the electronic device. The photographing mode of the electronic device may vary depending on a distance between the electronic device and the to-be-photographed object.

It should be understood that the photographing mode of the electronic device may include information such as a type of a camera currently enabled and/or a zoom ratio of the electronic device.

For example, as shown in FIG. 9A, after the electronic device enables the camera application, the electronic device may enter a default camera mode, that is, a photo camera mode. In the photo camera mode, the default photographing mode of the electronic device may mean that a zoom ratio is 1 and the wide angle camera serves as a main camera. In addition, the electronic device may further include a night camera mode, a portrait camera mode, a video camera mode, or more camera modes.

Optionally, the camera mode of the camera application may further include an aperture camera mode.

It should be understood that, as shown in FIG. 9B, the night camera mode, the portrait camera mode, the photo camera mode, the video camera mode, or the more camera modes may be a camera mode in the camera application. The photographing mode may be a current photographing mode of the electronic device in any camera mode, for example, may be information such as a type of a camera currently enabled and/or a zoom ratio of the electronic device.

Step S403: Determine whether the electronic device is in a super macro mode. If yes, step S410 is performed; and if no, step S404 is performed.

For example, it is determined whether a state of the electronic device is the super macro mode. If the photographing mode of the electronic device is the super macro mode, step S410 is performed. If the photographing mode of the electronic device is not in the super macro mode, step S404 is performed.

For example, a display interface of the super macro mode may be shown in FIG. 10C below, or shown in FIG. 11D below, or shown in FIG. 12C below, or shown in FIG. 13B below.

For example, the display interface shown in FIG. 9A is a home screen 501 of the electronic device. When detecting that the user taps an icon 502 of the camera application on the home screen 501, the electronic device may display another display interface shown in FIG. 9B. As shown in FIG. 9B, after the electronic device enters the camera application, a display interface 503 may be displayed, and the photographing mode is enabled by default. In the photographing mode, the electronic device may enter a default photographing mode. The default photographing mode may be a photographing mode in which the wide angle camera serves as the main camera and a zoom ratio is a zoom ratio of 1 (1×). The default photographing mode may be a non-super macro focus mode.

For example, in addition to the photo camera mode, the camera mode in the electronic device may further include a night camera mode, a portrait camera mode, a video camera mode, or more camera modes. Optionally, the camera mode may further include an aperture camera mode.

In this embodiment of this application, the super macro mode is a photographing mode in which the electronic device automatically switches between a zoom ratio of 1 (1×) and a zoom ratio of 2 (2×) to the ultra wide camera as the main camera for photographing.

For example, in a short-range photographing scenario of the electronic device, the electronic device is relatively close to the to-be-photographed object. In this embodiment of this application, the electronic device may automatically use an ultra wide camera as the main camera, and enter the super macro mode, thereby increasing a field of view of the electronic device during photographing.

As shown in FIG. 5A, a to-be-photographed scene includes a first to-be-photographed object 260 and a second to-be-photographed object 270. A distance between the first to-be-photographed object and the electronic device is d1, and a distance between the second to-be-photographed object and the electronic device is d2. d2 is less than d1. FIG. 6 is a side view of the to-be-photographed scene. During the photographing, the position of the electronic device remains unchanged. The electronic device enables a camera application. At a first moment, the electronic device aligns at the first to-be-photographed object 260 for focusing, and may display a display interface 280. In this case, the zoom ratio of the electronic device is a zoom ratio of 1. As shown in FIG. 5B, at a second moment, the electronic device maintains the zoom ratio of 1 and switches to another to-be-photographed object. For example, when the electronic device aligns at the second to-be-photographed object 270 for focusing, if the electronic device recognizes that the second to-be-photographed object 270 is relatively close to the electronic device, the electronic device may enter the super macro mode, automatically switch to the ultra wide camera as the main camera for focusing, and display a display interface 290.

It should be understood that the super macro photographing mode of the electronic device is not enabled through user selection. Instead, the photographing mode is usually automatically switched by the electronic device.

Step S404: Obtain a code value (an example of a first parameter).

Optionally, a code value of the main camera in the electronic device may be obtained.

In this embodiment of this application, since the electronic device does not include a laser sensor, distance information between the electronic device and the to-be-photographed object cannot be obtained through the laser sensor. The distance information between the electronic device and the to-be-photographed object may be obtained through obtaining of the distance parameter (for example, a code value) of the camera module in the electronic device. It may be determined based on the distance information between the electronic device and the to-be-photographed object whether to switch the camera of the electronic device. For example, if the electronic device is relatively close to the to-be-photographed object, the electronic device may use an ultra wide camera as the main camera.

It should be understood that the code value of the main camera may indicate distance information between a lens and a sensor in the electronic device. For example, a larger code value indicates a larger distance between the lens and the sensor, that is, may indicate a smaller distance between the electronic device and the to-be-photographed object. A smaller code value indicates a smaller distance between the lens and the sensor, that is, may indicate a larger distance between the electronic device and the to-be-photographed object. It should be understood that the code value may be referred to as a lens position (lens position).

For example, during photographing, the electronic device may first determine a subject in a to-be-photographed scene. The subject is the to-be-photographed object. The distance between the electronic device and the to-be-photographed object may be a distance between the electronic device and a focal point of the to-be-photographed object after the electronic device completes focusing.

Optionally, when the electronic device is a dual-camera electronic device or a multi-camera electronic device, a code value of an auxiliary camera may be obtained.

Step S405: Obtain a zoom value.

For example, a zoom ratio is obtained, that is, the zoom value (an example of a second parameter) is obtained.

For example, a zoom ratio of the electronic device in a current photographing mode may be obtained.

Optionally, in this embodiment of this application, step S404 may be first performed, and then step S405 is performed; or step S405 may be first performed, and then step S404 is performed. A sequence of step S404 and step S405 is not limited in this application.

Step S406: Determine whether the code value satisfies a first preset threshold and whether the zoom value satisfies a second preset range (an example of a first preset condition). If the code value satisfies the first preset threshold and the zoom value satisfies the second preset range, step S407 is performed. If the code value does not satisfy the first preset threshold and/or the zoom value does not satisfy the second preset range, step S402 is performed.

In this embodiment of this application, the zoom ratio in the current photographing mode may be obtained, and it is determined whether the zoom ratio satisfies the second preset range. Since the zoom ratio satisfies the second preset range, a picture jump during subsequent camera switching of the electronic device can be avoided. Therefore, before the camera switching of the electronic device, it may be determined whether the ratio in the current photographing mode satisfies the second preset range, thereby ensuring that the displayed image remains smooth and fluent during the camera switching.

For example, the determination whether the code value satisfies the first preset threshold may be determining whether the code value is greater than the first preset threshold, that is, determining whether currently the electronic device is relatively close to the to-be-photographed object.

It should be understood that, a smaller code value indicates a larger distance between the electronic device and the to-be-photographed object, and a larger code value indicates a smaller distance between the electronic device and the to-be-photographed object.

For example, the second preset range may be a range size of the zoom ratio. The determination whether the zoom value satisfies the second preset range may be determining whether the zoom ratio in the current photographing mode is within the second preset range.

In an example, the main camera is the wide angle camera. If a zoom ratio corresponding to the wide angle camera is a zoom ratio of 1 (1×) to a zoom ratio of 3.5 (3.5×), the second preset range may be in a range of 1× to 2×.

In an example, the main camera is the wide angle camera. If the zoom ratio corresponding to the wide angle camera a zoom ratio of 0.8 (0.8×) to a zoom ratio of 3.5 (3.5×), the second preset range may be in a range of 0.8× to 1.5×.

It should be understood that, as shown in FIG. 4, the second preset range may be determined based on a zoom ratio of M and a zoom ratio of N corresponding to the wide angle camera. A range corresponding to the second preset range may be between [M, N).

For example, it is assumed the first preset threshold is 0.15 mA and the second preset range is 1× to 2×. In a case that the current photographing mode of the electronic device is the non-super macro mode, if a code value acquired by the main camera is 0.2 mA, an obtained zoom value in the current photographing mode is 1.2×, the code value is greater than the first preset threshold, and the zoom value is within a range corresponding to the second preset range. In other words, the current code value satisfies the first preset threshold and the zoom value satisfies the second preset range. If the code value acquired by the main camera or the zoom value does not satisfy the preset threshold, step S402 re-performed.

In this embodiment of this application, the code value may indicate a magnitude of a current. Based on the magnitude of the current, a magnitude of a magnetic field may be determined, thereby determining a distance parameter between the electronic device and the to-be-photographed object. That is to say, based on the obtained magnitude of the current of the camera module, a current value may be mapped to any value between 0 and 1024, thereby indicating the distance information between the electronic device and the to-be-photographed object.

It should be understood that the above first preset threshold and second preset range are examples. Values of the first preset threshold and the second preset range are not limited in this application.

Step S407: Use an ultra wide camera as a main camera.

For example, in the case that the electronic device detects no user operation, the electronic device may switch from the wide angle camera as the main camera to the ultra wide camera as the main camera; In other words, the electronic device automatically uses the ultra wide camera as the main camera when detecting no operation.

It should be understood that the electronic device may include a plurality of cameras. For example, the plurality of cameras may include a main camera and an auxiliary camera. During image capturing, the electronic device usually uses the image captured by the main camera as a reference for processing. During the processing, partial image information acquired by the auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like. For example, the electronic device is in a single-camera mode during image capturing, that is, the electronic device enables one camera for image capturing. The camera is the main camera.

For example, the electronic device is in a dual-camera mode during image capturing, that is, the electronic device enables two cameras for image capturing. One of the cameras is the main camera, and the other camera is the auxiliary camera. During image capturing, the image captured by the main camera is usually used as a reference for processing. During the processing, partial image information acquired by the partial auxiliary camera may be extracted to compensate for the image captured by the main camera, to achieve fusion of the images captured by the two cameras, and the image is processed to obtain a displayed image, thereby improving photographing quality and implementing functions such as background blur, optical zoom, and the like.

For example, if the electronic device is in a multi-camera mode during image capturing, for example, the electronic device is in a three-camera mode during image capturing, the electronic device may enable three cameras for image capturing. The three cameras include one main camera and two auxiliary cameras. During image capturing, the image captured by the main camera is usually used as a reference for processing. During the processing, partial image information acquired by the two auxiliary cameras may be extracted to compensate for the image captured by the main camera, to achieve fusion of the images captured by the three cameras, and the image is processed to obtain a displayed image, thereby improving photographing quality and implementing functions such as background blur, optical zoom, and the like.

Case 1

If the electronic device is in the single-camera mode, the electronic device may disable the wide angle camera, enable the ultra wide camera, and use the ultra wide camera as the main camera.

Case 2

If the electronic device is in the multi-camera mode (for example, including a dual-camera mode or a three-camera mode), the electronic device may use the ultra wide camera as the main camera, and enable some or all of the auxiliary cameras.

Optionally, in this embodiment of this application, if the electronic device detects that the code value is greater than the first preset threshold and that the current zoom value is within the second preset range, the electronic device may adjust the zoom value, use the ultra wide camera as the main camera, and enable the super macro mode. In this case, a zoom value displayed on the display interface of the electronic device may be 1×. An actual zoom value may be adjusted based on a unit scale of a zoom indication axis of the camera application. For example, if the unit scale of the zoom axis is 0.01×, the actual zoom value may be 0.99×. If the unit scale of the zoom axis is 0.02×, the actual zoom value may be 0.98×.

It should be understood that the unit scale of the zoom indication axis may be a minimum zoom unit. For example, if the unit scale of the zoom axis is 0.02×, a zoom process from 1× to 1.1× may include: 1× to 1.02× to 1.04× to 1.06× to 1.08× to 1.1×.

Step S408: Update a photographing mode to the super macro mode.

For example, different photographing modes in the electronic device may correspond to different flags. The updating of the photographing mode of the electronic device to the super macro mode may be updating a flag corresponding to the non-super macro mode to a flag corresponding to the super macro mode.

For example, the flag corresponding to the non-super macro mode is flag=1, and the flag corresponding to the super macro mode is flag=0. After the electronic device switches to the ultra wide camera as the main camera, the flag corresponding to photographing mode may be updated to flag=0.

For example, the updating of the photographing mode of the electronic device to the super macro mode may be updating the photographing mode of the electronic device from the non-super macro mode to the super macro mode.

Optionally, a control indicating the super macro mode may be displayed on the display interface of the electronic device. For example, as shown in FIG. 9D, a control 506 for super macro may be displayed on a display interface 505; or as shown in FIG. 10D, an icon 513 indicating the super macro mode may be displayed on a display interface 515; or as shown in FIG. 11D, a control 518 indicating the super macro mode may be displayed on a display interface 518; or as shown in FIG. 12H, an icon 528 indicating the super macro mode may be displayed on a display interface 527.

Step S409: Enter a next determination process. In other words, step S402 and step S403 are re-performed, and a corresponding subsequent step is performed based on a result of step S403.

For example, after the photographing mode of the electronic device is updated to the super macro mode, it may be considered that a determination process ends, and a next determination process may be performed. That is to say, step S402 to step S403 are re-performed, and the corresponding subsequent step is performed based on the result of step S403.

In an example, the electronic device may cyclically perform a plurality of determination processes. In other words, after the photographing mode of the electronic device is updated to the super macro mode, step S402 and step S403 are re-performed, and the corresponding subsequent step is performed based on the result of step S403. For example, if the photographing mode of the electronic device is the super macro mode, step S410 to step S414 are performed.

In an example, when a preset time arrives, the electronic device may perform a next determination process. For example, the electronic device may include a timer. When the timer arrives at the preset time (for example, 30 S), the electronic device may re-perform step S402 to step S403, and perform the corresponding subsequent step based on the result of step S403.

Step S410: Obtain the code value (an example of the first parameter).

For example, a code value of the camera module in a case that the electronic device is in the super macro mode is obtained.

Optionally, the electronic device may obtain the code value of the main camera. For example, when the wide angle camera serves as the main camera, the electronic device may obtain a code value of the wide angle camera.

In an example, if the electronic device is in the single-camera mode and the super macro mode during image capturing, the ultra wide camera serves as the main camera. In this case, the wide angle camera may be enabled, and the code value of the wide angle camera may be obtained.

In an example, if the electronic device is in the dual-camera mode and the super macro mode during image capturing, the code value of the wide angle camera may be directly obtained.

It should be understood that, although obtaining the code value of the wide angle camera in the super macro mode is described above as an example, a code value of a main camera of another type may also be obtained. This is not limited in this application.

In this embodiment of this application, since the electronic device does not include a laser sensor, distance information between the electronic device and the to-be-photographed object cannot be obtained through the laser sensor. The distance information between the electronic device and the to-be-photographed object may be obtained through obtaining of the code value of the main camera. It may be determined based on the distance information between the electronic device and the to-be-photographed object whether to switch the camera of the electronic device. For example, if the electronic device is relatively close to the to-be-photographed object, the electronic device may switch from the wide angle camera as the main camera to the ultra wide camera as the main camera.

Step S411: Determine whether the code value satisfies a third preset threshold (an example of a second preset condition). If the code value is less than or equal to the third preset threshold, step S413 is performed. If the code value is greater than the third preset threshold, step S402 is performed.

In this embodiment of this application, the third preset threshold may be greater than the first preset threshold in step S406. The first preset threshold is used for determining whether the electronic device is relatively close to the to-be-photographed object. If the electronic device is relatively close to the to-be-photographed object and the zoom value satisfies the second preset range, the electronic device may switch from the main camera to the ultra wide camera, so that a field of view of the electronic device is larger, thereby obtaining more image information of the to-be-photographed object. The third preset threshold is used for determining whether the electronic device is relatively far from the to-be-photographed object. If the electronic device is relatively far from the to-be-photographed object, the electronic device may use the wide angle camera as the main camera, to improve an image resolution or obtain more image details.

For example, the third preset threshold may be 0.8 mA. If the obtained code value of the main camera is greater than 0.8 mA, the code value satisfies the third threshold; and if the code value of the main camera obtained is less than or equal to 0.8 mA, the code value does not satisfy the third threshold.

In this embodiment of this application, the code value may indicate a magnitude of a current. Based on the magnitude of the current, a magnitude of a magnetic field may be determined, thereby determining a distance parameter between the electronic device and the to-be-photographed object. That is to say, based on the obtained magnitude of the current of the camera module, a current value may be mapped to any value between 0 and 1024, thereby indicating the distance information between the electronic device and the to-be-photographed object.

It should be understood that the above is third preset threshold is described above as an example. A value of the third preset threshold is not limited in this application.

Step S412: Use a wide angle camera as the main camera.

In this embodiment of this application, use of the wide angle camera as the main camera by the electronic device may be using the ultra wide camera as the main camera by the electronic device based on the code value of the camera module when detecting no user operation. In other words, the electronic device may automatically use the wide angle camera as the main camera for image capturing when detecting no operation.

Step S413: Update the photographing mode to a non-super macro mode.

For example, different photographing modes in the electronic device may correspond to different flags. The updating of the photographing mode of the electronic device to the super macro mode may be updating the flag corresponding to the super macro mode to the flag corresponding to the non-super macro mode.

For example, the flag corresponding to the super macro mode is flag=0, and the flag corresponding to the non-super macro mode is flag=1. After the electronic device uses the wide angle camera as the main camera, the flag corresponding to photographing mode may be updated to flag=1.

For example, the updating of the photographing mode of the electronic device to the super macro mode may be updating the photographing mode of the electronic device from the super macro mode to the non-super macro mode.

Step S414: Enter a next determination process.

For example, after the photographing mode of the electronic device is updated to the non-super macro mode, it may be considered that a determination process ends, and a next determination process may be performed. That is to say, step S402 to step S403 are re-performed, and the corresponding subsequent step is performed based on the result of step S403.

In an example, the electronic device may cyclically perform a plurality of determination processes. In other words, after the photographing mode of the electronic device is updated to the non-super macro mode, step S402 and step S403 are re-performed, and the corresponding subsequent step is performed based on the result of step S403. For example, if the photographing mode of the electronic device is the non-super macro mode, step S410 to step S414 are performed.

In an example, when a preset time arrives, the electronic device may perform a next determination process. For example, the electronic device may include a timer. When the timer arrives at the preset time (for example, 30 S), the electronic device may re-perform step S402 to step S403, and perform the corresponding subsequent step based on the result of step S403.

It should be understood that in step S401 to step S414, switching between the wide angle camera and the ultra wide camera is used as an example for description. Step S401 to step S414 are further applicable to switching between cameras of other types. A camera type is not limited in this application.

For example, an algorithm of the camera switching method is described in detail through above step S401 to step S414, and a schematic diagram of an interface when the electronic device performs the camera switching method in embodiments of this application is described below by using examples with reference to FIG. 9A, FIG. 9B, FIG. 9C, and FIG. 9D to FIG. 12A, FIG. 12B, FIG. 12C, FIG. 12D, FIG. 12E, FIG. 12F, FIG. 12G, and FIG. 12H.

For example, as shown in FIG. 9A, FIG. 9B, FIG. 9C, and FIG. 9D, the display interface shown in FIG. 9A may be the home screen 501 of the electronic device. When detecting that the user taps an icon 502 of the camera application on the home screen 501, the electronic device may display another display interface shown in FIG. 9B. The display interface 503 shown in FIG. 9B may be the display interface of the camera application. The display interface 503 may include an intelligent control 504. After the electronic device detects an operation on the intelligent control 504, the electronic device performs the camera switching method provided in embodiments of this application, as shown in FIG. 9C. For example, the electronic device obtains the distance parameter and the zoom ratio of the camera module in the non-super macro mode. If it is determined that the distance parameter and the zoom ratio satisfy the first preset condition, the electronic device switches to the ultra wide camera as the main camera, that is, the electronic device enters the super macro mode and displays the display interface 505 shown in FIG. 9D. The display interface 505 may include the control 506 indicating the photographing mode. A current photographing mode is the super macro mode, as shown in FIG. 9D. If it is detected that the user taps "x" in the "super macrox", the electronic device may disable the super macro mode. Optionally, after the super macro mode is disabled, the electronic device may not push the super macro mode in the preview display interface.

For example, it may be learned from FIG. 9C and FIG. 9C that a field of view of the electronic device in the super macro mode is greater than a field of view of the electronic device in the non-super macro mode. That is to say, the field of view shown in FIG. 10D is greater than that shown in FIG. 10C.

Optionally, after the electronic device detects an operation indicating photographing, a camera currently enabled serves as a camera for image capturing. As shown in FIG. 9D, when the photographing mode of the electronic device is the super macro mode, the electronic device uses the ultra wide camera as the main camera for image capturing.

It should be understood that, as shown in the display interface shown in FIG. 9D, when the electronic device is in the super macro mode, a displayed zoom ratio may be a zoom ratio of 1 (1×), and the ultra wide camera serves as the main camera for image capturing. In this case, an actual zoom value of the camera application may be 0.99×, 0.98×, or another zoom ratio value less than 1×.

Optionally, the actual zoom value of the camera application may be adjusted based on the unit scale of the zoom indication axis of the camera application. If the unit scale of the zoom axis is 0.01×, the actual zoom value may be 0.99×. If the unit scale of the zoom axis is 0.02×, the actual zoom value may be 0.98×.

Optionally, the display interface shown in FIG. 9D may also not display the control 506 indicating the super macro mode. This is not limited in this application.

For example, as shown in FIG. 10A, FIG. 10B, FIG. 10C, FIG. 10D, FIG. 10E, and FIG. 10F, the display interface shown in FIG. 10A may be a home screen 507 of the electronic device. When detecting that the user taps an icon 508 of the camera application on the home screen 507, the electronic device may display another display interface shown in FIG. 10B. A display interface 509 shown in FIG. 10B may be the display interface of the camera application. The display interface 509 may include a setting control 510. The electronic device detects an operation on the setting control 510, as shown in FIG. 10C. After detecting the operation on the setting control 510, the electronic device may display a setting display interface. The setting display interface includes a control 511 indicating enabling of automatic camera switching, as shown in FIG. 10D. After the detecting an operation on the control 511, the electronic device performs the camera switching method provided in embodiments of this application, as shown in FIG. 10E. For example, the electronic device obtains the distance parameter and the zoom ratio of the camera module in the non-super macro mode. If it is determined that the distance parameter and the zoom ratio satisfy the first preset condition, the electronic device switches to the ultra wide camera as the main camera, that is, the electronic device enters the super macro mode and displays the display interface 512 shown in FIG. 10F. The display interface 512 may include the icon 513 indicating the photographing mode. A current photographing mode is the super macro mode. If it is detected that the user taps "x" in the "super macrox", the electronic device may disable the super macro mode. Optionally, after the super macro mode is disabled, the electronic device may not push the super macro mode in the preview display interface. Optionally, the relevant description in FIG. 9A, FIG. 9B, FIG. 9C, and FIG. 9D is applicable to FIG. 10A, FIG. 10B, FIG. 10C, FIG. 10D, FIG. 10E, and FIG. 10F, which is not repeated herein.

In an example, the super macro may be enabled through an independent control in the display interface of the camera application, as shown in FIG. 11A, FIG. 11B, FIG. 11C, and FIG. 11D. A display interface shown in FIG. 11A may be a home screen 514 of the electronic device. When detecting that the user taps an icon 515 of the camera application on the home screen 514, the electronic device may display another display interface 516 shown in FIG. 11B. A display interface 516 shown in FIG. 11B may be the display interface of the camera application. The display interface 516 may include a control 517. As shown in FIG. 11C, after detecting an operation on the setting control 517, the electronic device performs the camera switching method provided in embodiments of this application. For example, the electronic device obtains the distance parameter and the zoom ratio of the camera module in the non-super macro mode. If it is determined that the distance parameter and the zoom ratio satisfy the first preset condition, the electronic device switches to the ultra wide camera as the main camera, that is, the electronic device enters the super macro mode and displays the display interface 518 shown in FIG. 11D. The display interface 518 may include the icon 519 indicating the photographing mode. A current photographing mode is the super macro mode. If it is detected that the user taps "x" in the "super macrox", the electronic device may disable the super macro mode. Optionally, after the super macro mode is disabled, the electronic device may not push the super macro mode in the preview display interface. Optionally, the relevant description in FIG. 9A, FIG. 9B, FIG. 9C, and FIG. 9D is applicable to FIG. 11A, FIG. 11B, FIG. 11C, and FIG. 11D, which is not repeated herein.

It should be understood that a difference between the display interfaces shown in FIG. 11A, FIG. 11B, FIG. 11C, and FIG. 11D and FIG. 9A, FIG. 9B, FIG. 9C, and FIG. 9D is that the enabling/disabling of automatic camera switching is indicated through the intelligent control 504 in FIG. 9A, FIG. 9B, FIG. 9C, and FIG. 9D, but the enabling/disabling of automatic camera switching is implemented through a control independent of the intelligent control in FIG. 11.

In an example, as shown in FIG. 12A, FIG. 12B, FIG. 12C, FIG. 12D, FIG. 12E, FIG. 12F, FIG. 12G, and FIG. 12H, the user may indicate to enable automatic camera switching in the setting display interface of the electronic device, thereby causing the electronic device to perform the camera switching method provided in embodiments of this application.

For example, a display interface shown in FIG. 12A is a home screen 520 of the electronic device. When detecting that the user taps an icon 521 arranged on the home screen 520, the electronic device may display another display interface shown in FIG. 12B. The display interface shown in FIG. 12B may be the setting display interface. The setting display interface may include an option such as Wireless network, Bluetooth, and Camera. As shown in FIG. 12C, the electronic device detects tapping on the camera option, and therefore enters a camera setting interface, and displays FIG. 12D. The camera setting interface may include a control 522 for automatic camera switching. As shown in FIG. 12E, after detecting an operation on the control 522, the electronic device may perform the camera switching method provided in embodiments of this application. As shown in FIG. 12F, the electronic device detects that the user taps an icon 525 of the camera application on the home screen 520, and therefore enters the camera application. After entering the camera application, another display interface 526 shown in FIG. 12G may be displayed. In this case, the electronic device may be in the non-super macro mode. The electronic device may obtain the distance parameter and the zoom ratio of the camera module in the non-super macro mode. If it is determined that the distance parameter and the zoom ratio satisfy the first preset condition, the electronic device switches to the ultra wide camera as the main camera, that is, the electronic device enters the super macro mode and displays the display interface 527 shown in FIG. 12H. The display interface 527 may include the icon 528 indicating the photographing mode. A current photographing mode is the super macro mode. If it is detected that the user taps "x" in the "super macrox", the electronic device may disable the super macro mode. Optionally, after the super macro mode is disabled, the electronic device may not push the super macro mode in the preview display interface.

Optionally, the relevant description in FIG. 9A, FIG. 9B, FIG. 9C, and FIG. 9D is applicable to FIG. 12A, FIG. 12B, FIG. 12C, FIG. 12D, FIG. 12E, FIG. 12F, FIG. 12G, and FIG. 12H, which is not repeated herein.

Optionally, after entering the display interface of the camera application, the electronic device may directly display the display interface shown in FIG. 12H. That is to say, the electronic device may directly switch from the display interface shown in FIG. 12F to the display interface shown in FIG. 12H.

Optionally, the method shown by step S401 to step S414 shown in FIG. 8 is also applicable to switching between the wide angle camera and a telephoto camera or switching between cameras of other types.

For example, as shown in FIG. 13A, a to-be-photographed scene includes the first to-be-photographed object 260 and a third to-be-photographed object 281. A distance between the first to-be-photographed object and an electronic device 100 is d3, and a distance between the third to-be-photographed object and the electronic device 100 is d4. d3 is less than d4. FIG. 14 is a side view of the to-be-photographed scene. The electronic device 100 includes a camera module 272. During the photographing, a position of the electronic device 100 remains unchanged. The electronic device 100 enables a camera application. At a first moment, the electronic device 100 aligns at the first to-be-photographed object 260 for focusing, and may display a display interface 282. In this case, a zoom ratio of the electronic device 100 is a zoom ratio of 1. As shown in FIG. 13B, at the second moment, the electronic device 100 switches to another to-be-photographed object. For example, when the electronic device 100 aligns at the third to-be-photographed object 281 for focusing, if the electronic device 100 recognizes that the third to-be-photographed object 281 is relatively far from the electronic device 100, the electronic device 100 may enter the super long-range mode. That is to say, the electronic device 100 may automatically switch to a super telephoto camera as the main camera for focusing, and display a display interface 291.

For example, for the switching between the wide angle camera and the telephoto camera, the above expression "determine whether the electronic device is in a super macro mode" in step S403 shown in FIG. 8 may be changed to an expression "determine whether the electronic device is in a super long-range mode". A display interface of the super long-range mode may be shown in FIG. 16B below. The expression "determine whether the code value satisfies a first preset threshold and whether the zoom value satisfies a second preset range" in step S406 may be changed to an expression "determine whether the code value satisfies a fourth preset threshold and whether the zoom value satisfies a fifth preset range". The expression "use an ultra wide camera as a main camera" in step S407 may be changed to an expression "use a telephoto camera as a main camera". The expression "update a photographing mode to the super macro mode" in step S408 may be changed to an expression "update a photographing mode to the super long-range mode". The expression "determine whether the code value satisfies a third preset threshold" in step S411 may be changed to an expression "determine whether the code value satisfies a sixth preset threshold".

The super long-range mode is a photographing mode in which the electronic device automatically switches to the telephoto camera as the main camera for image capturing. The fourth preset threshold is used for determining whether the electronic device is relatively far from the to-be-photographed object. When the distance between the electronic device and the to-be-photographed object is less than or equal to the fourth threshold, it indicates that the electronic device is relatively far from the to-be-photographed object. The fourth preset threshold may not be equal to the first preset threshold. Similarly, the fifth preset range is not equal to the second preset range. The fifth preset threshold is determined based on a zoom ratio corresponding to the telephoto camera. As shown in FIG. 4, a range corresponding to the fifth preset threshold may be between [N, K). K may be a maximum zoom ratio corresponding to the telephoto camera. In addition, the third preset threshold is not equal to the sixth preset threshold. Based on the obtained code value and the sixth preset threshold, it may be determined whether to use the telephoto camera as the main camera. For example, if the code value is greater than the sixth preset threshold, the electronic device may switch from the telephoto camera as the main camera to the wide angle camera as the main camera for image capturing.

It should be understood that the super macro mode is applicable to short-range photographing, and the super long-range mode is applicable to long-range photographing. Based on the camera switching method in embodiments of this application, the electronic device can implement automatic switching between different cameras based on the obtained code value and zoom value. In other words, the electronic device can implement switching between a plurality of types of different cameras based on the distance between the electronic device and the to-be-photographed object without any user operation.

In this embodiment of this application, the electronic device can implement automatic switching between different cameras in the electronic device through obtaining of the code value and the zoom value acquired by the main camera without relying on a laser sensor in the electronic device, thereby improving photographing experience of users and improving image quality. For example, in a short-range photographing scenario, the electronic device may automatically switch from the wide angle camera as the main camera to the ultra wide camera as the main camera, thereby increasing the field of view of the electronic device. Since the field of view of the electronic device is increased, the electronic device acquires more image information of a to-be-photographed object, so that an image resolution can be increased. In a long-range photographing scenario, the electronic device may automatically switch from the wide angle camera as the main camera to the telephoto camera as the main camera, so that the electronic device can obtain more image details.

In an example, in order to ensure stability of image capturing by the electronic device, the electronic device may perform determinations based on a plurality of frames of images before camera switching. For example, the electronic device may determine whether at least two consecutive frames of images satisfy a preset threshold. If the at least two consecutive frames of images satisfy the preset threshold, the electronic device performs camera switching, as shown in FIG. 13A and FIG. 13B.

FIG. 15 is a schematic flowchart of a camera switching method according to an embodiment of this application. The method may be performed by the electronic device shown in FIG. 1. A method 600 includes step S601 to step S616. Step S601 to step S616 are respectively described below in detail.

It should be understood that in step S601 to step S616, switching between a wide angle camera and an ultra wide camera is used as an example for description. Step S601 to step S616 are further applicable to switching between cameras of other types. A camera type is not limited in this application.

Step S601: Run a camera application.

Step S602: Obtain a photographing mode of the electronic device.

Step S603: Determine whether the electronic device is in a super macro mode. If yes, step S611 is performed; and if no, step S604 is performed.

For example, it is determined whether a mode of the electronic device is the super macro mode. If the photographing mode of the electronic device is in the super macro mode, step S611 is performed; and if the photographing mode of the electronic device is not in the super macro mode, step S604 is performed.

Step S604: Obtain a code value.

For example, a distance parameter (for example, a code value) of a camera module is obtained.

Step S605: Obtain a zoom value.

Optionally, in this embodiment of this application, step S604 may be first performed, and then step S605 is performed; or step S605 may be first performed, and then step S604 is performed. A sequence of step S604 and step S605 is not limited in this application.

Step S606: Determine whether the code value satisfies a first preset threshold and whether the zoom value satisfies a second preset range. If the code value satisfies the first preset threshold and the zoom value satisfies the second preset range, step S607 is performed. If the code value does not satisfy the first preset threshold, and/or the zoom value does not satisfy the second preset range, step S602 is performed.

Step S607: Determine whether two consecutive frames of images satisfy the first preset threshold and the second preset range. If the two consecutive frames of images satisfy the first preset threshold and the second preset range, step S608 is performed. If the two consecutive frames of images do not satisfy the first preset threshold and do not satisfy the second preset range, step S602 is re-performed.

For example, the two consecutive frames of images may include a first frame of image and a second frame of image. The electronic device captures the first frame of image in a non-super macro mode and obtains a code value of a main camera. If the obtained code value of the main camera is greater than the first preset threshold, it indicates that the electronic device is relatively close to a to-be-photographed object. In addition, the zoom value is within a zoom range corresponding to the second preset range. Similarly, the electronic device captures the second frame of image in the non-super macro mode, and obtains the code value of the main camera. If the code value is greater than the first preset threshold, it indicates that the electronic device is relatively close to the to-be-photographed object. In addition, the zoom value is within the second preset range. In this case, a code value of the first frame of image and a code value of the second frame of image are both greater than the first preset threshold, and a zoom ratio of the first frame of image and a zoom ratio of the second frame of image are both within the second preset range, that is, the two consecutive frames of images satisfy the first preset threshold and the second preset range.

Step S608: Use an ultra wide camera as a main camera.

Step S609: Update the photographing mode to the super macro mode.

Step S610: Enter a next determination process. In other words, step S602 and step S603 are re-performed, and a corresponding subsequent step is performed based on a result of step S603.

Step S611: Obtain a code value (an example of the first parameter).

For example, the distance parameter (for example, a code value) of the camera module is obtained.

Step S612: Determine whether the code value satisfies a third preset threshold. If the code value satisfies the third preset threshold, step S613 is performed. If the code value does not satisfy the third preset threshold, step S602 is re-performed.

Step S613: Determine whether the two consecutive frames of images satisfy the third preset threshold. If the two consecutive frames of images satisfy the third preset threshold, step S614 is performed. If the two consecutive frames of images do not satisfy the third preset threshold, step S602 is re-performed.

For example, the two consecutive frames of images may include the first frame of image and the second frame of image. The electronic device captures the first frame of image in the super macro mode and may obtain a code value of a wide angle camera. The code value is greater than or equal to the third preset threshold. The electronic device captures the second frame of image in the super macro mode, and may obtain the code value of the wide angle camera, and determines whether the code value is equal to or less than the third preset threshold. In this case, the code values of the two consecutive frames of images are both less than or equal to the third threshold, that is, the two consecutive frames of images satisfy the third preset threshold.

Step S614: Use a wide angle camera as the main camera.

Step S615: Update the photographing mode to a non-super macro mode.

Step S616: Enter a next determination process.

It should be noted that, the relevant description in FIG. 8 is applicable to the above step S601 to step S616. The details are not described herein.

It should be understood that in step S601 to step S617, switching between the wide angle camera and the ultra wide camera is used as an example for description. Similarly, the above camera switching method is also applicable to switching between the wide angle camera and a telephoto camera or switching between cameras of other types.

In this embodiment of this application, the electronic device can implement automatic switching between different cameras in the electronic device through obtaining of the distance parameter and the zoom ratio obtained by the main camera without relying on a laser sensor in the electronic device, thereby improving photographing experience of users and improving image quality. For example, in a short-range photographing scenario, the electronic device may automatically switch from the wide angle camera as the main camera to the ultra wide camera as the main camera, thereby increasing the field of view of the electronic device. Since the field of view of the electronic device is increased, the electronic device acquires more image information of a to-be-photographed object, so that an image resolution can be increased. In a long-range photographing scenario, the electronic device may automatically switch from the wide angle camera as the main camera to the telephoto camera as the main camera, so that the electronic device can obtain more image details. In addition, in this embodiment of this application, it may be determined whether the at least two consecutive frames of images satisfy the preset threshold. If the at least two consecutive frames of images satisfy the preset threshold, the electronic device may perform camera switching, thereby ensure stability of image capturing by the electronic device.

FIG. 16A and FIG. 16B are schematic diagrams of a preview interface of a camera application according to an embodiment of this application.

For example, an electronic device is in a short-range photographing scenario. FIG. 16A shows a preview image captured when a wide angle camera serves as a main camera. FIG. 16B shows a preview image when the electronic device is in a super macro mode, that is, a preview image captured when the electronic device uses an ultra wide camera as the main camera. It may be learned with reference to FIG. 16A and FIG. 16B that, in the short-range photographing scenario, an image resolution and a field of view of the electronic device are increased when the electronic device uses the ultra wide camera as the main camera for image capturing.

FIG. 17A and FIG. 17B are schematic diagrams of a preview interface of a camera application according to an embodiment of this application.

For example, an electronic device is in a long-range photographing scenario. FIG. 17A shows a preview image captured when a wide angle camera serves as a main camera. FIG. 17B shows a preview image captured when the electronic device is in a super long-range mode, that is, a preview image captured when the electronic device uses a telephoto camera as the main camera. It may be learned with reference to the preview image in FIG. 17A and the preview image in FIG. 17B that, in the long-range photographing scenario, more image details are obtained when the electronic device uses the telephoto camera as the main camera for image capturing.

It should be understood that, the above description of examples is intended to help a person skilled in the art understand embodiments of this application, but are not intended to limit embodiments of this application to specific values or specific scenarios in the examples. A person skilled in the art may apparently make various equivalent modifications or changes based on the above examples, and such modifications or changes also fall within the scope of embodiments of this application.

The camera switching method provided in embodiments of this application are described in detail above with reference to FIG. 1 to FIG. 17A and FIG. 17B. An apparatus embodiment of this application is described in detail below with reference to FIG. 18 and FIG. 19. It should be understood that, the apparatus in this embodiment of this application may perform the method in the above embodiments of this application. That is to say, for specific working processes of the following products, reference may be made to corresponding processes in the above method embodiments.

FIG. 18 is a schematic structural diagram of an electronic device according to an embodiment of this application. An electronic device 700 includes a processing module 710, a display module 720, a first camera, and a second camera.

The processing module 710 is configured to enable a camera application. The display module 720 is configured to display a first image, where the first image is captured when the first camera serves as a main camera for image capturing. The processing module 710 is further configured to determine that a first parameter and a second parameter satisfy a first preset condition, where the first parameter indicates distance information between the electronic device and a target object, the first parameter is a parameter from the camera module, the target object is a to-be-photographed object in the first image, and the second parameter indicates a zoom ratio of the electronic device. The display module 720 is further configured to display a second image, where the second image is captured when the second camera serves as the main camera for image capturing.

Optionally, in an embodiment, the processing module 710 is specifically configured to:

determine that the first parameter is greater than a first preset threshold and the second parameter satisfies a second preset range, where the first preset threshold indicates distance information between the camera module and a sensor in the electronic device, and the second preset range indicates a zoom range of the camera module.

Optionally, in an embodiment, the processing module 710 is specifically configured to:

obtain a first distance range of the first camera, where the first distance range indicates an effective distance range for focusing by the first camera; and obtain the first preset threshold based on the first distance range.

Optionally, in an embodiment, the processing module 710 is specifically configured to:

obtain a zoom ratio range of the first camera; and obtain the second preset range based on the zoom ratio range.

Optionally, in an embodiment, a start point of the first distance range is a first value, and the first preset threshold is greater than or equal to the first value.

Optionally, in an embodiment, the second preset range is a subset of the zoom ratio range.

Optionally, in an embodiment, the first parameter is a parameter from the first camera.

Optionally, in an embodiment, the second parameter is the zoom ratio of the electronic device.

Optionally, in an embodiment, the processing module 710 is specifically configured to:

display the second image on a first display interface of the electronic device, where the first display interface further includes a first icon, and the first icon indicates a super macro mode.

Optionally, in an embodiment, the first icon includes a first control, and the processing module 710 is further configured to:

detect a first operation on the first control; and exit, by the electronic device, the super macro mode in response to the first operation.

Optionally, in an embodiment, the first camera includes a wide angle camera, and/or the second camera includes an ultra wide camera or a telephoto camera.

Optionally, in an embodiment, the electronic device is at a same position when displaying the first image and the second image.

It should be noted that, the above electronic device 700 is represented in a form of a functional module. The term "module" herein may be implemented in a form of software and/or hardware, which is not specifically limited.

For example, the "module" may be a software program, a hardware circuit, or a combination of a software program and a hardware circuit that implements the above functions. The hardware circuit may include an application specific integrated circuit (application specific integrated circuit, ASIC), an electronic circuit, a processor (for example, a shared processor, a special purpose processor, or a group processor) configured to execute one or more software or firmware programs, a memory, a combinational logical circuit, and/or another suitable component that supports the described functions.

Therefore, the units in the examples described in embodiments of this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

FIG. 19 is a schematic structural diagram of an electronic device according to this application. A dash line in FIG. 19 indicates that a unit or module is optional. An electronic device 800 may be configured to implement the methods described in the foregoing method embodiments.

The electronic device 800 includes one or more processors 801. The one or more processors 801 may support the electronic device 800 to implement the camera switching method in the method embodiments. The processor 801 may be a general purpose processor or a special purpose processor. For example, the processor 801 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device such as a discrete gate, a transistor logic device, or a discrete hardware component.

The processor 801 may be configured to control the electronic device 800, execute a software program, and process data of the software program. The electronic device 800 may further include a communication unit 805, which is configured to implement input (receiving) and output (sending) of a signal.

For example, the electronic device 800 may be a chip. The communication unit 805 may be an input and/or output circuit of the chip, or the communication unit 805 may be a communication interface of the chip. The chip may be a component of a terminal device or another electronic device.

For another example, the electronic device 800 may be a terminal device. The communication unit 805 may be a transceiver of the terminal device, or the communication unit 805 may be a transceiver circuit of the terminal device.

The electronic device 800 may include one or more memories 802, which store a program 804. The program 804 may be executed by the processor 801 to generate an instruction 803, so that the processor 801 performs the camera switching method described in the above method embodiments based on the instruction 803.

Optionally, the memory 802 may further store data.

Optionally, the processor 801 may further read the data stored in the memory 802. The data may be stored at a same storage address as the program 804, or may be stored at a storage address different from that of the program 804.

The processor 801 and the memory 802 may be arranged separately or integrated together, for example, integrated on a system on chip (system on chip, SOC) of the terminal device.

For example, the memory 802 may be configured to store the program 804 related to the camera method provided in embodiments of this application. The processor 801 may be configured to invoke the program 804 related to the camera switching method stored in the memory 802 when performing the camera switching method, to perform the camera switching method in embodiments of this application. For example, the processor may be configured to: enable a camera application; display a first image, where the first image is captured when a first camera serves as a main camera for image capturing; determine that a first parameter and a second parameter satisfy a first preset condition, where the first parameter indicates distance information between the electronic device and a target object, the first parameter is a parameter from the camera module, the target object is a to-be-photographed object in the first image, and the second parameter indicates a zoom ratio of the electronic device; and display a second image, where the second image is captured when the second camera serves as the main camera for image capturing.

This application further provides a computer program product. The computer program product, when executed by a processor 801, implements the camera switching method in any method embodiment of this application.

The computer program product, such as a program 804, may be stored in a memory 802. The program 804 is subject to processes such as preprocessing, compilation, assembly, and linking, and is finally converted into an executable target document that may be executed by the processor 801.

This application further provides a computer-readable storage medium, which stores a computer program. The computer program, when executed by a computer, implements the camera switching method in any method embodiment of this application. The computer program may be a high-level language program or an executable target program.

The computer-readable storage medium may be, for example, a memory 802. The memory 802 may be a volatile memory or a non-volatile memory, or the memory 802 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and serves as an external cache. Through illustrative but not limited description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

A person of ordinary skill in the art may be aware that, units, algorithms, and steps described in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for the specific working process of the above system, apparatus, and unit, reference may be made to the corresponding process in the above method embodiments, and the details are not repeated herein.

It should be understood from the embodiments provided in this application that the disclosed system, apparatus, and method may be implemented in another manner. For example, the described embodiment of the electronic device is merely an example. For example, the module division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic, mechanical, or another form.

The units described as separate components may or may not be physically separate, and components displayed as units may or may not be physical units, and may be at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

It should be understood that sequence numbers of the processes in embodiments of this application do not mean execution sequences. The execution sequences of the processes should be determined based on functions and internal logic of the processes, and should not be construed as any limitation on the implementation processes of embodiments of this application.

The term "and/or" used in this specification describes only an association relationship for describing associated objects, and indicates that three relationships may exist. For example, A and/or B may represent the following three cases: only A exists, both A and B exist, and only B exists. In addition, the character "/" in this specification generally indicates an "or" relationship between the associated objects.

When the functions are implemented in a form of a software functional unit and sold or used as an independent product, the functions may be stored in a computer-readable storage medium. Based on such an understanding, the technical solutions of this application essentially, or a part contributing to the related art, or a part of the technical solutions may be implemented in a form of a software product. The computer software product is stored in a storage medium, and includes a plurality of instructions for enabling a computer device (which may be a personal computer, a server, a network device, or the like) to perform all or a part of the steps of the method described in embodiments of this application. The storage medium includes any medium that can store program code, such as a USB flash drive, a removable hard disk, a read-only memory (read-only memory, ROM), a random access memory (random access memory, RAM), a magnetic disk, or a compact disc.

The above descriptions are merely specific implementations of this application, and are not intended to limit the protection scope of this application. Any variation or replacement readily figured out by a person skilled in the art within the technical scope disclosed in this application falls within the protection scope of this application. Therefore, the protection scope of this application is subject to the protection scope of the claims. To sum up, the above descriptions are merely embodiments of the technical solutions of this application, and are not intended to limit the protection scope of this application. Any modification, equivalent replacement, or improvement made without departing from the spirit and principle of this application falls within the protection scope of this application.

What is claimed is:

1. A camera switching method, applicable to an electronic device, wherein the electronic device comprises a camera module, the camera module comprises a first camera and a second camera, and the method comprises:
    enabling a camera application;
    displaying a first image, wherein the first image is captured when the first camera serves as a main camera for image capturing;
    determining that a first parameter and a second parameter satisfy a first preset condition, wherein the first parameter indicates distance information between the electronic device and a target object, the first parameter is a parameter from the camera module and comprises a distance between the camera module and a sensor in the electronic device, the target object is a to-be-photographed object in the first image, and the second parameter indicates a zoom ratio of the electronic device; and
    displaying a second image, wherein the second image is captured when the second camera serves as the main camera for image capturing.

2. The method according to claim 1, wherein the determining that a first parameter and a second parameter satisfy a first preset condition comprises:
    determining that the first parameter is greater than a first preset threshold and the second parameter satisfies a second preset range, wherein the first preset threshold indicates distance information between a lens of the first camera and the sensor in the electronic device, and the second preset range indicates a zoom range of the camera module.

3. The method according to claim 2, further comprising:
    obtaining a first distance range of the first camera, wherein the first distance range indicates an effective distance range for focusing by the first camera; and
    obtaining the first preset threshold based on the first distance range.

4. The method according to claim 3, wherein a start point of the first distance range is a first value, and the first preset threshold is greater than or equal to the first value.

5. The method according to claim 2, further comprising:
    obtaining a zoom ratio range of the first camera; and
    obtaining the second preset range based on the zoom ratio range.

6. The method according to claim 5, wherein the second preset range is a subset of the zoom ratio range.

7. The method according to claim 1, wherein the first parameter is a parameter from the first camera.

8. The method according to claim 1, wherein the second parameter is the zoom ratio of the electronic device.

9. The method according to claim 1, wherein the displaying a second image comprises:
    displaying the second image on a first display interface of the electronic device, wherein the first display interface further comprises a first icon, and the first icon indicates a super macro mode.

10. The method according to claim 9, wherein the first icon comprises a first control, and the method further comprises:
    detecting a first operation on the first control; and
    exiting, by the electronic device, the super macro mode in response to the first operation.

11. The method according to claim 1, wherein the first camera comprises a wide angle camera, and/or the second camera comprises an ultra wide camera or a telephoto camera.

12. The method according to claim 1, wherein the electronic device is at a same position when displaying the first image and the second image.

13. The camera switching method according to claim 1, wherein the distance between the camera module and the sensor in the electronic device comprises a lens position of a lens of the first camera.

14. An electronic device, comprising
    one or more processors and a memory, wherein
    the memory is coupled to the one or more processors, the memory is configured to store computer program code, the computer program code comprises computer instructions, and the one or more processors invoke the computer instructions to cause the electronic device to:
    enable a camera application;
    display a first image, wherein the first image is captured when a first camera of a camera module serves as a main camera for image capturing;
    determine that a first parameter and a second parameter satisfy a first preset condition, wherein the first parameter indicates distance information between the electronic device and a target object, the first parameter is a parameter from the camera module and comprises a distance between the camera module and a sensor in the electronic device, the target object is a to-be-photographed object in the first image, and the second parameter indicates a zoom ratio of the electronic device; and
    display a second image, wherein the second image is captured when a second camera of the camera module serves as the main camera for image capturing.

15. The electronic device according to claim 14, wherein the determining that a first parameter and a second parameter satisfy a first preset condition comprises:
    determining that the first parameter is greater than a first preset threshold and the second parameter satisfies a second preset range, wherein the first preset threshold indicates distance information between a lens of the first camera and the sensor in the electronic device, and the second preset range indicates a zoom range of the camera module.

16. The electronic device according to claim 14, wherein the distance between the camera module and the sensor in the electronic device comprises a lens position of a lens of the first camera.

17. A chip system, applicable to an electronic device, the chip system comprising one or more processors, wherein the processors are configured to invoke computer instructions to cause the electronic device to:
    enable a camera application;
    display a first image, wherein the first image is captured when a first camera of a camera module serves as a main camera for image capturing;
    determine that a first parameter and a second parameter satisfy a first preset condition, wherein the first parameter indicates distance information between the electronic device and a target object, the first parameter is a parameter from the camera module and comprises a distance between the camera module and a sensor in the electronic device, the target object is a to-be-photographed object in the first image, and the second parameter indicates a zoom ratio of the electronic device; and
    display a second image, wherein the second image is captured when a second camera of the camera module serves as the main camera for image capturing.

18. The chip system according to claim 17, wherein the determining that a first parameter and a second parameter satisfy a first preset condition comprises:

determining that the first parameter is greater than a first preset threshold and the second parameter satisfies a second preset range, wherein the first preset threshold indicates distance information between a lens of the first camera and the sensor in the electronic device, and the second preset range indicates a zoom range of the camera module.

19. The chip system according to claim 17, wherein the distance between the camera module and the sensor in the electronic device comprises a lens position of a lens of the first camera.

* * * * *